(12) United States Patent
Smith

(10) Patent No.: US 8,307,773 B2
(45) Date of Patent: Nov. 13, 2012

(54) PASSENGER MODULE SUSPENSION SYSTEM

(76) Inventor: David A. Smith, Sidney (CA)

(*) Notice: Subject to any disclaimer, the term of this patent is extended or adjusted under 35 U.S.C. 154(b) by 165 days.

(21) Appl. No.: 12/988,122

(22) PCT Filed: Apr. 16, 2009

(86) PCT No.: PCT/CA2009/000526
§ 371 (c)(1),
(2), (4) Date: Oct. 15, 2010

(87) PCT Pub. No.: WO2009/127070
PCT Pub. Date: Oct. 22, 2009

(65) Prior Publication Data
US 2011/0030601 A1    Feb. 10, 2011

Related U.S. Application Data

(60) Provisional application No. 61/045,415, filed on Apr. 16, 2008, provisional application No. 60/082,620, filed on Jul. 22, 2008.

(51) Int. Cl.
*B63B 29/12* (2006.01)

(52) U.S. Cl. .......................................... 114/71; 114/363

(58) Field of Classification Search .................... 114/71, 114/363, 284; 248/550, 562, 585
See application file for complete search history.

(56) References Cited

U.S. PATENT DOCUMENTS

| 2,617,337 A | 11/1952 | Evans |
| 5,542,371 A * | 8/1996 | Harvey et al. .................. 114/363 |
| 6,182,596 B1 | 2/2001 | Johnson |
| 6,786,172 B1 | 9/2004 | Loffler |
| 6,892,666 B1 | 5/2005 | Plante et al. |

FOREIGN PATENT DOCUMENTS

WO      2006035229 A2    4/2006

* cited by examiner

*Primary Examiner* — Lars A Olson
(74) *Attorney, Agent, or Firm* — Tomlinson Rust McKinstry Grable

(57) ABSTRACT

A suspension system for passenger modules used with high-speed boats, the suspension system including a shock absorbing assembly, for supporting the passenger module relative to the vessel. The passenger module is attached to the vessel via an assembly of pivoting spars. The spars may be configured such that the passenger module moves from an upper at-rest no-load position towards a bottom loaded position, the passenger module tilts. The amount of such tilt may be adjustable. The suspension system may have include means for resisting relative lateral movement (e.g. a panhard rod or a Watts linkage) and an anti-sway device.

18 Claims, 52 Drawing Sheets

PASSENGER MODULE SUSPENSION SYSTEM

FIELD OF THE INVENTION

The present invention relates to a passenger module suspension system. More particularly, the present invention relates to a suspension system for a passenger module for use in high-speed watercraft.

BACKGROUND OF THE INVENTION

High-speed small boats are used in a variety of applications and are particularly useful in military, and search and rescue operations. When fast-moving small watercraft encounter even moderately disturbed water, the passengers are subjected to significant forces. At high-speed, in waves of any appreciable size, small watercraft tend to be subjected to rapid and simultaneous vertical and horizontal acceleration and deceleration. When a boat moving at high speed impacts the crest of a wave, the boat tends to simultaneously pitch upwards and decelerate, and when it passes over or through the crest and encounters the trough, the boat tends to pitch downwards and accelerate. At high speed, each pitching and acceleration/deceleration cycle may be measured in seconds, such that passengers are subjected to rapid and extreme acceleration and deceleration and the associated shock, which is commonly quantified in terms of multiples of g, a "g" being a unit of acceleration equivalent to that exerted by the earth's gravitational field at the surface of the earth. The term g-force is also often used, but it is commonly understood to mean a relatively long-term acceleration. A short-term acceleration is usually called a shock and is also quantified in terms of g.

Human tolerances for shock and g-force depend on the magnitude of the acceleration, the length of time it is applied, the direction in which it acts, the location of application, and the posture of the body. When vibration is experienced, relatively low peak g levels can be severely damaging if they are at the resonance frequency of organs and connective tissues. In high-speed watercraft, with the passengers sitting in a conventional generally upright position, which is typically required, particularly with respect to the helmsperson and any others charged with watchkeeping, upward acceleration of the watercraft is experienced as a compressive force to an individual's spine and rapid deceleration tends to throw an individual forward.

Shock absorbing systems for high-speed boats are known. For example, U.S. Pat. No. 6,786,172 (Loffler—Shock absorbing boat) discloses a horizontal base for supporting a steering station that that is hingedly connected to the transom to pivot about a horizontal axis. The base is supported by spring bias means connected to the hull. Other Impact attenuation systems for aircraft seats are also known, as disclosed in: U.S. Pat. No. 4,349,167 (Reilly—Crash load attenuating passenger seat); U.S. Pat. No. 4,523,730 (Martin—Energy-absorbing seat arrangement); U.S. Pat. No. 4,911,381 (Cannon et al.—Energy absorbing leg assembly for aircraft passenger seats); U.S. Pat. No. 5,125,598 (Fox—Pivoting energy attenuating seat); and U.S. Pat. No. 5,152,578—Kiguchi—Leg structure of seat for absorbing impact energy.

Other seat suspension systems are also known, as disclosed in: U.S. Pat. No. 5,657,950 (Han et al.—Backward-leaning-movement seat leg structure); U.S. patent application Ser. No. 10/907,931 (App.) (Barackman et al.—Adjustable attenuation system for a space re-entry vehicle seat); U.S. Pat. No. 3,572,828 (Lehner—Seat for vehicle preferably agricultural vehicle); U.S. Pat. No. 3,994,469 (Swenson et al.—Seat suspension including improved damping means); and U.S. Pat. No. 4,047,759 (Koscinski—Compact seat suspension for lift truck).

SUMMARY OF THE INVENTION

In one aspect, the present invention includes a vessel passenger-module suspension system in which the passenger module is suspended relative to the vessel by a shock absorbing device and the permitted movement of the passenger module relative to the vessel is defined by at least two spars, each pivotally connected at one end to the passenger module and at the other end to the vessel, configured and oriented with respect to one another such that as the passenger module moves from an upper at-rest position to a lower full-load position, the passenger module tilts backward so as to provide to the passengers an optimized seat orientation for experiencing any shock not attenuated by the shock absorbing device.

Preferably the suspension system included means for adjusting the relative orientation of the two spars such that the range of tilt of the passenger module can be modified to suit prevailing conditions.

In another aspect, the present invention includes a suspension system for a passenger module of a high-speed water vessel, the suspension system having: a shock absorbing assembly for resiliently suspending a passenger module relative to a vessel, wherein the shock absorbing assembly tends to cause the passenger module to remain in an upper at-rest position and to return to the at-rest position on cessation of a force causing the passenger module to move towards a bottom position; and a spar assembly comprising a plurality of spars, each spar pivotally attached at a proximal end to the vessel and at a distal end to the passenger module, the spar assembly configured to provide an aft tilt to the passenger module as the passenger module moves towards the bottom position.

In the suspension system, the spar assembly includes two spars, an upper spar and a lower spar; the distal end of the upper spar is attached to the passenger module at a greater height on the passenger module than the distal end of the lower spar; each spar pivots relative to the vessel responsive to upward or downward movement of the passenger module relative to the vessel and in doing so each spar causes the portion of the passenger module in the vicinity of the distal end of the spar to move generally parallel to the fore-and-aft axis of the vessel; and there is a differential in the fore-and-aft movement caused by the spars in that an arc defined by the distal end of the lower spar as the passenger module moves towards the bottom position includes greater relative forward displacement that an arc defined by the distal end of the upper spar as the passenger module moves towards the bottom position; whereby, as the passenger module moves towards the bottom position the differential in the fore-and-aft movement induces the aft tilt.

The suspension system preferably includes a device for adjusting the amount of differential in the fore-and-aft movement and thus the amount of aft tilt. The device for adjusting the amount of differential in the fore-and-aft movement may be an adjustable mount for varying the height of an end of the upper spar or lower spar such so as to vary the relative forward displacement of the arc defined by the distal end of the spar as the passenger module moves towards the bottom position. The adjustable mount may include a plurality of holes, generally vertically displaced one from the other, with each hole defining a mounting location for the associated end of the relevant upper spar or lower spar. Preferably, in terms of general ease of access, the adjustable mount is for pivotally attaching the distal end of the upper strut to the passenger module.

The upper spar and the lower spar may not be parallel one to the other. The upper spar and the lower spar may be different lengths. The upper spar may be shorter than the lower spar.

Preferably, in terms of general stability of the passenger module and strength of the suspension system, there is a second lower spar and the two lower spars are spaced apart athwart one from the other in a generally parallel relationship. There may also or alternatively be a second upper spar with the two upper spars spaced apart athwart one from the other in a generally parallel relationship.

The shock absorbing assembly includes one or more shock absorbers attached at a proximal end to the vessel and at a distal end to the passenger module. There may be two or four shock absorbers. The shock absorbers may be any conventional shock absorber such as air shocks or MacPherson struts.

The suspension system may also include a component for inhibiting athwart movement of the passenger module relative to the vessel, for example a panhard rod or a Watt's linkage. The suspension system may also include an anti-sway device, for example, a torsion bar attached to the vessel and the passenger module.

In another aspect the present invention includes a suspension system for a passenger module of a high-speed water vessel, the suspension system having: a shock absorbing assembly, comprising four shock absorbers attached at a proximal end to a vessel and at a distal end to a passenger module, for resiliently suspending the passenger module relative to the vessel, wherein the shock absorbing assembly tends to cause the passenger module to remain in an upper at-rest position and to return to the at-rest position on cessation of a force causing the passenger module to move towards a bottom position; and a spar assembly comprising: i) an upper spar pivotally attached at a proximal end to the vessel and at a distal end to the passenger module; ii) two lower spars spaced apart athwart in a generally parallel relationships and each lower spar pivotally attached at a proximal end to the vessel and at a distal end to the passenger module; wherein the distal end of the upper spar is attached to the passenger module at a greater height on the passenger module than the distal ends of the lower spars; wherein each spar pivots relative to the vessel responsive to upward or downward movement of the passenger module relative to the vessel and in doing so each spar causes the portion of the passenger module in the vicinity of the distal end of the spar to move generally parallel to the fore-and-aft axis of the vessel; and there is a differential in the fore-and-aft movement caused by the spars in that an arc defined by the distal end of the lower spars as the passenger module moves towards the bottom position includes greater relative forward displacement than an arc defined by the distal end of the upper spar as the passenger module moves towards the bottom position, whereby, as the passenger module moves towards the bottom position the differential in the fore-and-aft movement induces an aft tilt to the passenger module; and a panhard rod attached to the passenger module and the vessel for inhibiting athwart movement of the passenger module relative to the vessel.

The suspension system preferably includes an adjustable mount for pivotally attaching the distal end of the upper spar to the passenger module, the adjustable mount comprising a plurality of holes, generally vertically displaced one from the other, with each hole defining a distinct mounting location for the distal end of the upper spar, wherein changing the mounting location for the distal end of the upper spar changes the relative forward displacement of the arc defined by the distal end of the upper spar as the passenger module moves towards the bottom position and thus changes the amount of aft tilt.

DETAILED DESCRIPTION WITH REFERENCE TO THE DRAWINGS

In this specification, including the claims, terms conveying an absolute direction (for example, up, down etc.) or absolute relative positions (for example, top, bottom etc.) are used for clarity of description and it is understood that such absolute directions and relative positions may not always pertain. As well, in this specification, including the claims, terms relating to directions and relative orientations on a watercraft, for example, port, starboard, forward, aft, fore and aft (which when used herein means a generally horizontal direction generally parallel to the direction of travel of the vessel), bow, stern, athwart (which when used herein means a generally horizontal direction generally perpendicular to the direction of travel of the vessel) etc. are used for clarity of description and it is understood that such terms may not always pertain.

Figure 1:
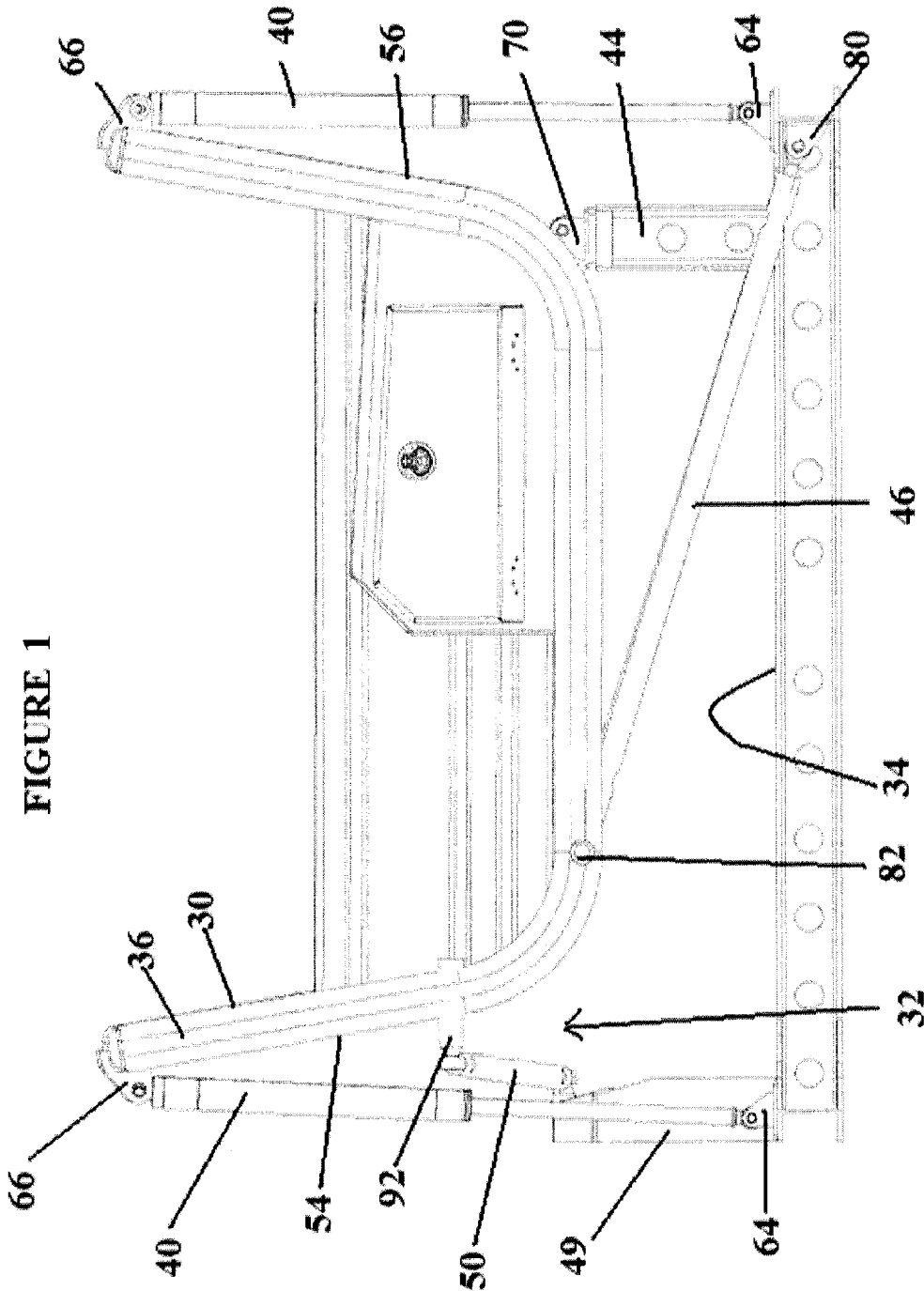
FIG. 1 is a side elevation view of a passenger-module-suspension-system embodiment of the present invention, shown in the at-rest position.
Figure 2:
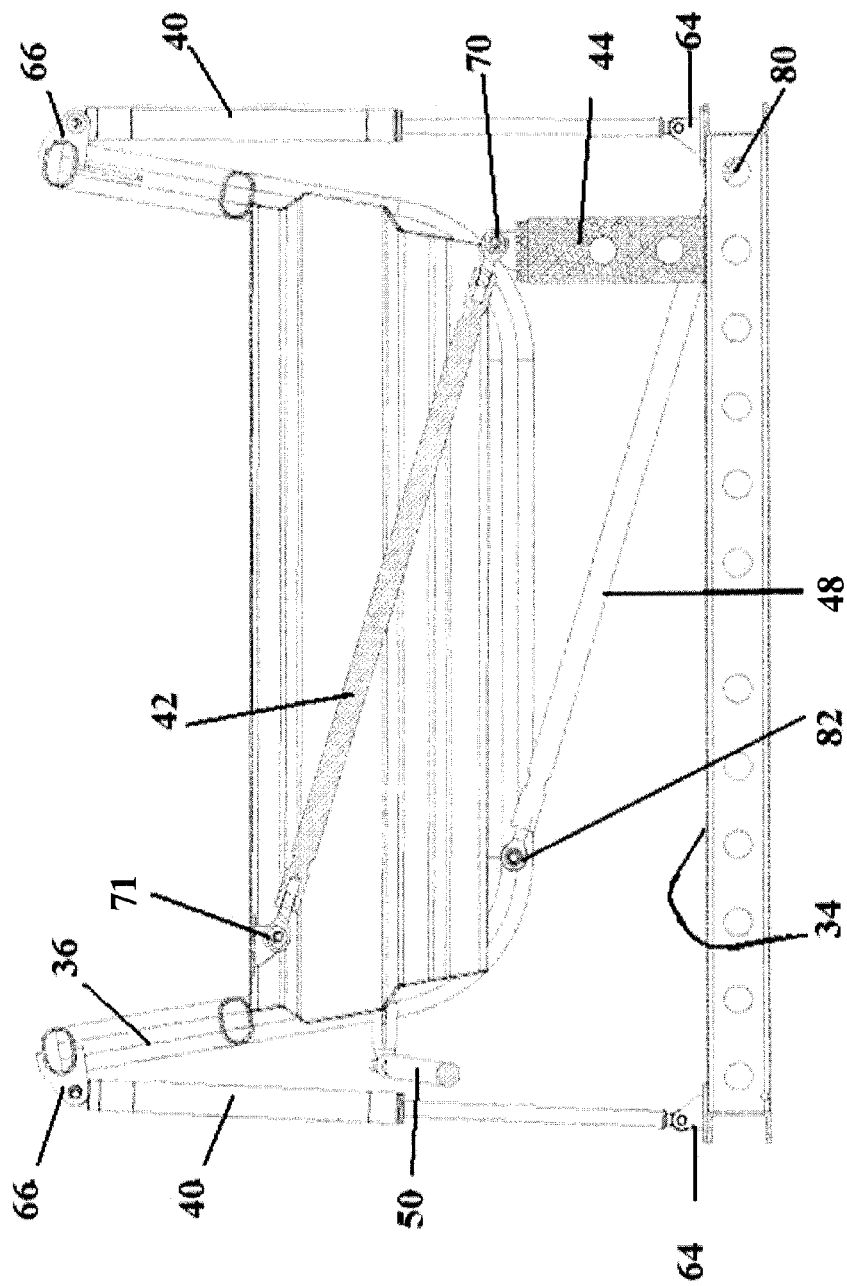
FIG. 2 is a side elevation view, in section, of the embodiment illustrated in FIG. 1, in the at-rest position.
Figure 3:
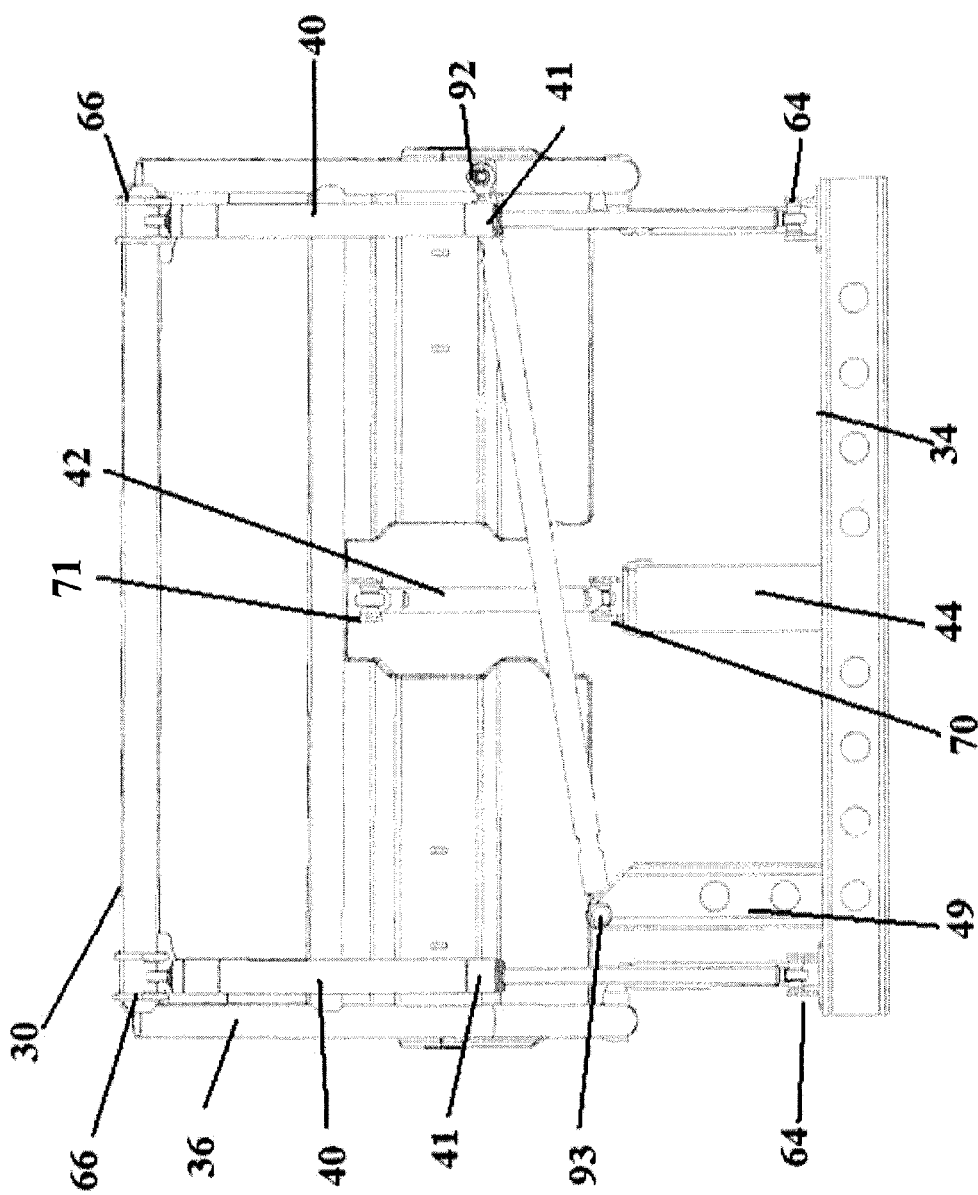
FIG. 3 is a front elevation view of the embodiment illustrated in FIG. 1, in the at-rest position
Figure 4:
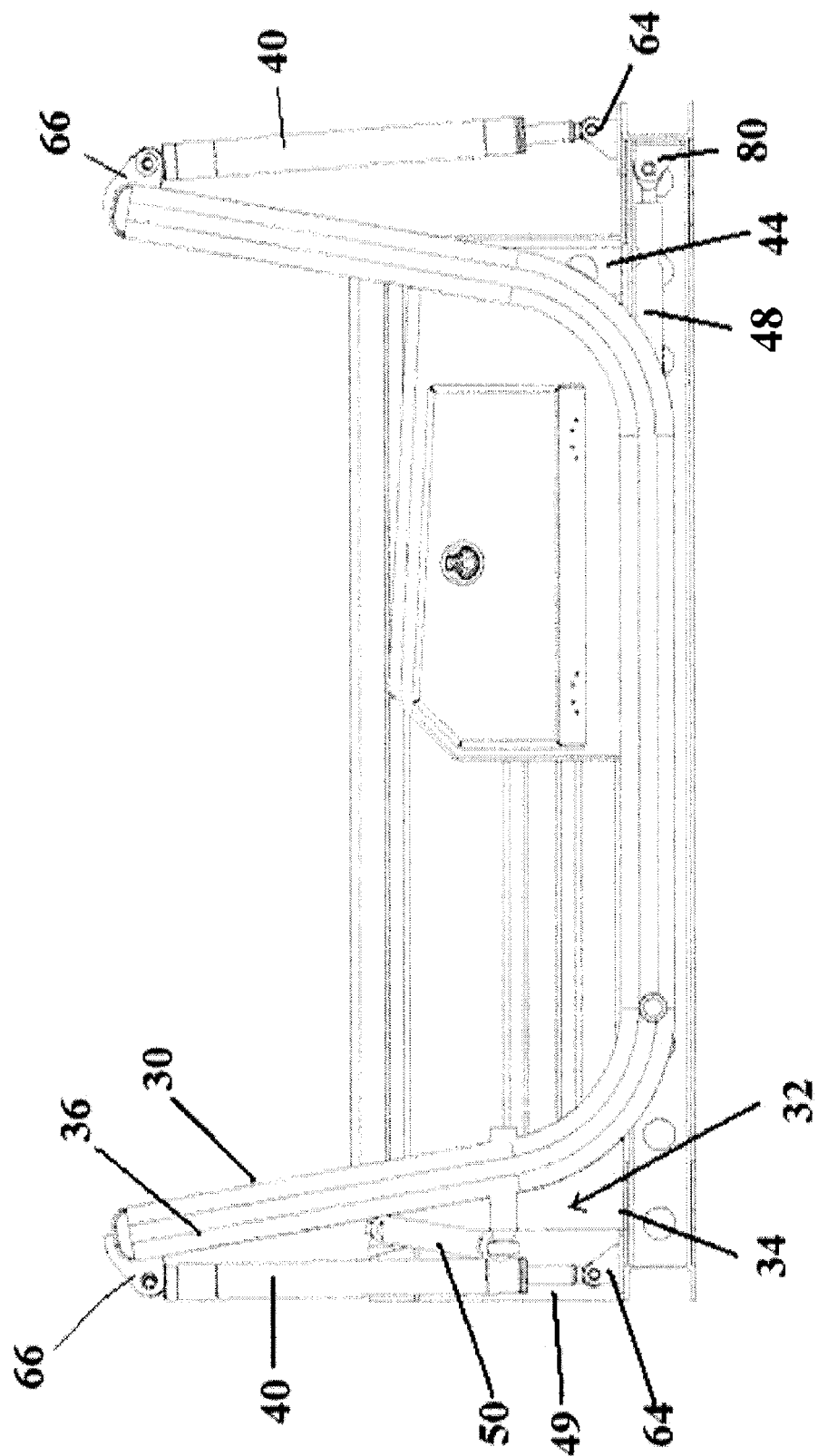
FIG. 4 is a side elevation view of the embodiment illustrated in FIG. 1, in the bottom under-load position.
Figure 5:
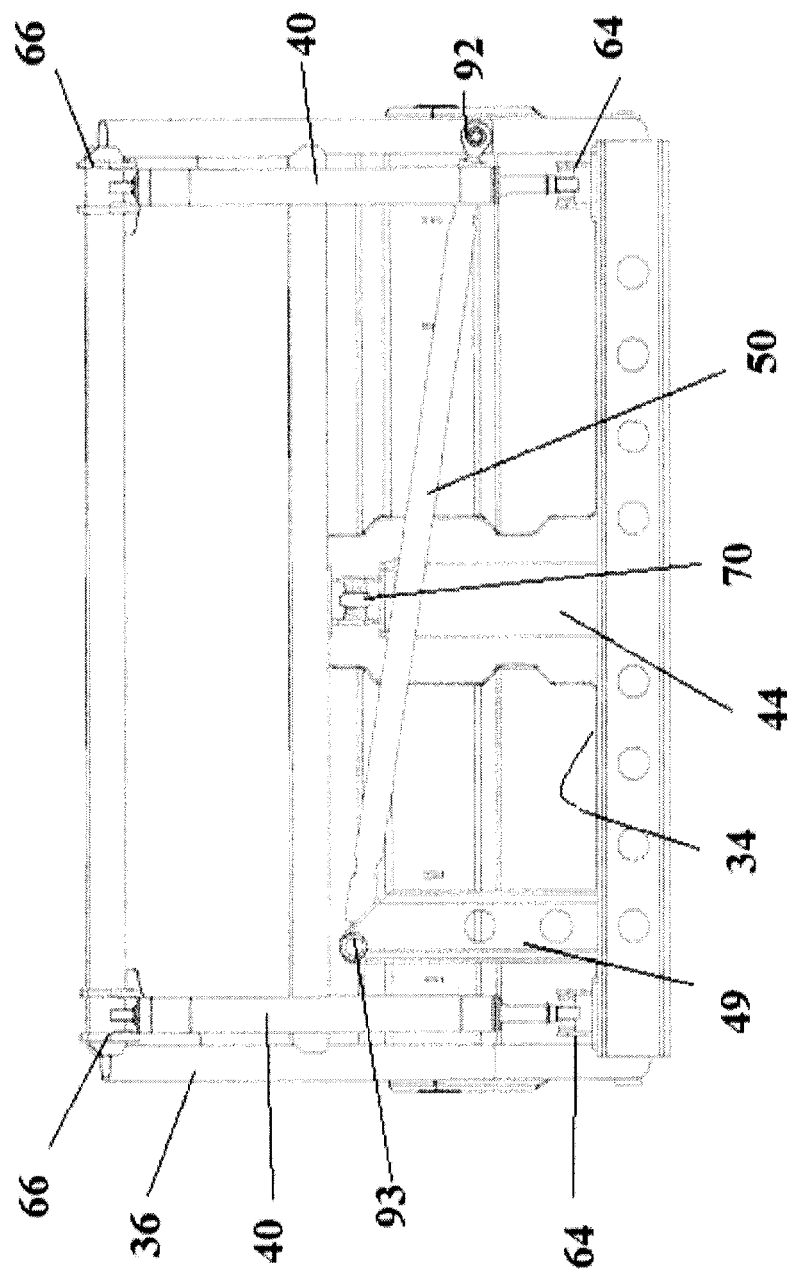
FIG. 5 is a front elevation view of the embodiment illustrated in FIG. 1, in the bottom under-load position.
Figure 6:
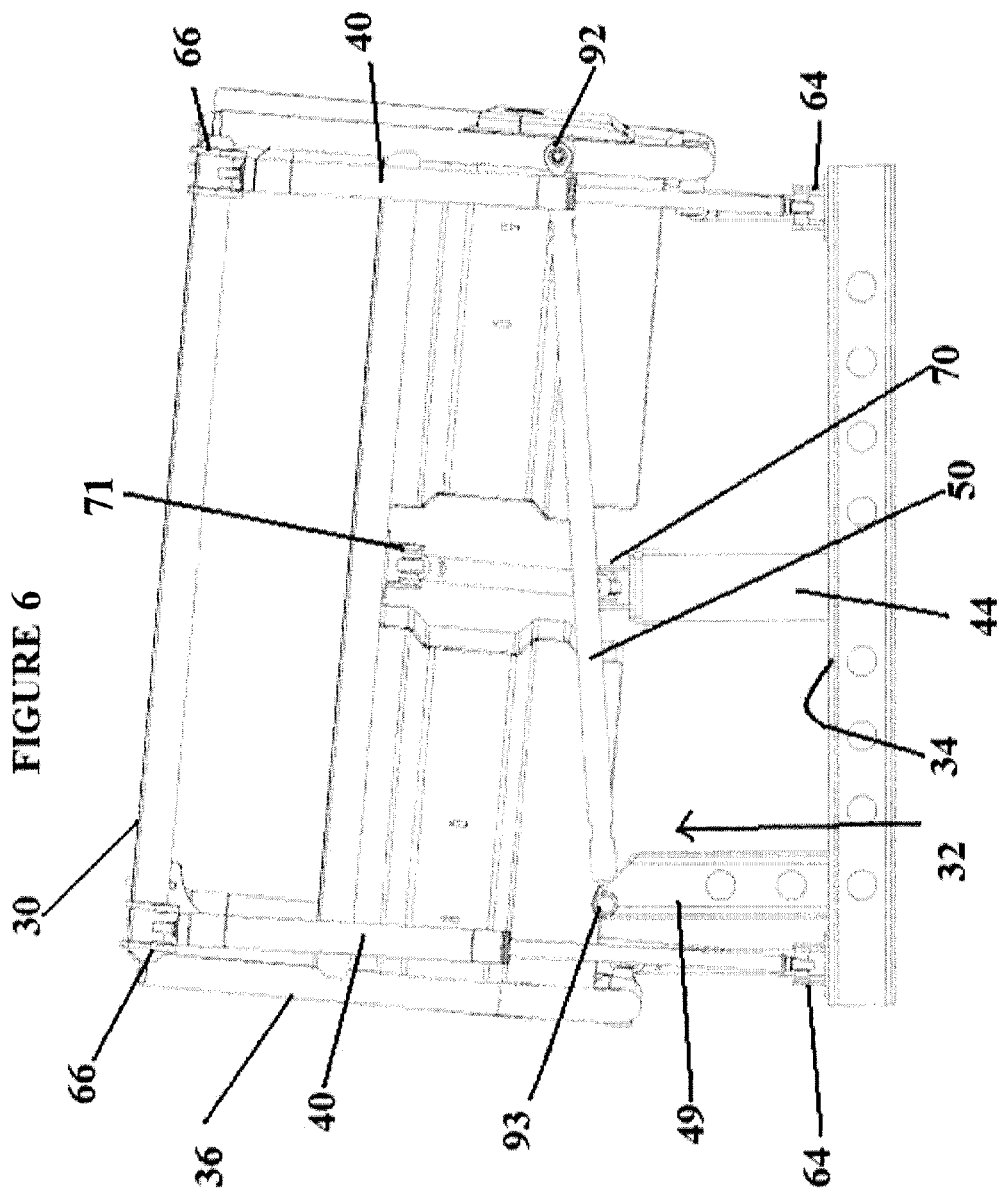
FIG. 6 is a front elevation view of the embodiment illustrated in FIG. 1, showing the passenger module rolled to port relative to the deck (i.e. rolled towards the right side of the image).

Referring to FIGS. 1 through 6, there is illustrated a passenger module 30 with a frame 36 and an associated suspension system, generally referenced by numeral 32, mounted to a deck 34. In FIGS. 1 through 3, the embodiment is shown with the passenger module 30 in a no-load at-rest position. In FIGS. 4 and 5, the embodiment is shown with the passenger module in a full-load bottom position. In FIG. 6, the embodiment is shown with the passenger module 30 rolled to port relative to the deck 34.

In the figures, passenger module 30 is generally represented in a simplified stylized manner, however it will be appreciated that in an actual installation, passenger module 30 typically comprises several other features, including: contoured seats, windscreens, covers, vessel controls etc. As well, the passenger module may comprise more than two individual seats.

In the figures, deck 34 is generally indicated schematically variously as a flat rectangular plate or an I-beam framework.

In an actual installation, the passenger module 30 and suspension system 32 are typically mounted to the vessel, such as to an integral deck. However, in some installations, it may be preferable to mount the passenger module 30 and suspension system 32 to a carriage (such as a suitable plate or framework) and to attach the carriage to the vessel.

In the embodiment shown in FIGS. 1 through 6, suspension system 32 includes four struts 40, an upper spar 42, a spar pedestal 44, a port lower spar 46, a starboard lower spar 48, a panhard pedestal 49 and a panhard rod 50. Spar pedestal 44 and panhard pedestal 49 extend vertically upward from deck 34. Struts 40 are positioned on either side of passenger module 30 at a front end 54 and struts 40 are also positioned on both sides of passenger model 30 at a back end 56 of passenger module 30. Referring to FIGS. 4 and 5, each strut 40 extends generally vertically. Each strut 40 is secured to deck 34 with a strut deck bracket 64 and to passenger module 30 with a strut module bracket 66. Struts 40 serve to suspend passenger module 30 above deck 34. The struts 40 may be any suitable type of shock absorber such as air shocks, MacPherson struts etc.

As shown most clearly in FIGS. 3 and 4, the proximal end 45 of upper spar 42 is pivotally mounted to a pedestal bracket 70 located on spar pedestal 44. The distal end of upper spar 42 is pivotally connected to a mount 71 located on frame 36 of passenger module 30.

As shown most clearly in FIGS. 1 and 2, port lower spar 46 and starboard lower spar 48 each extend generally fore and aft. The proximal end of each of port lower spar 46 and starboard lower spar 48 is pivotally mounted to a lower-spar deck bracket 80 on deck 34. The distal end of each of port lower spar 46 and starboard lower spar 48 is pivotally mounted to a lower-spar module bracket 82 located on frame 36 of passenger module 30.

As shown most clearly in FIGS. 5 and 6, the proximal end of the panhard rod 50 is pivotally mounted to panhard pedestal 52 with panhard deck mount 90. The distal end of the panhard rod 50 is pivotally mounted to the panhard module mount 93. In the embodiment shown in FIGS. 1 through 6, panhard rod 50 is positioned in the vicinity of the forward end of passenger module 32. Panhard rod 50 prevents more than minimal lateral movement of passenger module 30 relative to deck 34. As the distal end of panhard rod 50 moves in an arc as passenger module 30 moves vertically, panhard rod 50 induces a slight lateral movement of passenger module 30 during vertical movement of passenger module 30. This slight lateral movement of passenger module 30 relative to deck 34 is accommodated generally by the various connections between the components of three-point suspension system 32 and passenger 30 and deck being configured to permit some relative lateral movement.

Figure 7:
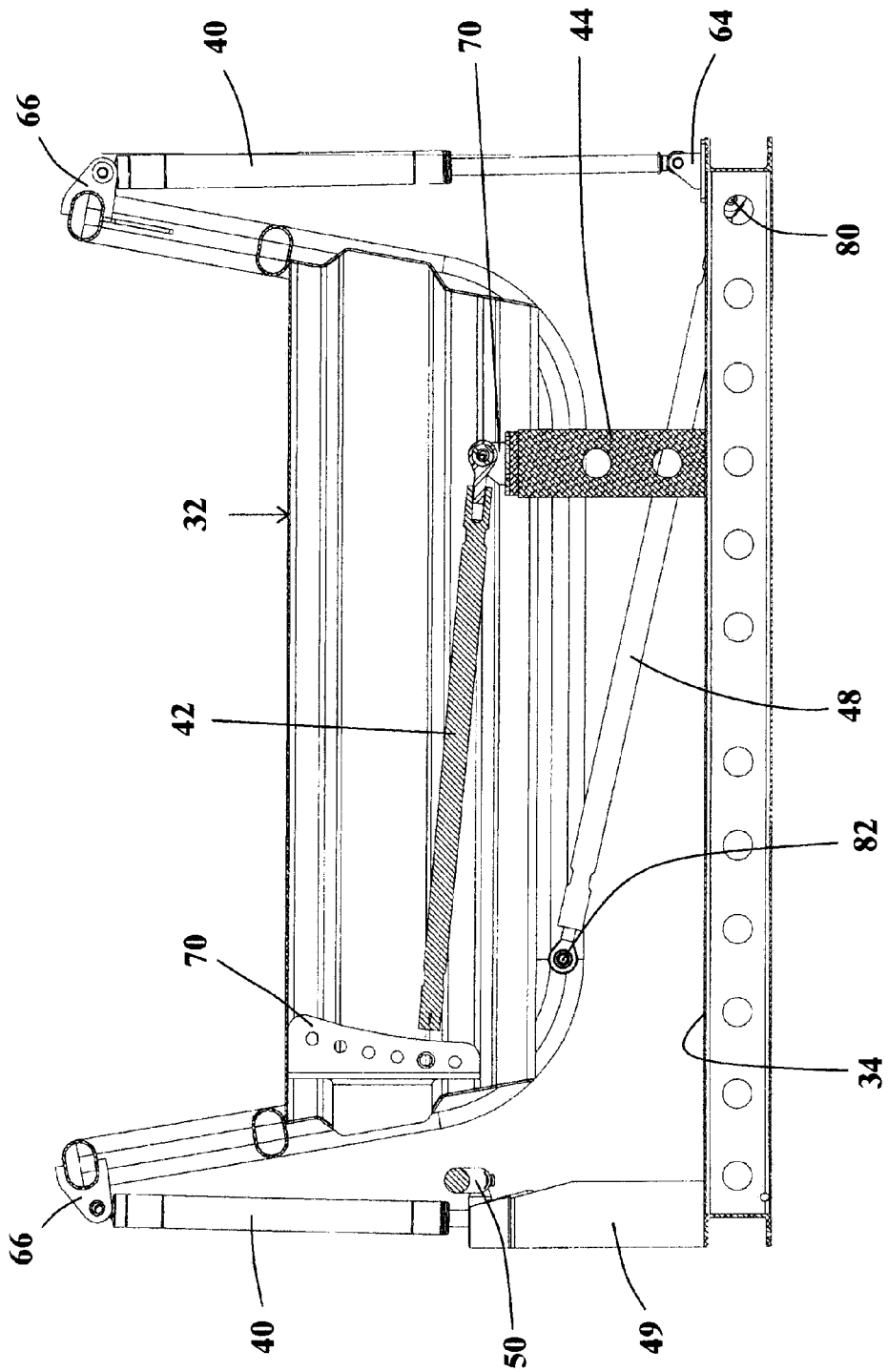
FIG. 7 is a side elevation view in section of another passenger-module-suspension-system embodiment of the present invention, shown in the at-rest position.
Figure 8:
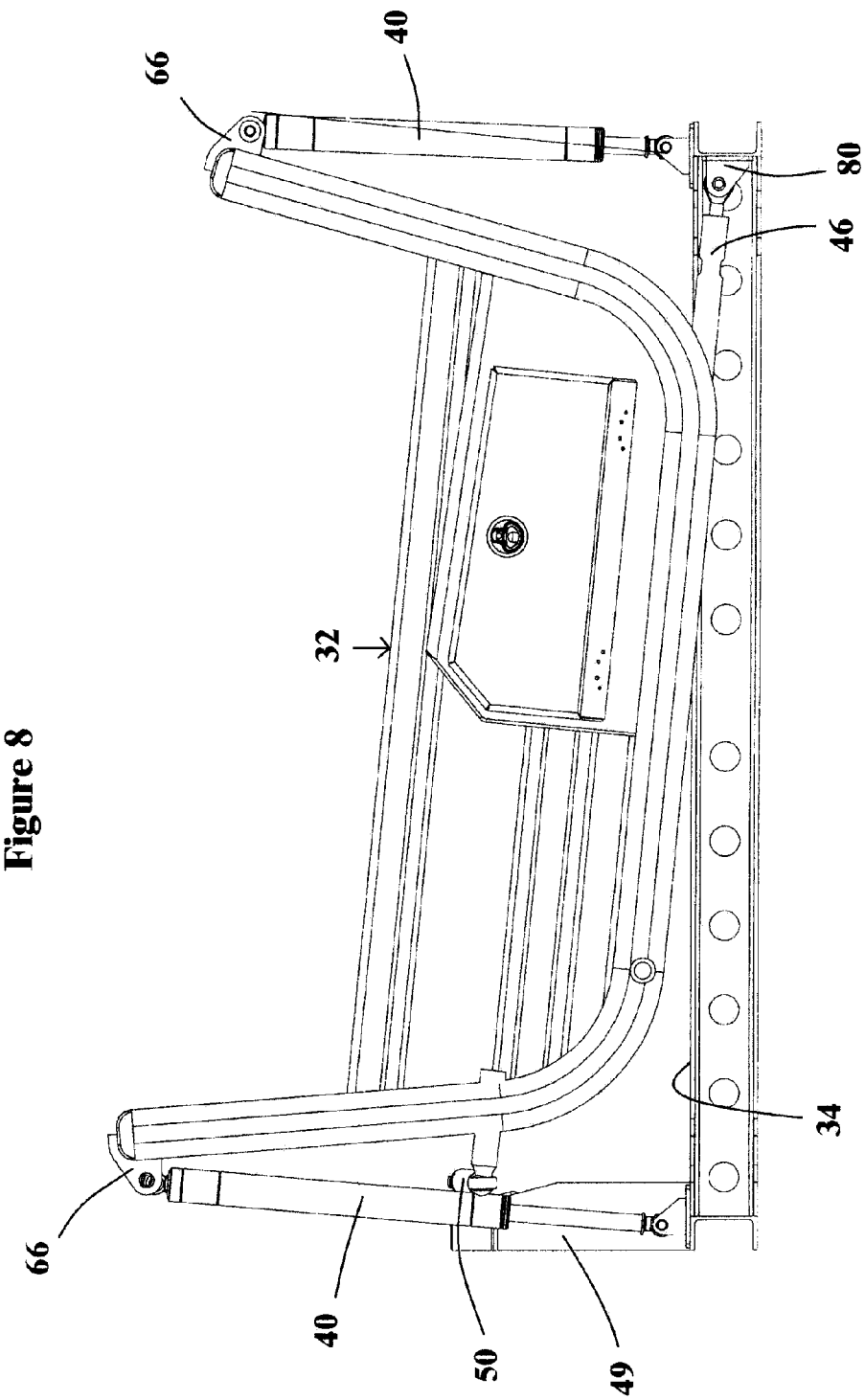
FIG. 8 is a side elevation view in section of the embodiment illustrated in FIG. 1, shown in the bottom under-load position.
Figure 9:
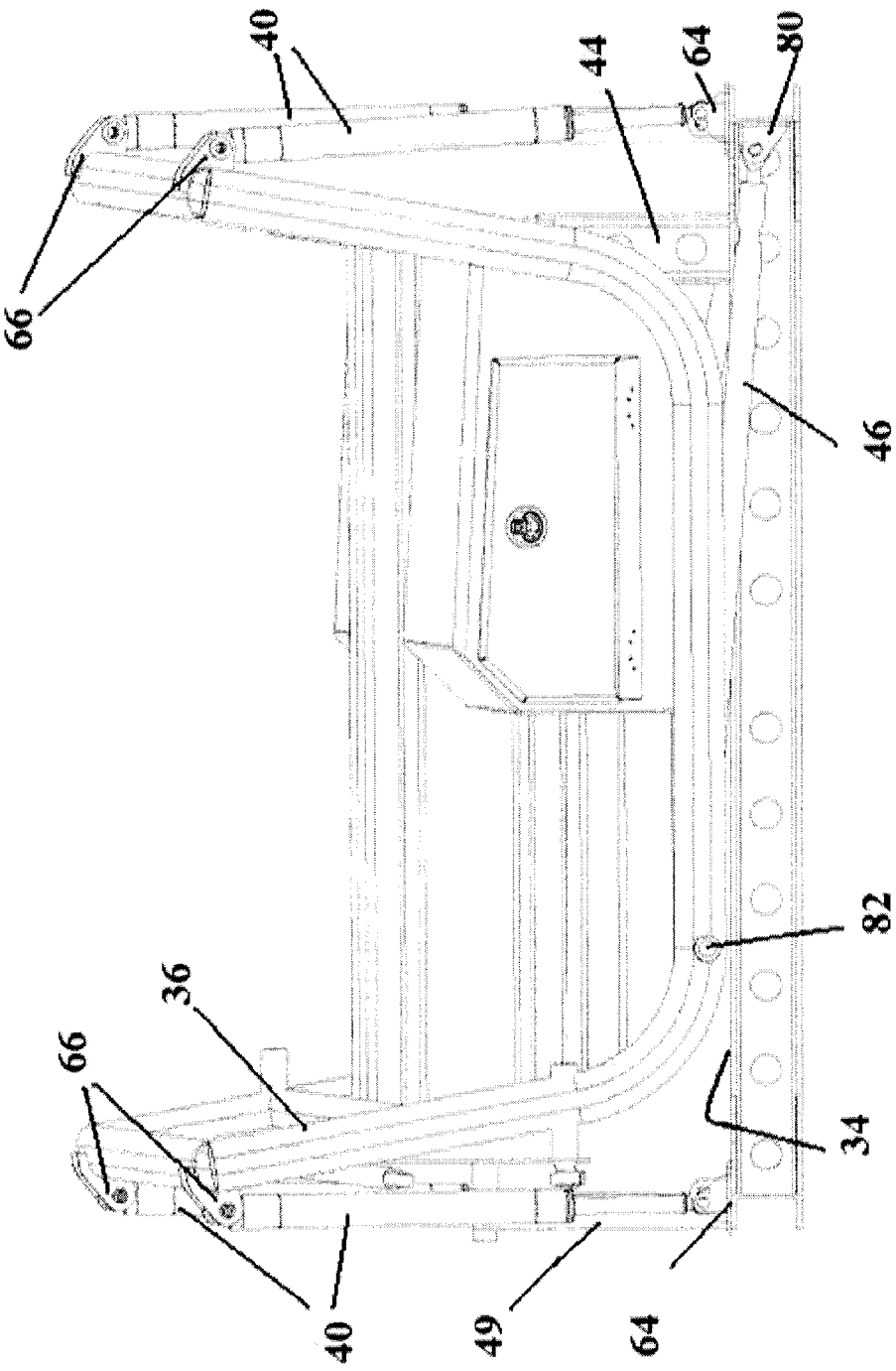
FIG. 9 is a side elevation view of another embodiment of the present invention having a Watts linkage, showing the passenger module rolled to port relative to the deck (i.e. rolled towards the viewer).
Figure 10:
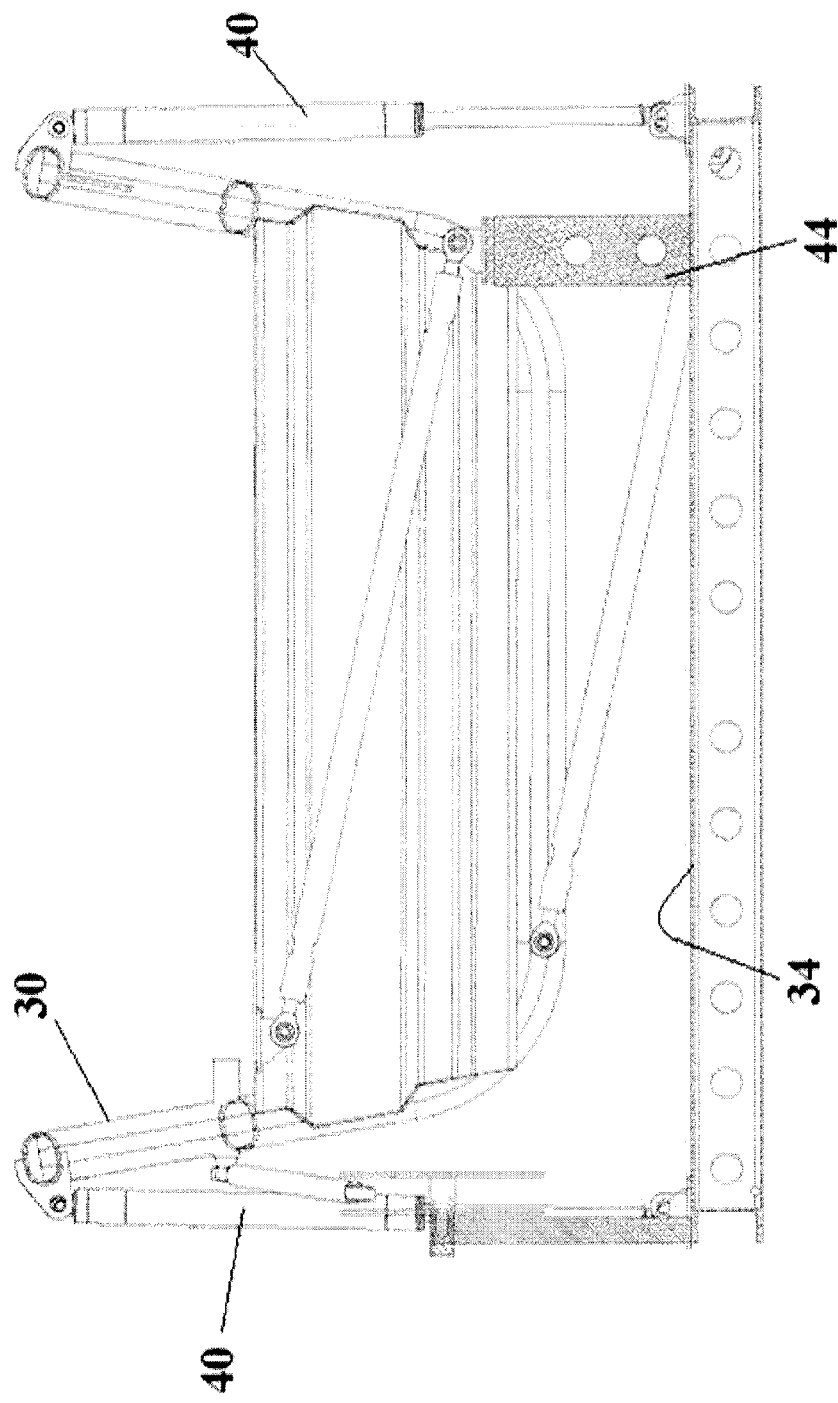
FIG. 10 is a side elevation view, in section, of the embodiment illustrated in FIG. 9.
Figure 11:
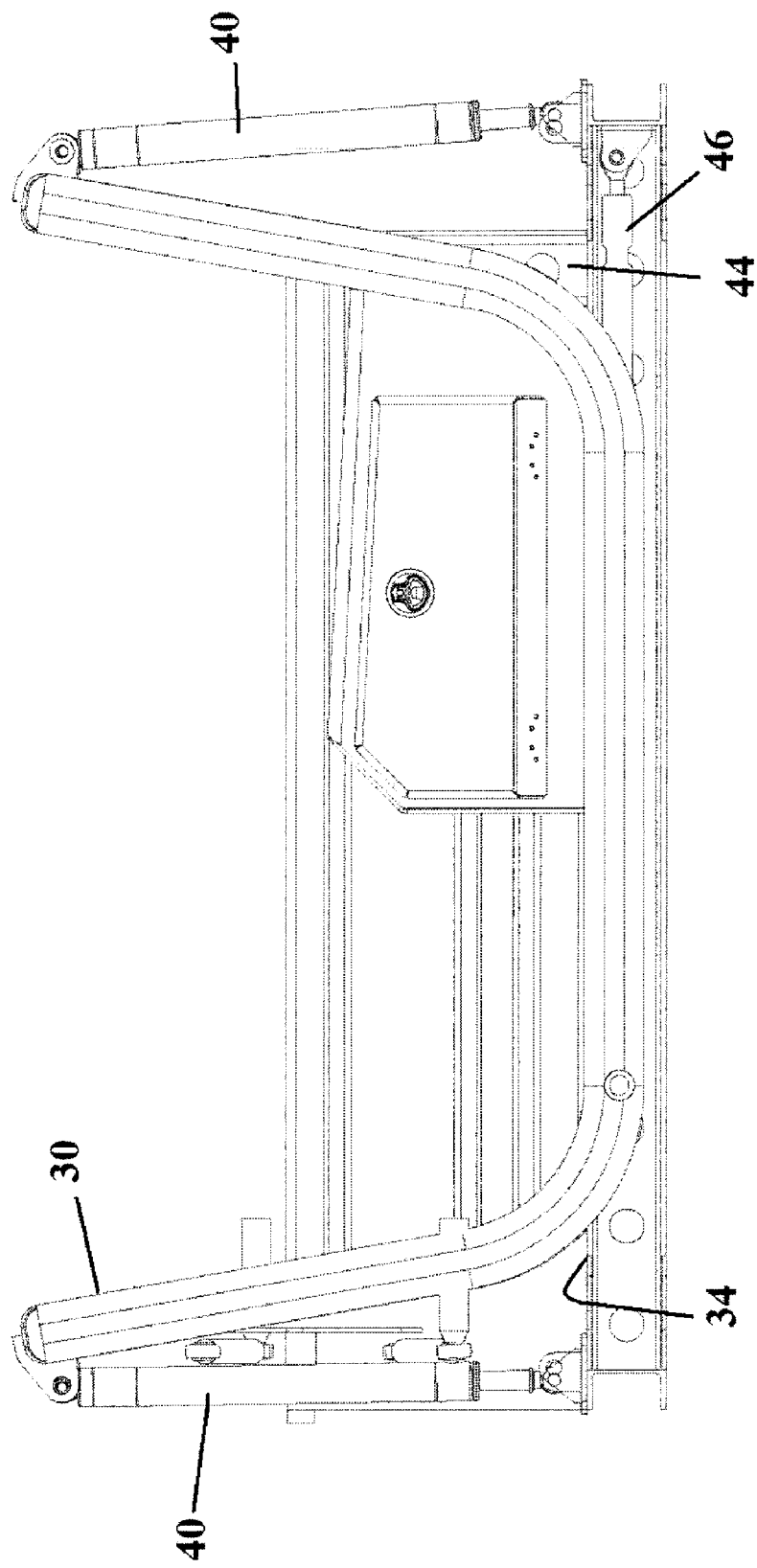
FIG. 11 is a side elevation view of the embodiment illustrated in FIG. 9, in the bottom under-load position.
Figure 12:
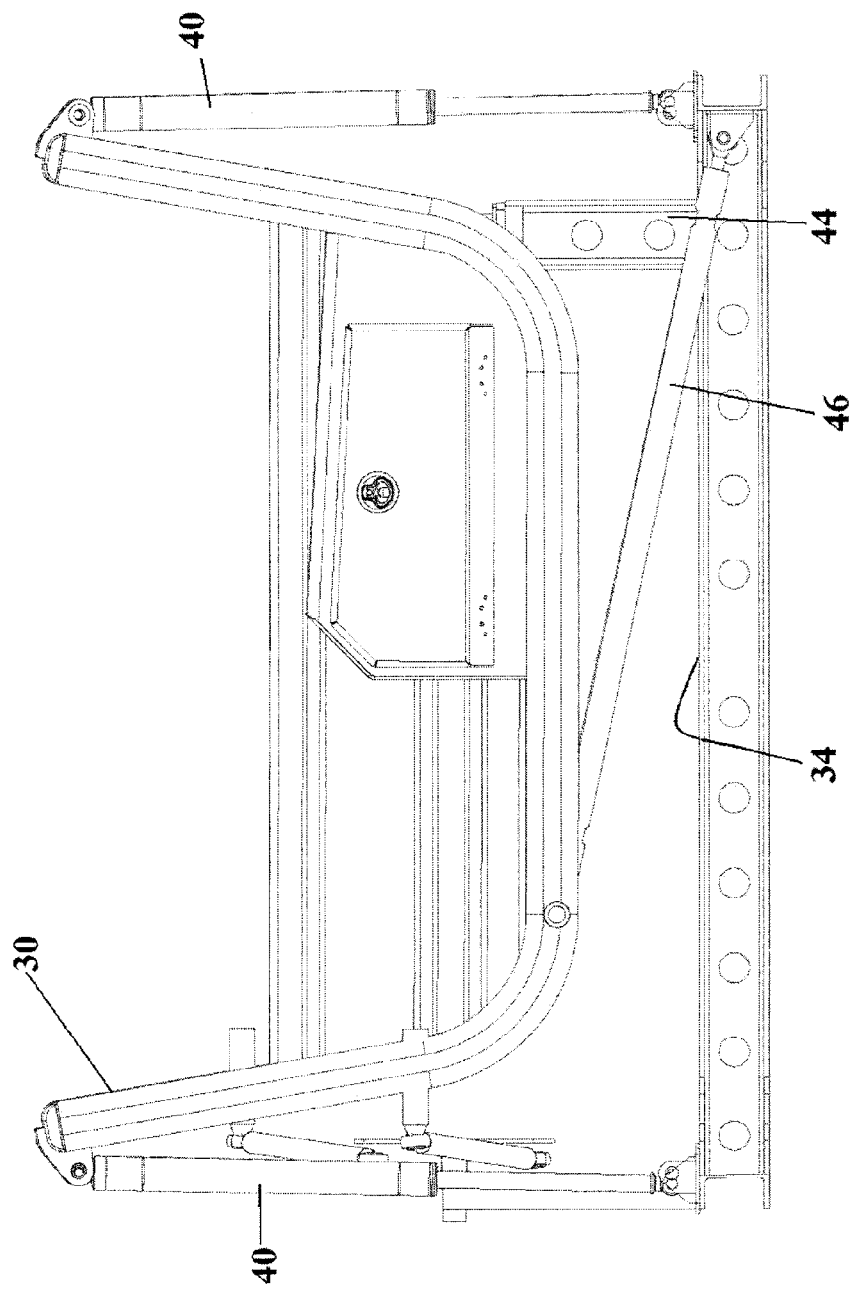
FIG. 12 is a side elevation view of the embodiment of illustrated in FIG. 9, in the at-rest position.

Another embodiment is shown in FIGS. 7 and 8. The embodiment shown in FIGS. 7 and 8 is similar to the embodiment shown in FIGS. 1 through 6, except that as shown most clearly in FIG. 7, upper spar 42 is shorter than lower spars 46, 48, and the distal end of upper spar 42 is pivotally connected to an adjustable mount 72 on passenger module 30. Depending on the location of the distal end of the upper spar 42 in the adjustable mount 72, this configuration causes the passenger module to tilt backwards as it moves from the at-rest position towards the full-load bottom position (as shown in FIG. 8).

The configuration of adjustable mount 72 shown in the drawings, which essentially comprises a pin and sets of aligned holes, is simple and robust, but it does require that passenger module 30 be supported relative to deck 34 when the distal end of upper spar 42 is moved from one connection location to another. Alternative, albeit more complicated, means for adjusting the connection location may be desirable for some applications. For example, the distal end of upper spar 42 may be constrained within a generally vertical pathway attached to passenger module 30, wherein relative vertical movement of the distal end of upper spar 42 along the pathway is controlled by suitable means, such as a worm gear or other suitable mechanical linkage, or perhaps hydraulically (that is, by means of a hydraulic ram connected between passenger module 30 and the distal end of upper spar 42). Further alternatively, adjustable mount 72, and alternatives to adjustable mount 72, may be located on pedestal 44 rather than on passenger module 30, such that the connection location of the distal end of upper spar 42 on passenger module 30 is fixed and the connection location of the proximal end of upper spar 42 on pedestal 44 is adjustable.

As a further alternative, instead of adjusting the relative orientation of upper spar 42, the suspension system could be configured so as to permit adjustment of the relative orientation of lower spars 46, 48. However, as there are two lower spars 46, 48 and only one upper spar 42, this alternative appears to be less desirable.

Figure 13:
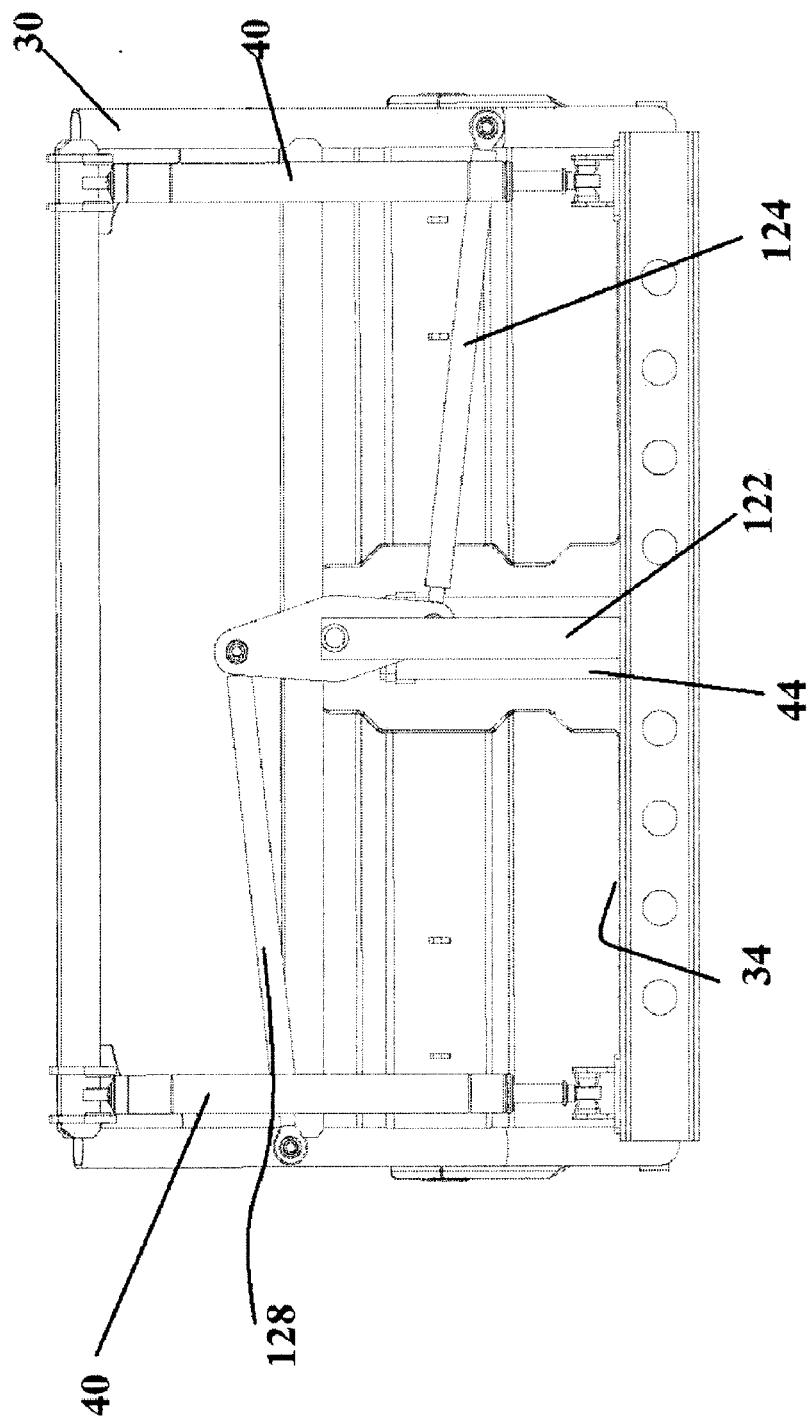
FIG. 13 is a front elevation view of the embodiment illustrated in FIG. 9, in the bottom under-load position.
Figure 14:
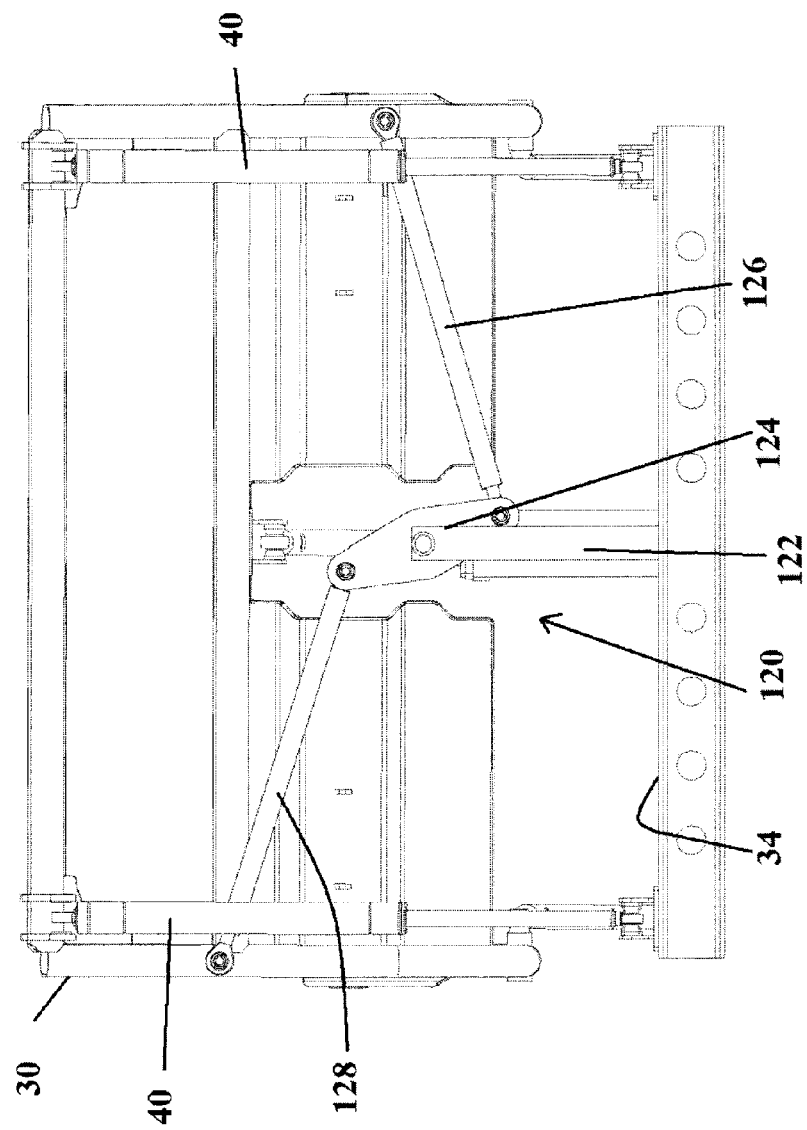
FIG. 14 is a front elevation view of the embodiment illustrated in FIG. 9, in the at-rest position.
Figure 15:
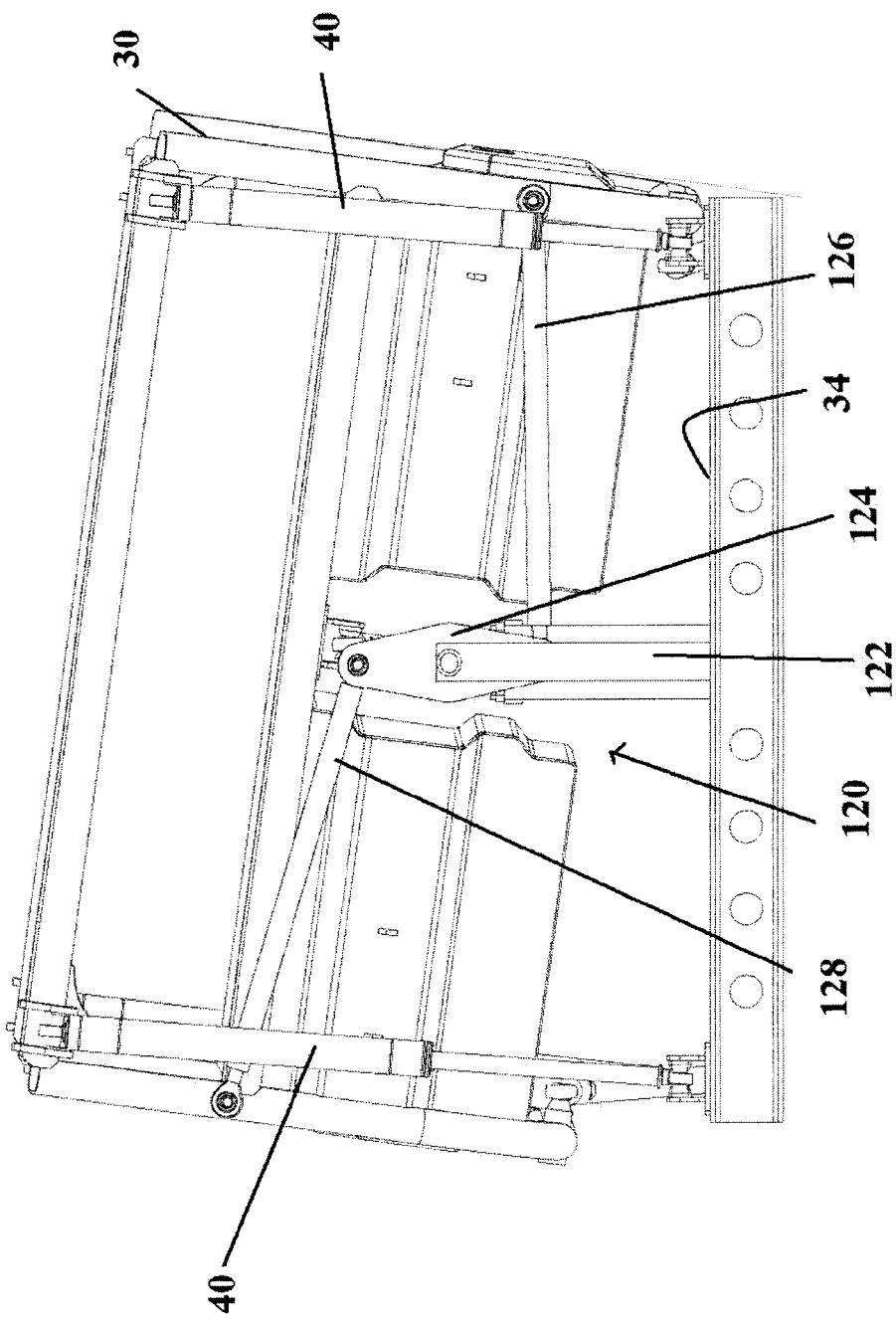
FIG. 15 is a front elevation view of the embodiment illustrated in FIG. 9, showing the passenger module rolled to port relative to the deck (i.e. rolled towards the right side of the image).
Figure 16:
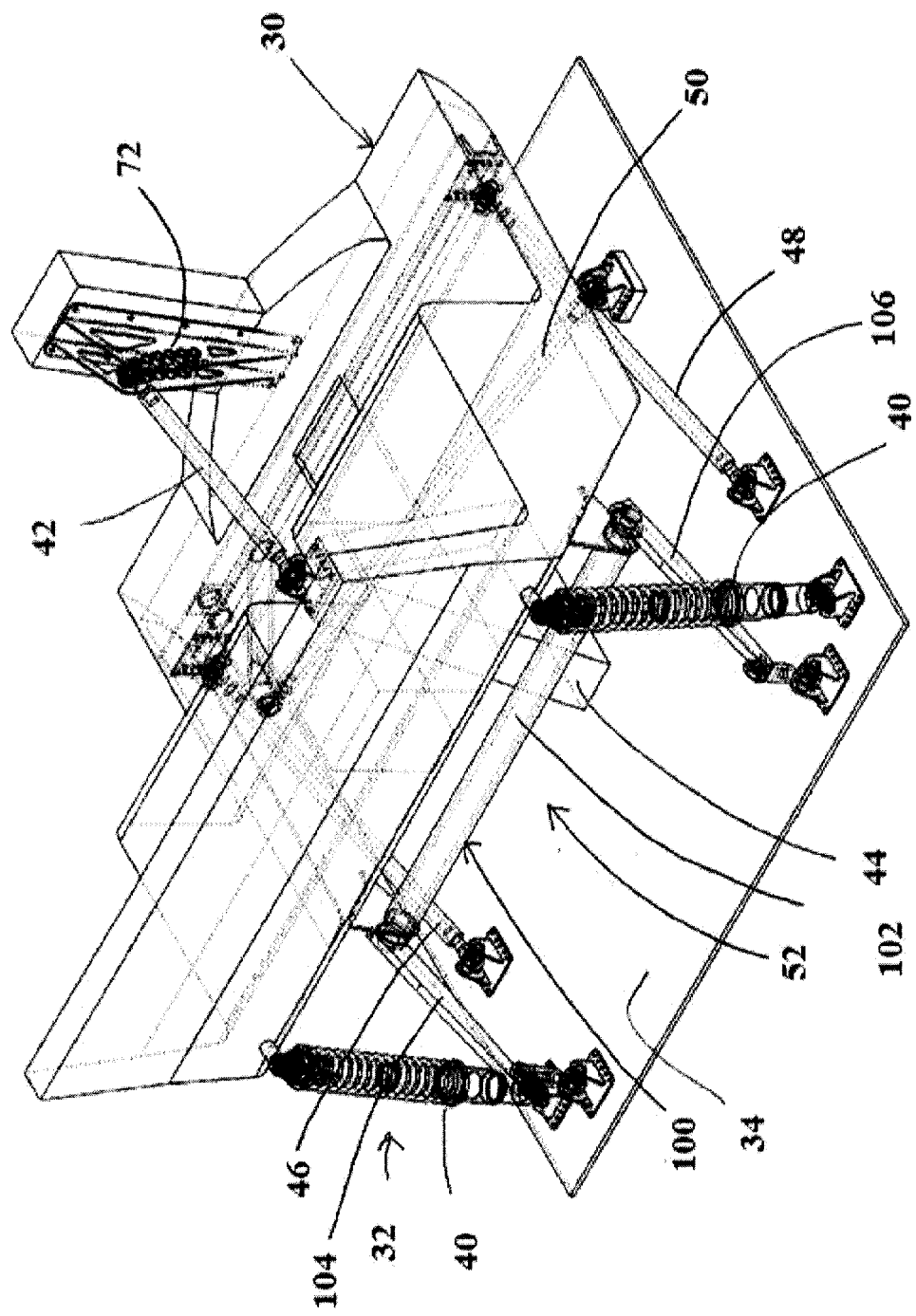
FIG. 16 is a transparent perspective view of a suspension system with panhard rod and anti-sway mechanism embodiment of the present invention.

Referring to FIGS. 9 through 15, there is illustrated another embodiment. The embodiment shown in FIGS. 9 through 15 is similar to the embodiment shown in FIGS. 1 through 6, except that instead of a panhard rod 50, a Watts linkage 120 is provided. Referring to FIG. 13, Watt's linkage 120 includes a Watt's pedestal 122 and a Watt's link 124 rotatably mounted to Watt's pedestal 122. An upper Watt's rod 126 is pivotally mounted at one end to Watt's link 124 and at the other end to passenger module 30. A lower Watt's rod 128 is pivotally mounted at one end to Watt's link 124 (at a location opposite the mounting location of upper Watt's rod 126) and at the other end to the passenger module 30. As shown in FIGS. 13 through 15, Watt's linkage permits vertical movement of passenger module 30 relative to deck 34, with minimal lateral movement of passenger module 30 relative to deck 34.

Referring to FIGS. 16 through 56, alternative embodiments will be described hereinafter. In FIGS. 16 through 29 and 33 through 35, passenger module 30 is represented in a simplified stylized manner as essentially comprising two side by-side bench seats. However, in an actual installation, the passenger module typically comprises several other features, including: contoured seats, windscreens, covers, vessel controls etc. As well, the passenger module may comprise more than two individual seats.

Three-point suspension system 32 includes two struts 40, upper spar 42, spar pedestal 44, port lower spar 46, starboard lower spar 48, and panhard rod 50.

Figure 17:
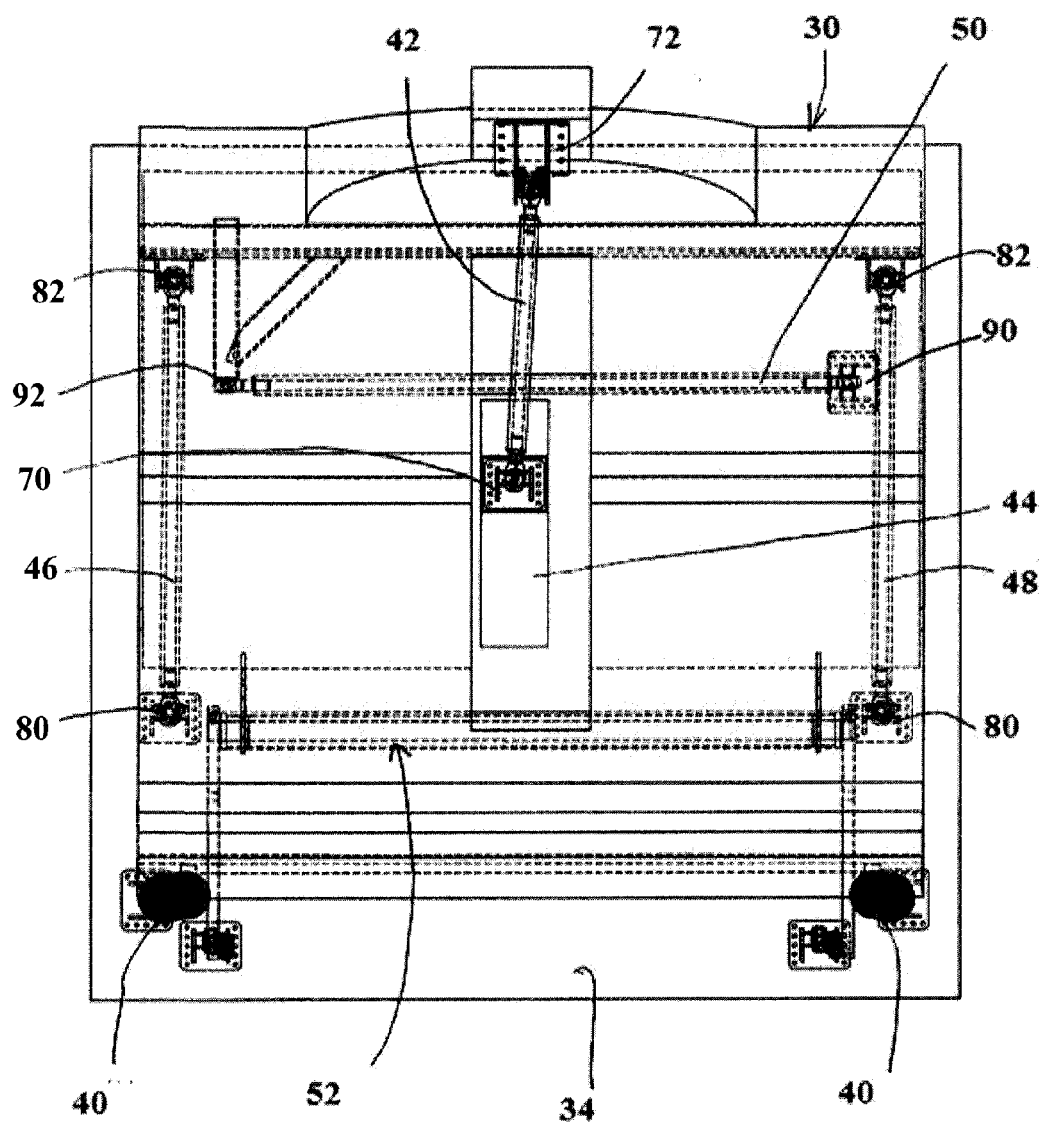
FIG. 17 is a transparent top plan view of the embodiment of FIG. 16.
Figure 18:
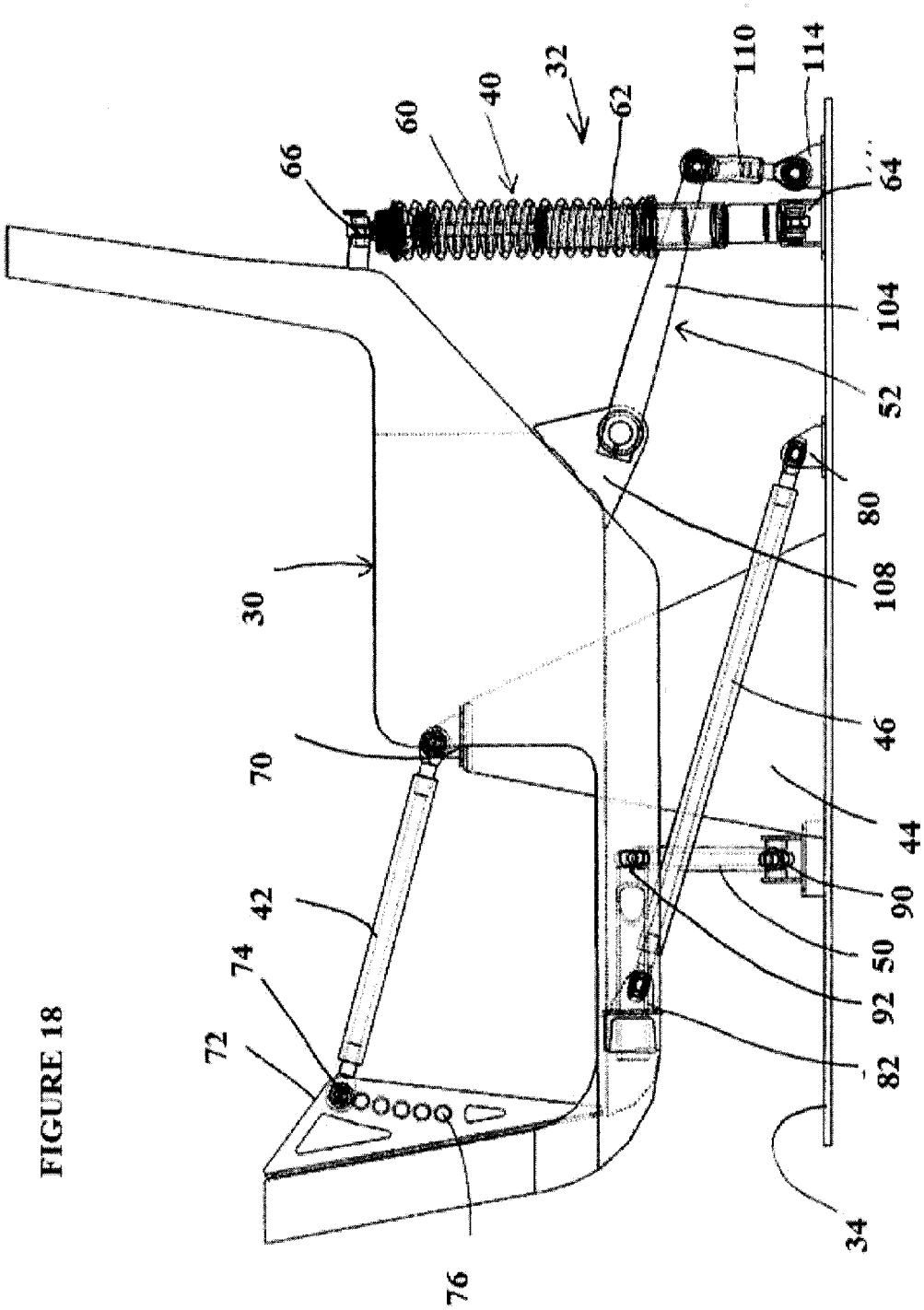
FIG. 18 is a transparent side elevation view of the embodiment of FIG. 16, with the distal end of the upper spar at the top of the adjustable mount and the passenger module in the at-rest position.
Figure 19:
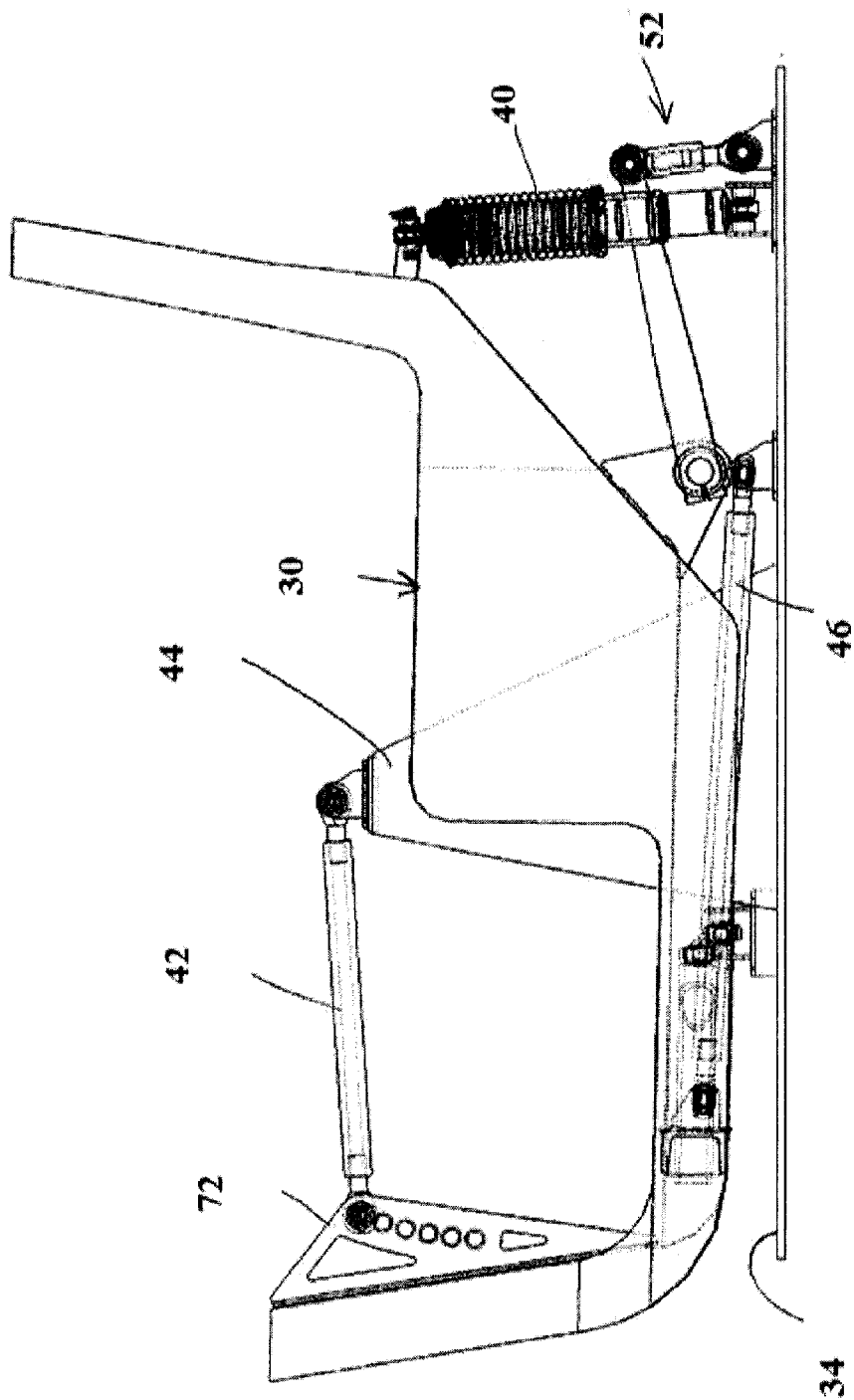
FIG. 19 is a transparent side elevation view of the embodiment of FIG. 16, with the distal end of the upper spar at the topmost mount location of the adjustable mount and the passenger module in the bottom under-load position.
Figure 20:
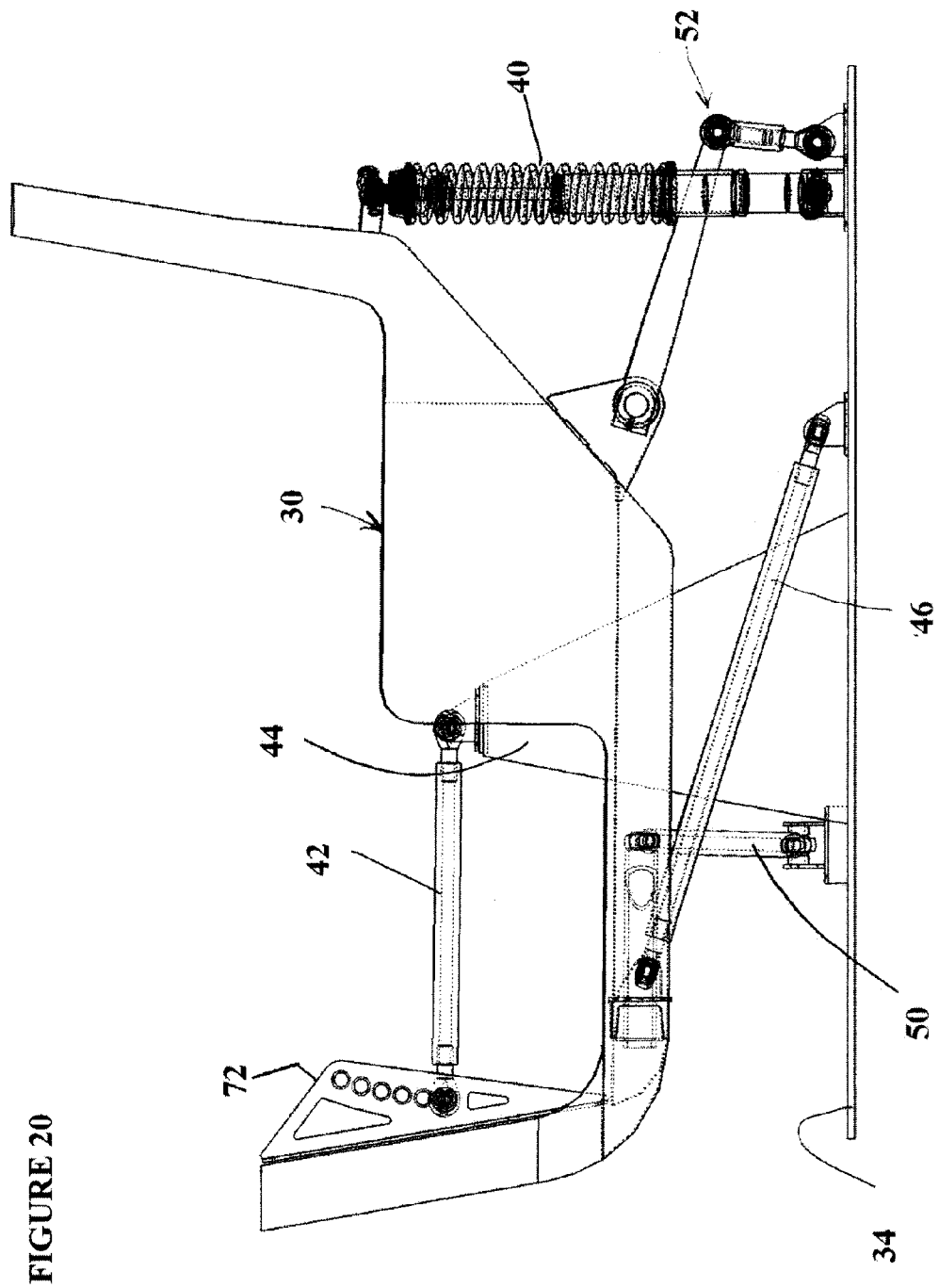
FIG. 20 is a transparent side elevation view of the embodiment of FIG. 16, with the distal end of the upper spar at the lowermost mount location of the adjustable mount and the passenger module in the at-rest position.
Figure 21:
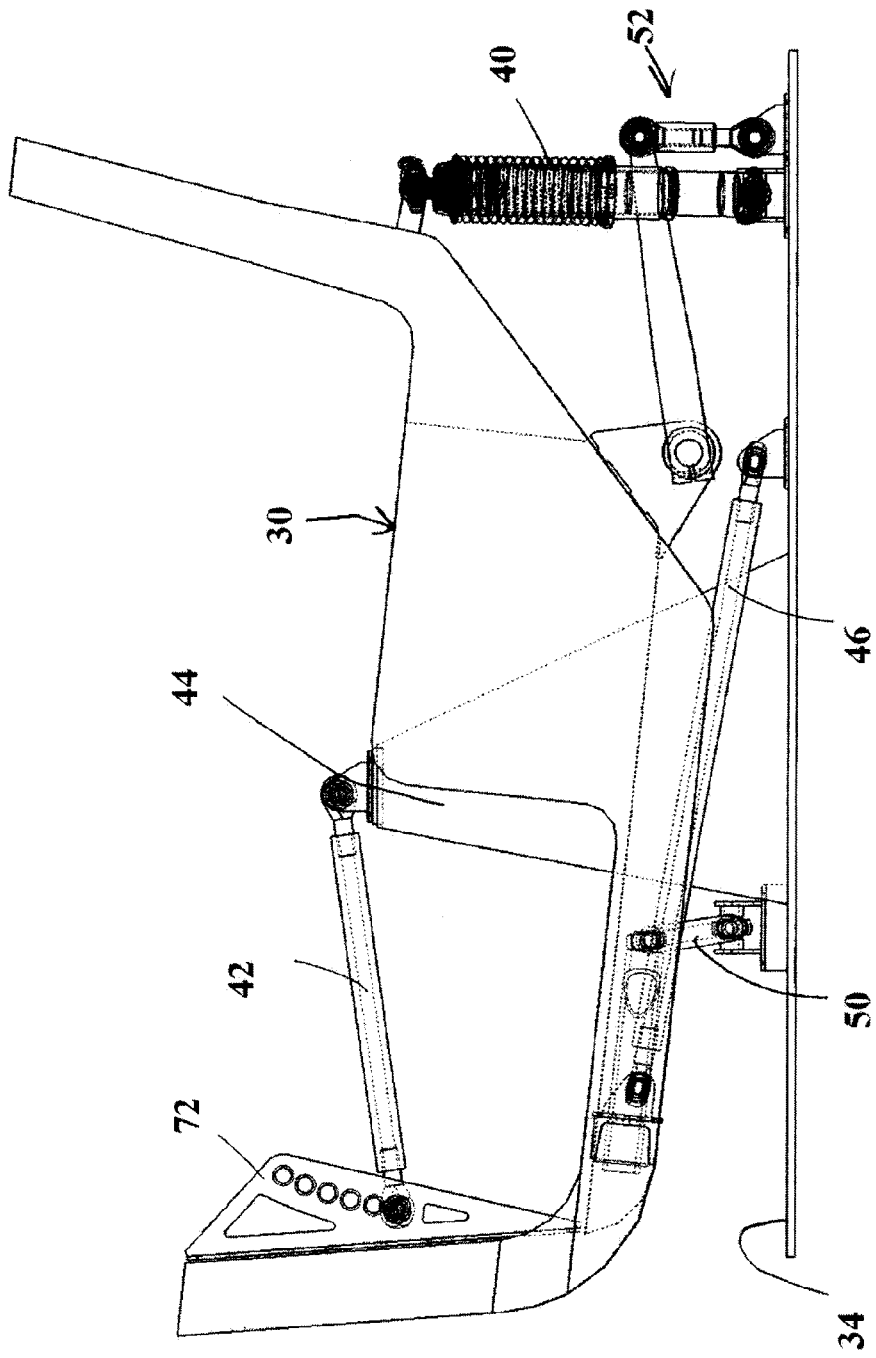
FIG. 21 is a transparent side elevation view of the embodiment of FIG. 16, with the distal end of the upper spar at the lowermost mount location of the adjustable mount and the passenger module in the bottom under-load position.

Upper spar 42 extends generally fore and aft, but as is apparent in FIG. 17, upper spar 42 is angled slightly from the fore-and-aft direction to accommodate some lateral/athwart movement of passenger module 30 relative to deck 34 during use. The proximal end of upper spar 42 is pivotally mounted to a pedestal bracket 70 located on pedestal 44. The distal end of upper spar 42 is pivotally connected to an adjustable mount 72 located on the passenger module 30. As shown in FIGS. 18 through 21, adjustable mount 72 has six different connection locations for the distal end of upper spar 42. In FIGS. 18 and 19, the distal end of upper spar 42 is at adjustable mount uppermost connection location 74. In FIGS. 20 and 21, the distal end of upper spar 42 is at adjustable mount lowermost connection location 76.

Port lower spar 46 and starboard lower spar 48 each extend generally fore and aft. The proximal end of each of port lower spar 46 and starboard lower spar 48 is pivotally mounted to lower-spar deck bracket 80. The distal end of each of port lower spar 46 and starboard lower spar 48 is pivotally mounted to lower-spar module bracket 82.

Panhard rod 50 extends generally athwart. The proximal end of panhard rod 50 is pivotally mounted to the panhard deck mount 90. The distal end of panhard rod 50 is pivotally mounted to panhard module mount 92.

Anti-sway assembly 52 includes a torsion bar 100 (comprising: a torsion spring 102 extending generally athwart; a port torsion arm 104 connected to the port end of torsion spring 102 and extending generally fore and aft; and a starboard torsion arm 106 connected to the starboard end of torsion spring 102 and extending generally fore and aft) mounted to passenger module 30 with two torsion-bar module mounts 108. The end of port torsion arm 104 opposite torsion spring 102 is pivotally connected to the distal end of port arm/deck link 110. The end of starboard torsion arm 106 opposite torsion spring 102 is pivotally connected to the distal end of starboard arm/deck link 112. The proximal end of each of port arm/deck link 110 and starboard arm/deck link 112 is pivotally connected to one of two link deck brackets 114.

In use, fast-moving relatively small watercraft are subject to complicated forces that cause the vessels to pitch, yaw, roll, rise, fall, decelerate and accelerate. For clarity, in what follows, conceptually discrete elements of those forces and motions are discussed separately.

When a fast-moving relatively small watercraft hits a wave at essentially a right angle to the wave, the vessel typically rapidly moves upward and decelerates. Typically the upward movement causes a greater shock than the deceleration. As shown in FIGS. 18 through 25, three-point suspension system 32 attenuates the shock of such rapid movement and deceleration on passengers in passenger module 30 by permitting passenger module 30 to move in a controlled manner relative to the vessel.

Struts 40 absorb vertical shocks and slow the vertical movement of passenger module 30 as compared to the vessel. In addition, the geometry of upper spar 42 and lower spars 46,48 is such that the generally vertical movement of passenger module 30 relative to the vessel is non-linear. As shown in FIGS. 18 through 21, port lower spar 46 and starboard lower spar 48 are aligned one with the other, such that (leaving aside for the moment athwart/lateral forces) they act as one lower spar. As upper spar 42 is of a length different from that of lower spars 46, 48 (upper spar 42 being shorter than the lower spars 46, 48), the distal end of upper spar 42 and the distal ends of lower spars 46, 48 (i.e. the ends attached to the passenger module 30) follow arcs of different radii. Thus, as passenger module 30 moves vertically relative to the vessel, the fore-and-aft movement that upper spar 42 and lower spars 46, 48 impart to the passenger module 30 differ. In the result, passenger module 30 tilts relative to the vessel as passenger module 30 moves vertically relative to the vessel. This tilting of the passenger module 30 dynamically reorients passenger module 30, and the passengers within it, relative to the direction of the residual combined vertical shock and deceleration force (that is, residual after attenuation via the three-point suspension system 32) such that the residual combined force is preferably not perpendicular to the seat bottoms but rather is angled towards the seat backs, such that force experienced by the passengers tends to push the passengers back into their seats.

Further, adjustable mount 72 permits the range of tilt to be modified, as may be desirable in light of passengers of different weights and different sea conditions, for example. Comparing FIGS. 18 and 19 (and FIGS. 22 and 23), which show passenger module 30 in the no-load at-rest position and the full-load bottom position, with the distal end of upper spar 42 at adjustable mount uppermost connection location 74; with FIGS. 20 and 21 (and FIGS. 24 and 25), which show passenger module 30 in the no-load at-rest position and the full-load bottom position, with the distal end of upper spar 42 at adjustable mount lowermost connection location 76, it can be seen that different tilt responses can be readily obtained.

Fast-moving relatively small watercraft are typically subject to significant dynamic forces that are more complicated than those described above with respect to such a vessel hitting waves at essentially a right angle to the waves. For example, often waves are met at an angle other than a right angle, in which case such waves, in addition to rapidly moving the vessel upwards and decelerating the vessel, also impart lateral/athwart forces to the vessel, which depending how same are aligned with the vessels center of gravity and center of lateral resistance, tend to cause the vessel to shift laterally and/or to roll (the term "roll", when used with watercraft means a dynamic, and typically oscillating, partial rotation generally about the vessels longitudinal axis). As well, all watercraft tend to roll when turning, and such rolling may be extreme with sudden turns by fast-moving relatively small watercraft. In any event, a fast-moving relatively small watercraft will typically experience dynamic roll-inducing and lateral-movement-inducing forces.

Figure 22:
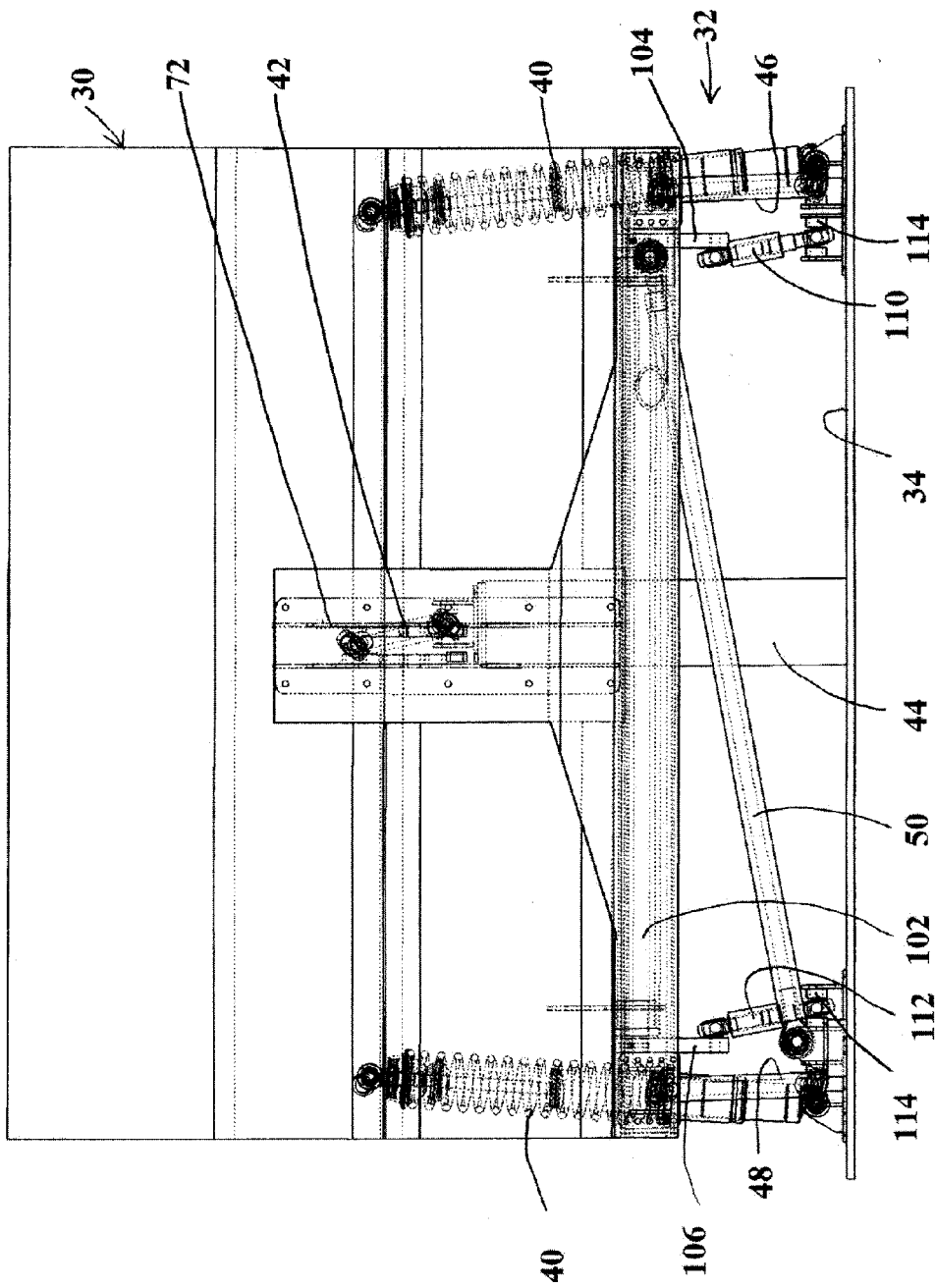
FIG. 22 is a transparent front elevation view of the embodiment of FIG. 16, with the distal end of the upper spar at the topmost mount location of the adjustable mount and the passenger module in the bottom under-load position, as shown in FIG. 18.
Figure 23:
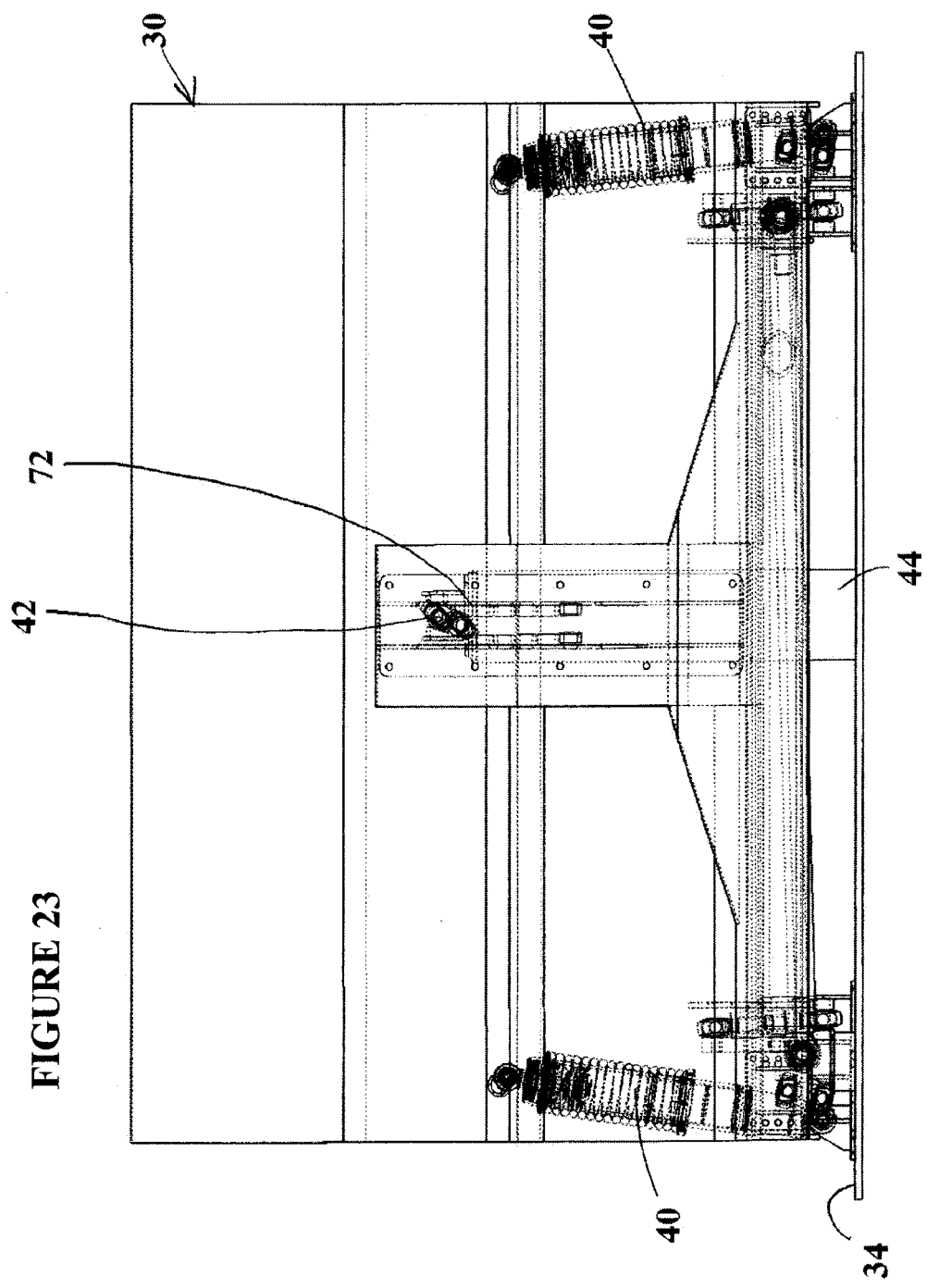
FIG. 23 is a transparent front elevation view of the embodiment of FIG. 16, with the distal end of the upper spar at the topmost mount location of the adjustable mount and the passenger module in the bottom under-load position, as shown in FIG. 19.
Figure 24:
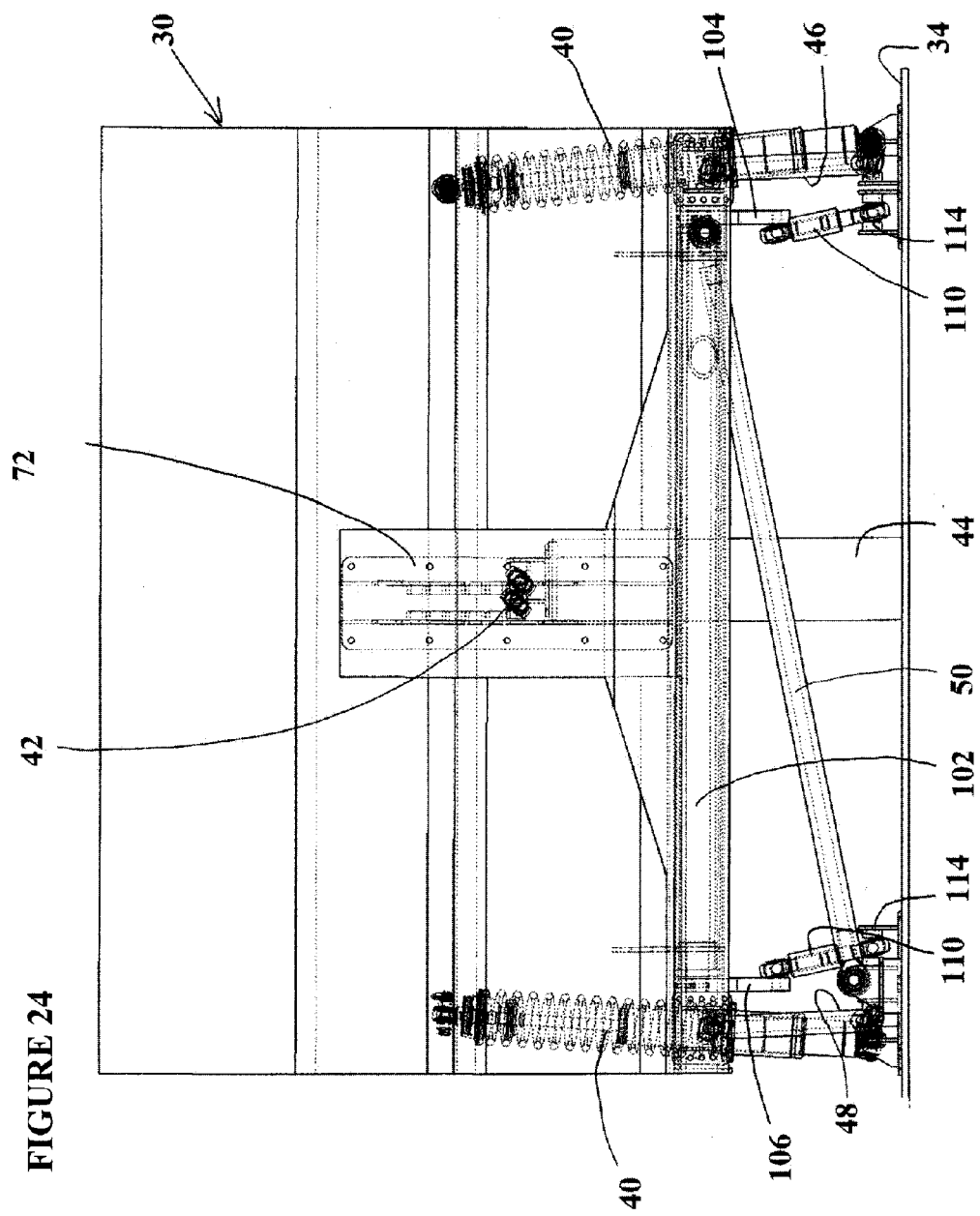
FIG. 24 is a transparent front elevation view of the embodiment of FIG. 16, with the distal end of the upper spar at the lowermost mount location of the adjustable mount and the passenger module in the at-rest position, as shown in FIG. 20.
Figure 25:
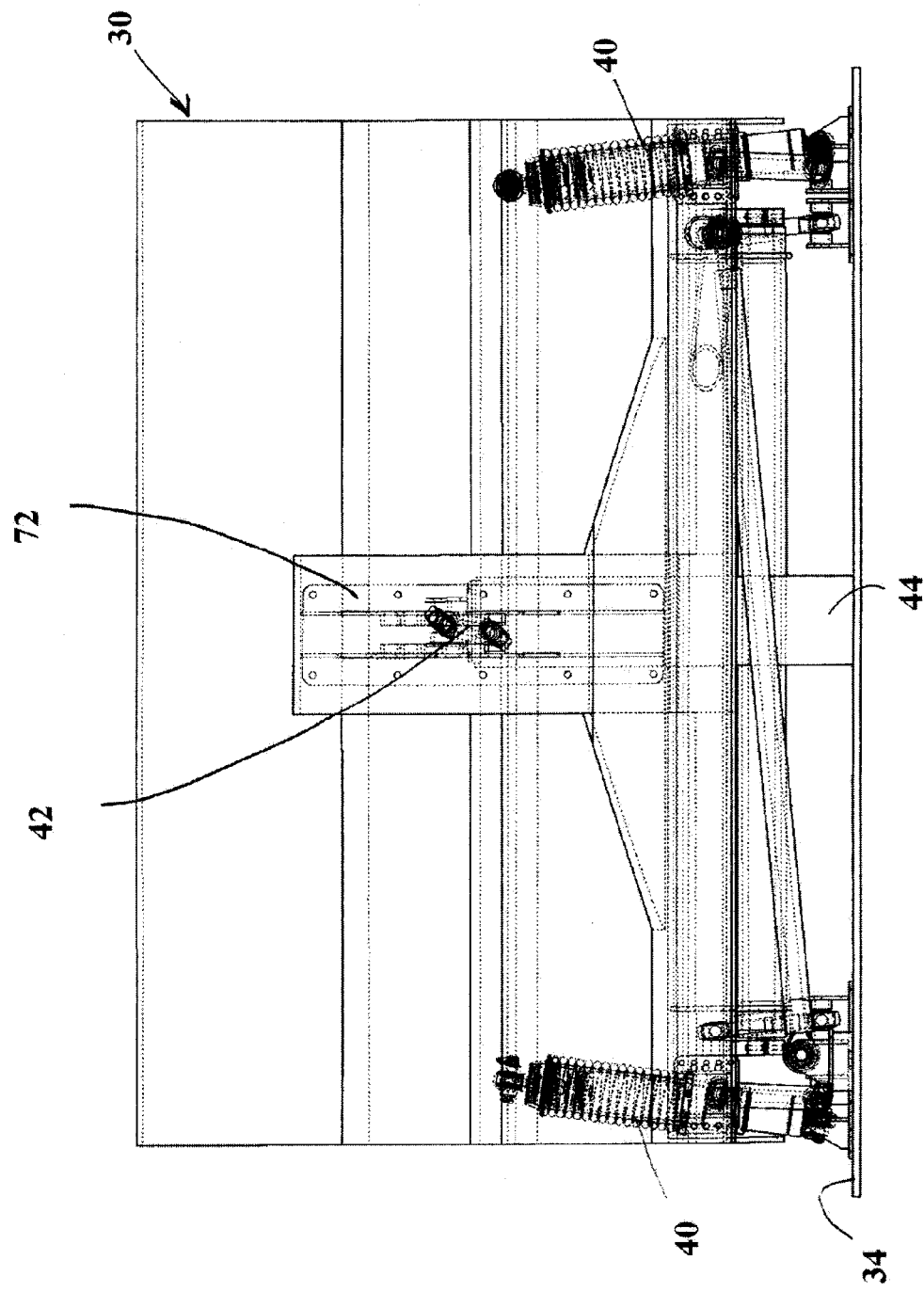
FIG. 25 is a transparent front elevation view of the embodiment of FIG. 16, with the distal end of the upper spar at the lowermost mount location of the adjustable mount and the passenger module in the bottom under-load position, as shown in FIG. 21.

As shown in FIGS. 22 through 25, panhard rod 50 prevents more than minimal lateral movement of passenger module 30 relative to deck 34. As the distal end of panhard rod 50 moves in an arc as passenger module 30 moves vertically, panhard rod 50 induces a slight lateral movement of passenger module 30 during vertical movement of passenger module 30. This slight lateral movement of passenger module 30 relative to deck 34 is accommodated generally by the various connections between the components of three-point suspension system 32 and passenger 30 and deck being configured to permit some relative lateral movement; and more particularly by the location of pedestal 44, which, as shown in FIGS. 17 and 22, is offset from alignment with adjustable mount 72, such that, when passenger module 30 is in the no-load at-rest position, from a top-plan-view perspective upper spar 42 is not parallel to the lower spars 46, 48. As indicated in FIG. 23, when passenger module 30 is in the full-load bottom position, the passenger module 30 has shifted laterally relative to pedestal 44.

Figure 28:
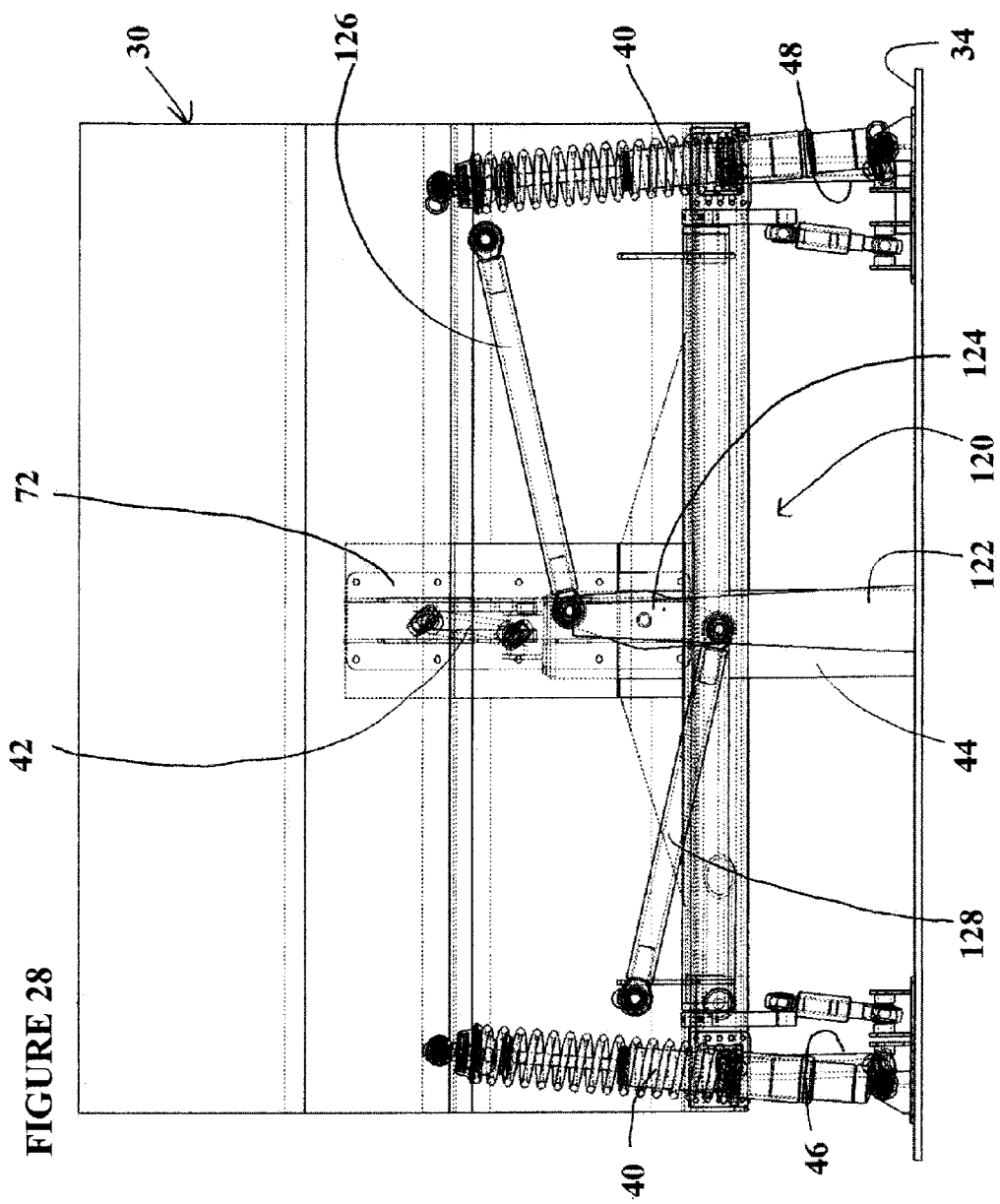
FIG. 28 is a transparent rear elevation view of an embodiment of the present invention having a double-arm Watt's linkage for resisting lateral movement, shown with the passenger module in the at-rest position.
Figure 29:
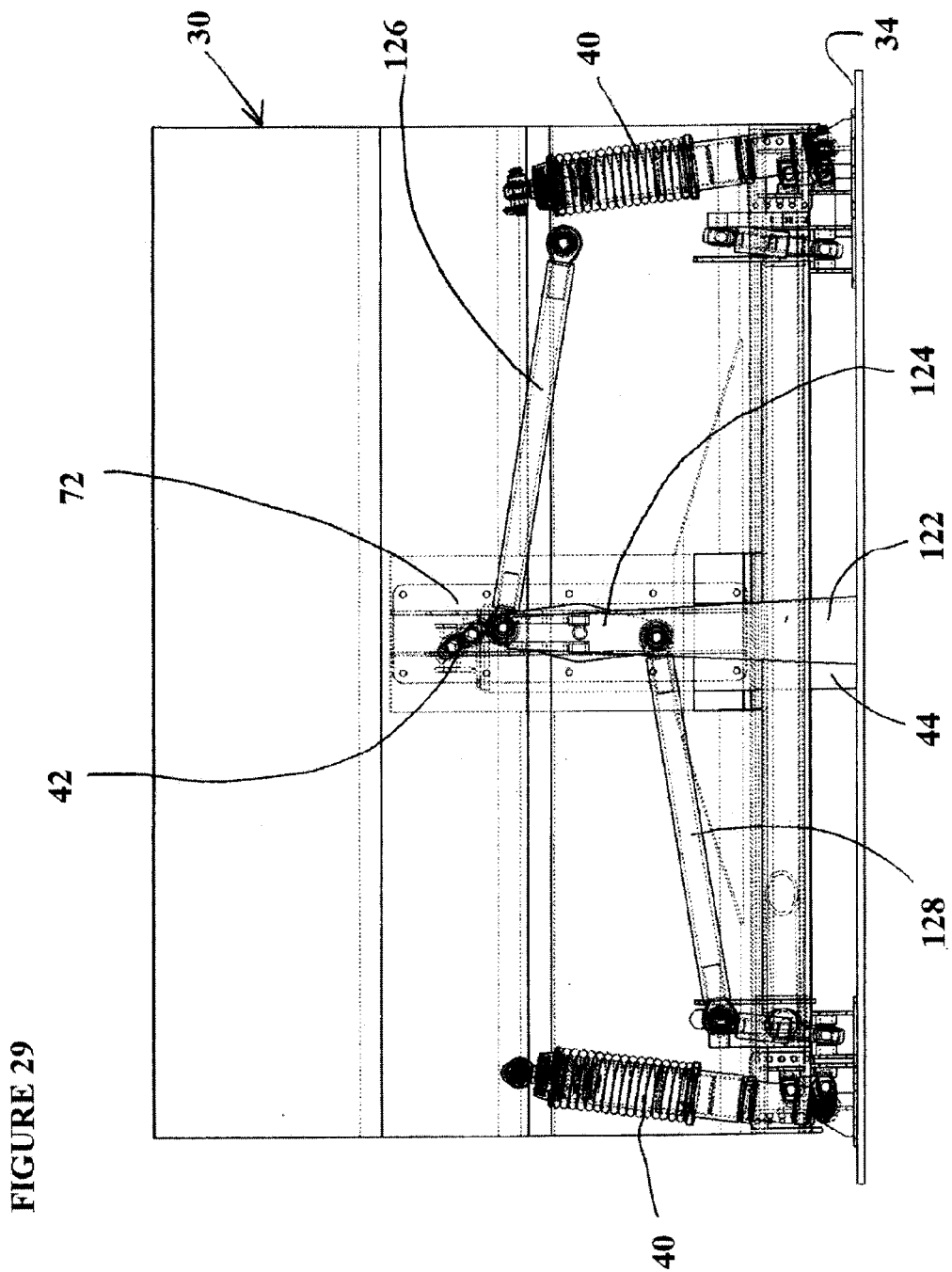
FIG. 29 is a transparent rear elevation view of the embodiment of FIG. 28, shown with the passenger module in the bottom under-load position.

As shown in FIGS. 28 and 29, and as previously described, Watt's linkage 120 is an alternative to panhard rod 50. Watt's linkage 120 includes Watt's pedestal 122 and Watt's link 124 rotatably mounted to Watt's pedestal 122. Upper Watt's rod 126 is pivotally mounted at one end to Watt's link 124 and at the other end to passenger module 30; and lower Watt's rod 128 pivotally mounted at one end to Watt's link 124 (at a location opposite mounting location of the upper Watt's rod 126) and at the other end to passenger module 30. As shown in FIGS. 28 and 29, Watt's linkage permits vertical movement of passenger module 30 relative to deck 34, with minimal lateral movement of passenger module 30 relative to deck 34.

Figure 26:
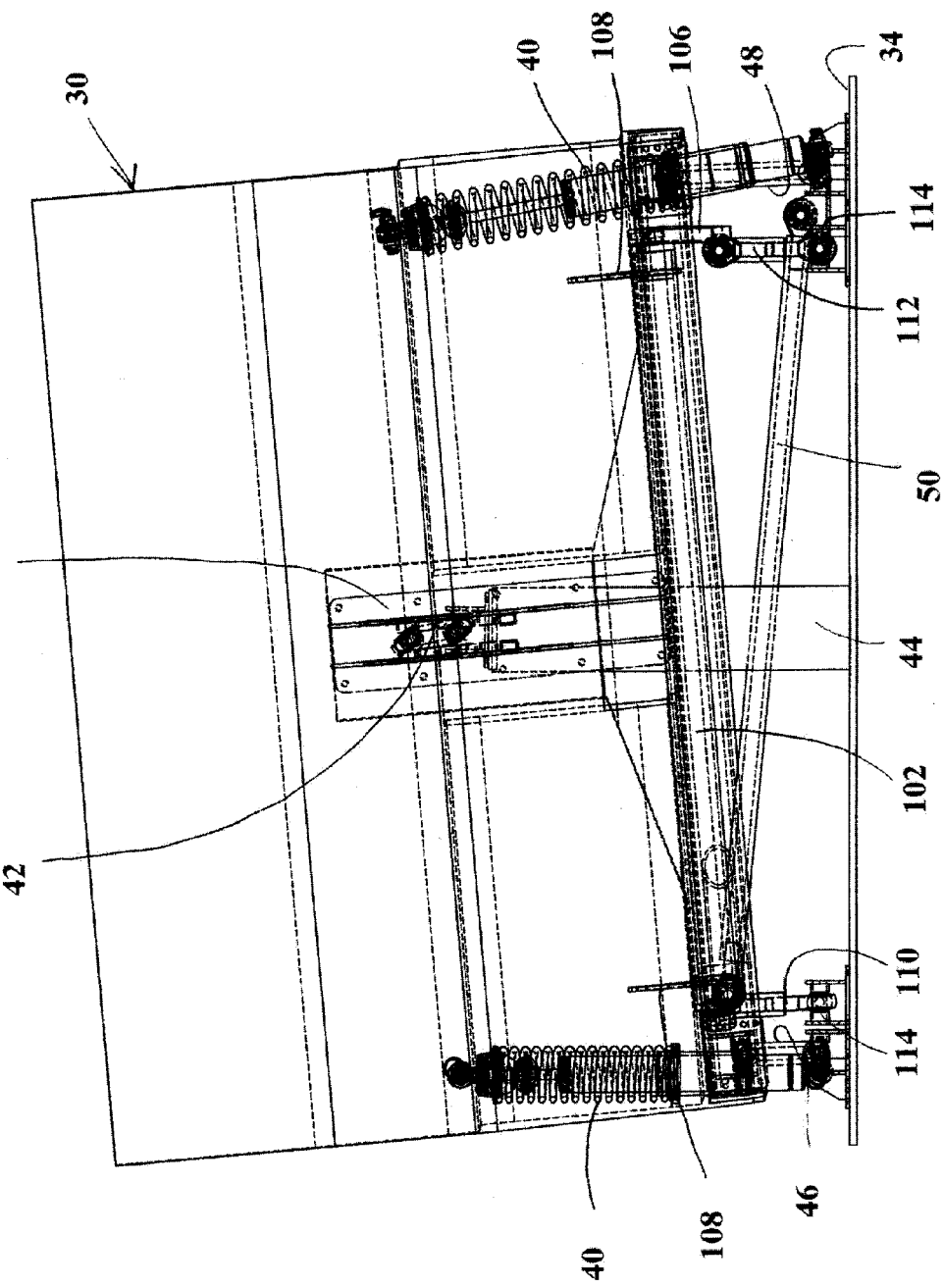
FIG. 26 is a transparent rear elevation view of the embodiment of FIG. 16, with the distal end of the upper spar at the topmost mount location of the adjustable mount and the passenger module rolled to the right (i.e. towards the starboard side of the watercraft) relative to the deck.
Figure 27:
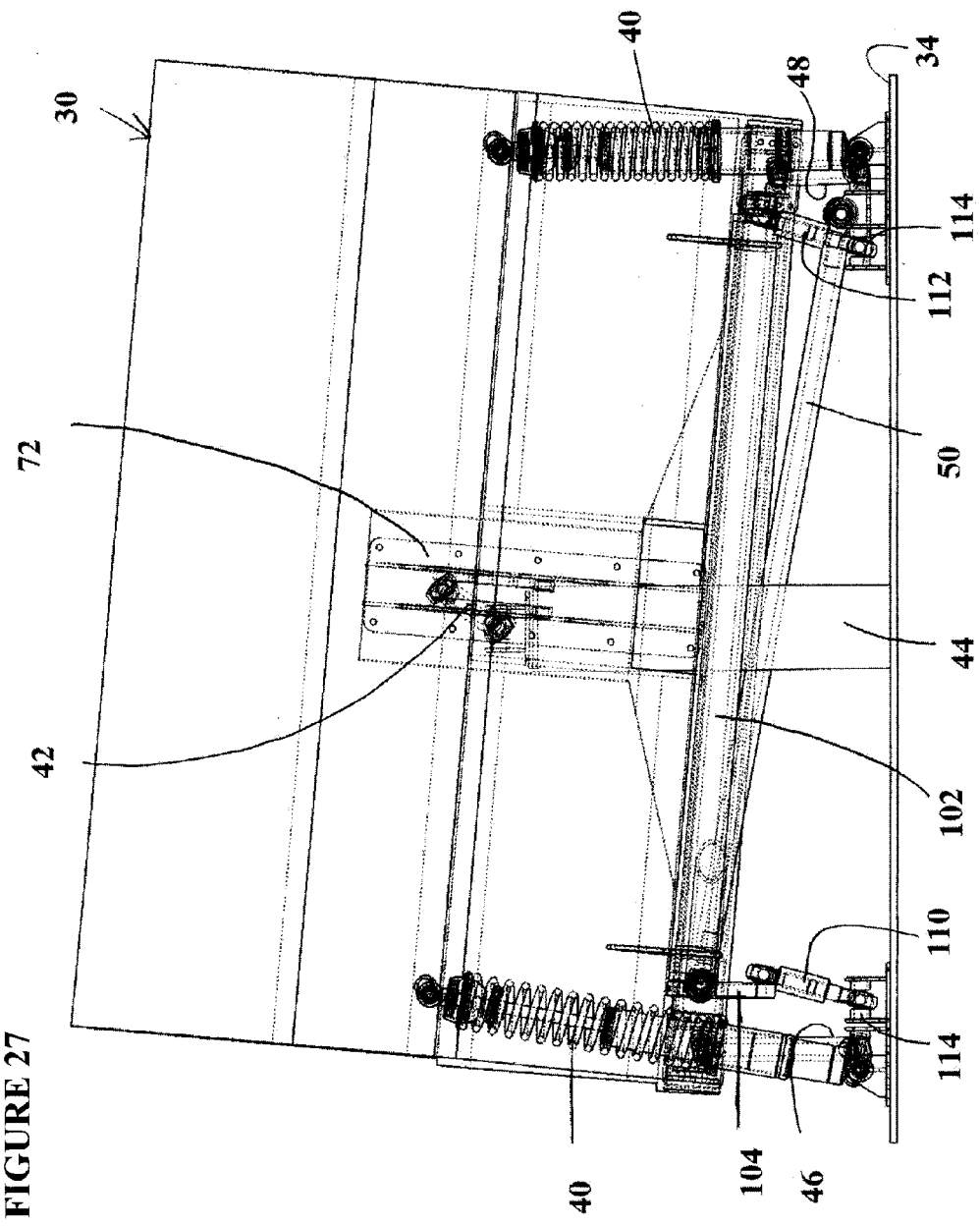
FIG. 27 is a transparent rear elevation view of the embodiment of FIG. 16, with the distal end of the upper spar at the topmost mount location of the adjustable mount and the passenger module rolled to the left (i.e. towards the port side of the watercraft) relative to the deck.

As can be seen in FIGS. 26 and 27, anti-sway assembly 52 permits controlled rolling of the vessel relative to passenger module 30 so as to attenuate the dynamic effects of such rolling as experienced by the passengers. The double-linkage configuration of anti-sway assembly 52, being the interposing of deck links 110, 112 between torsion arms 104, 106 and the deck 34, means that when passenger module 30 is merely moving generally vertically relative to deck 34, anti-sway assembly 52 does not impede the movement of passenger module 30, but rather merely follows the relative movement. However, if the vessel experiences a force tending to cause the vessel to roll, anti-sway assembly 52 attenuates this force with respect to passenger module, through twisting of the torsion bar, so as to permit deck 34 to roll laterally relative to passenger module 30.

Figure 30:
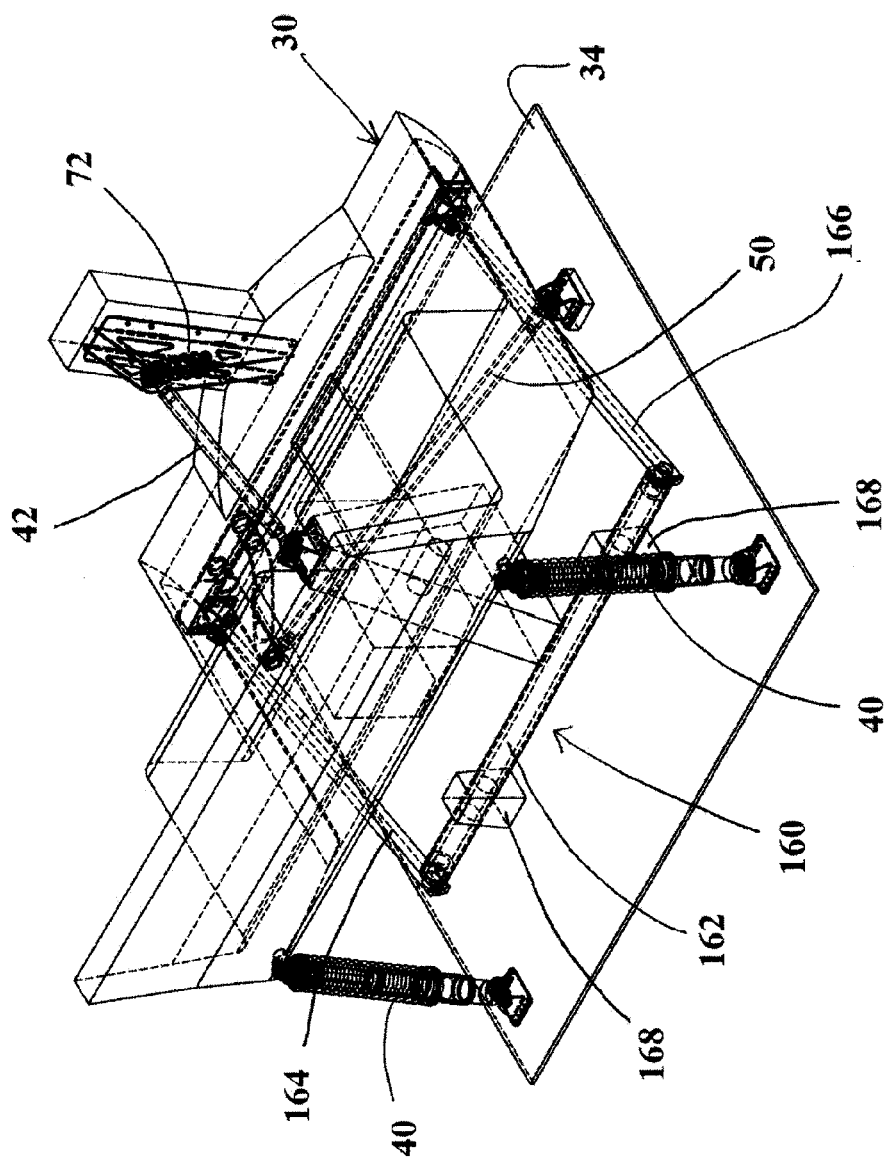
FIG. 30 is a transparent perspective view of an embodiment of the present invention having a combined lower-arm/anti-sway unit.
Figure 31:
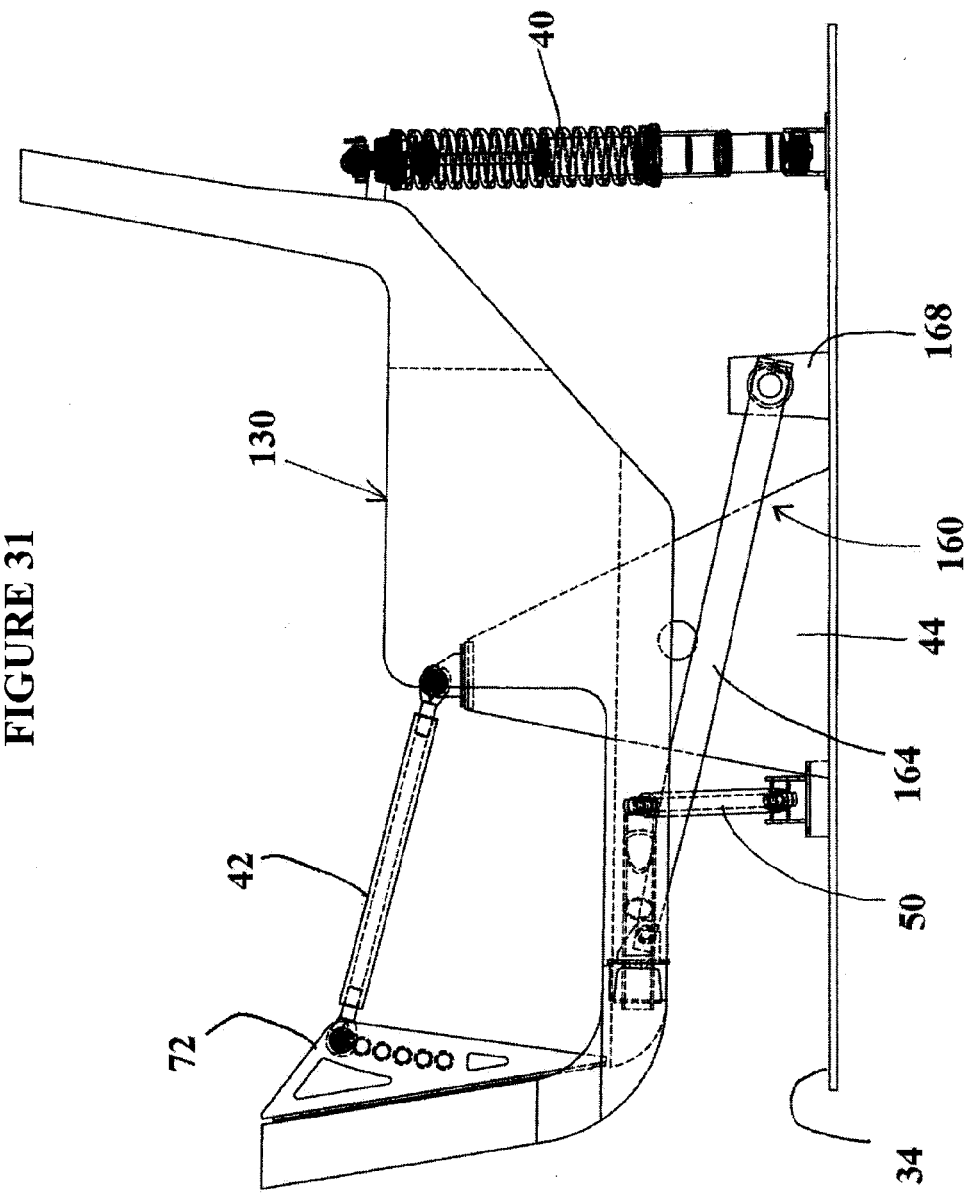
FIG. 31 is a transparent side elevation view of the embodiment of FIG. 33.
Figure 32:
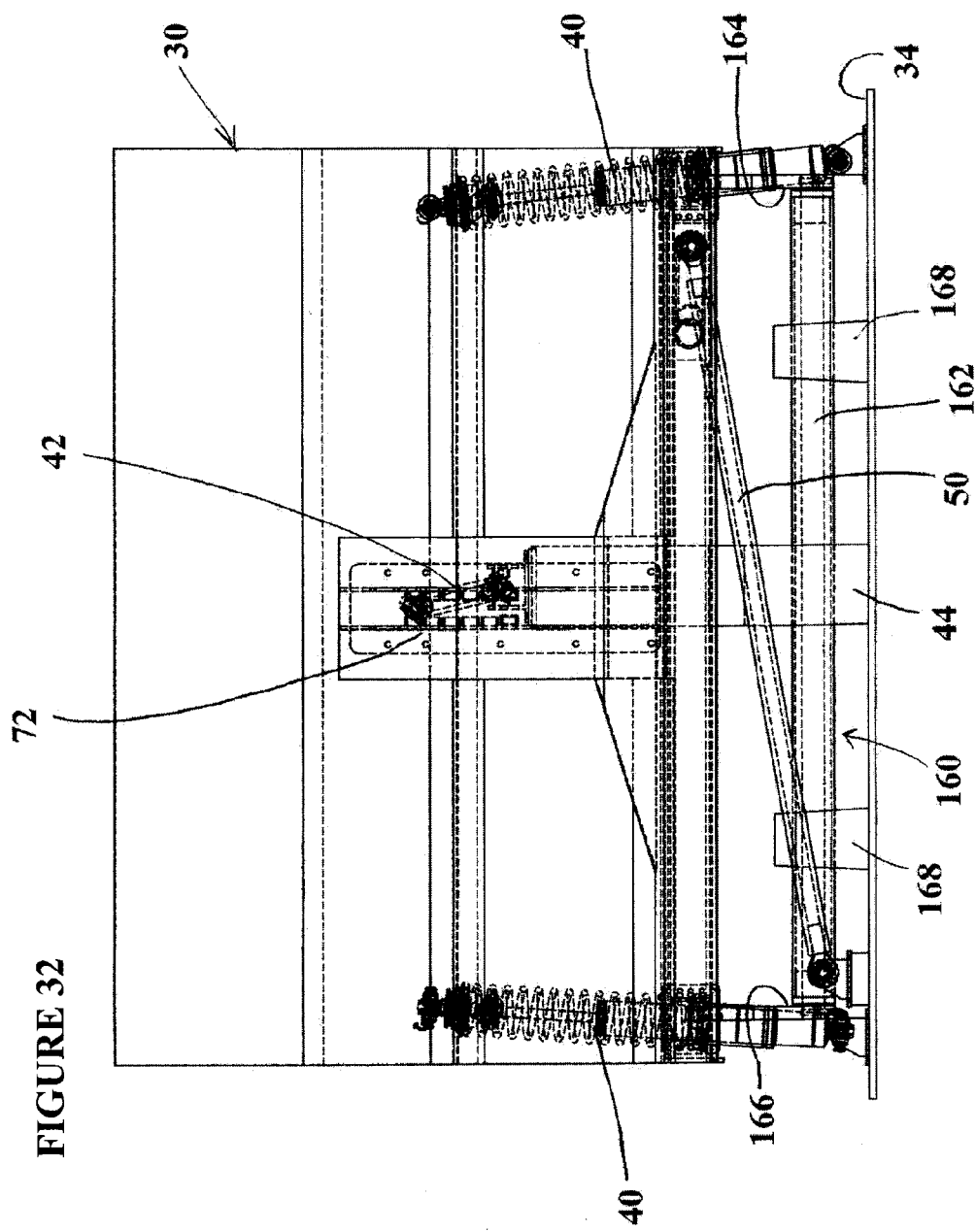
FIG. 32 is a transparent front elevation view of the embodiment of FIG. 33.
Figure 33:
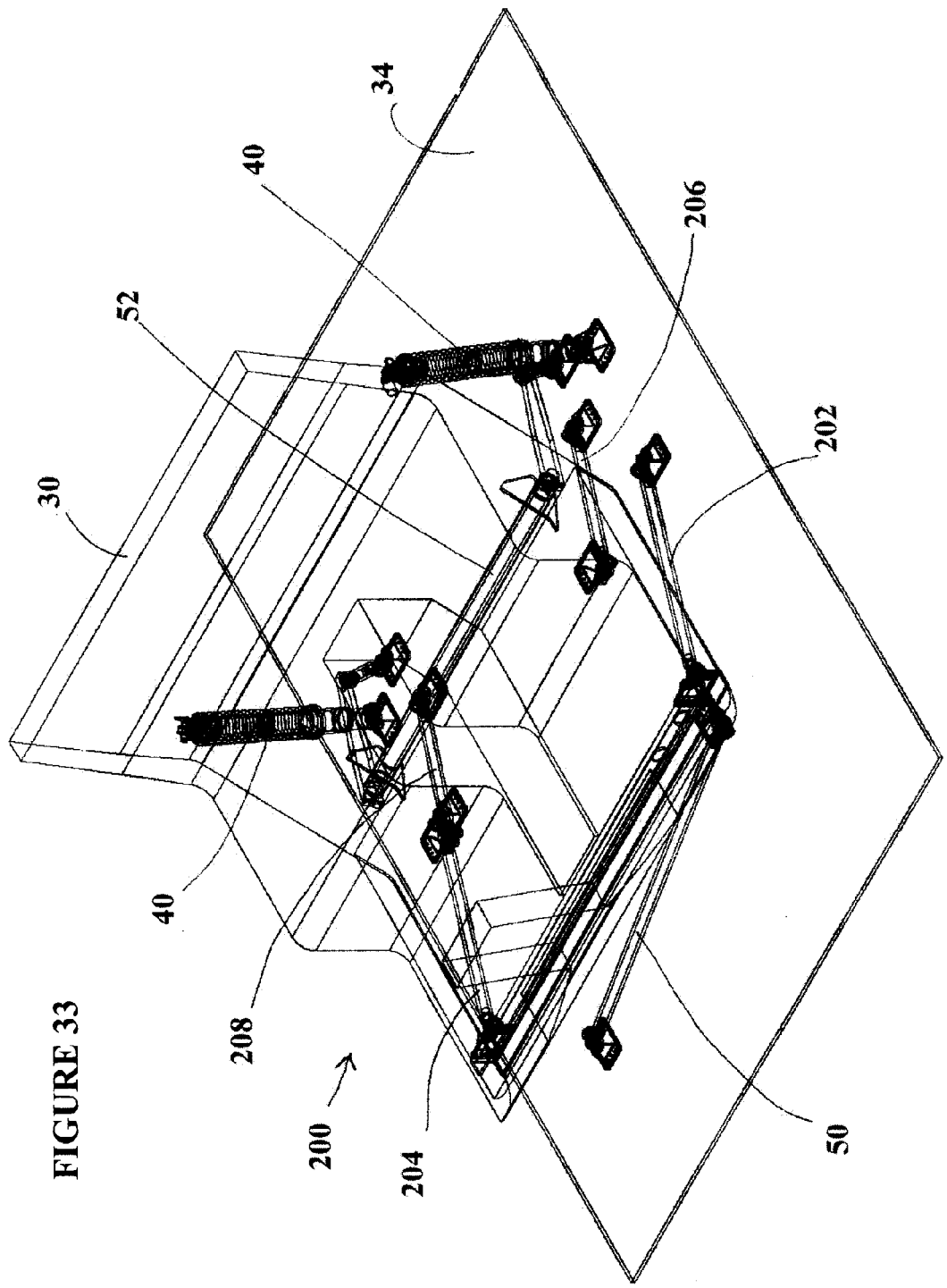
FIG. 33 is a transparent perspective view of a four-point suspension system with panhard embodiment of the present invention.
Figure 34:
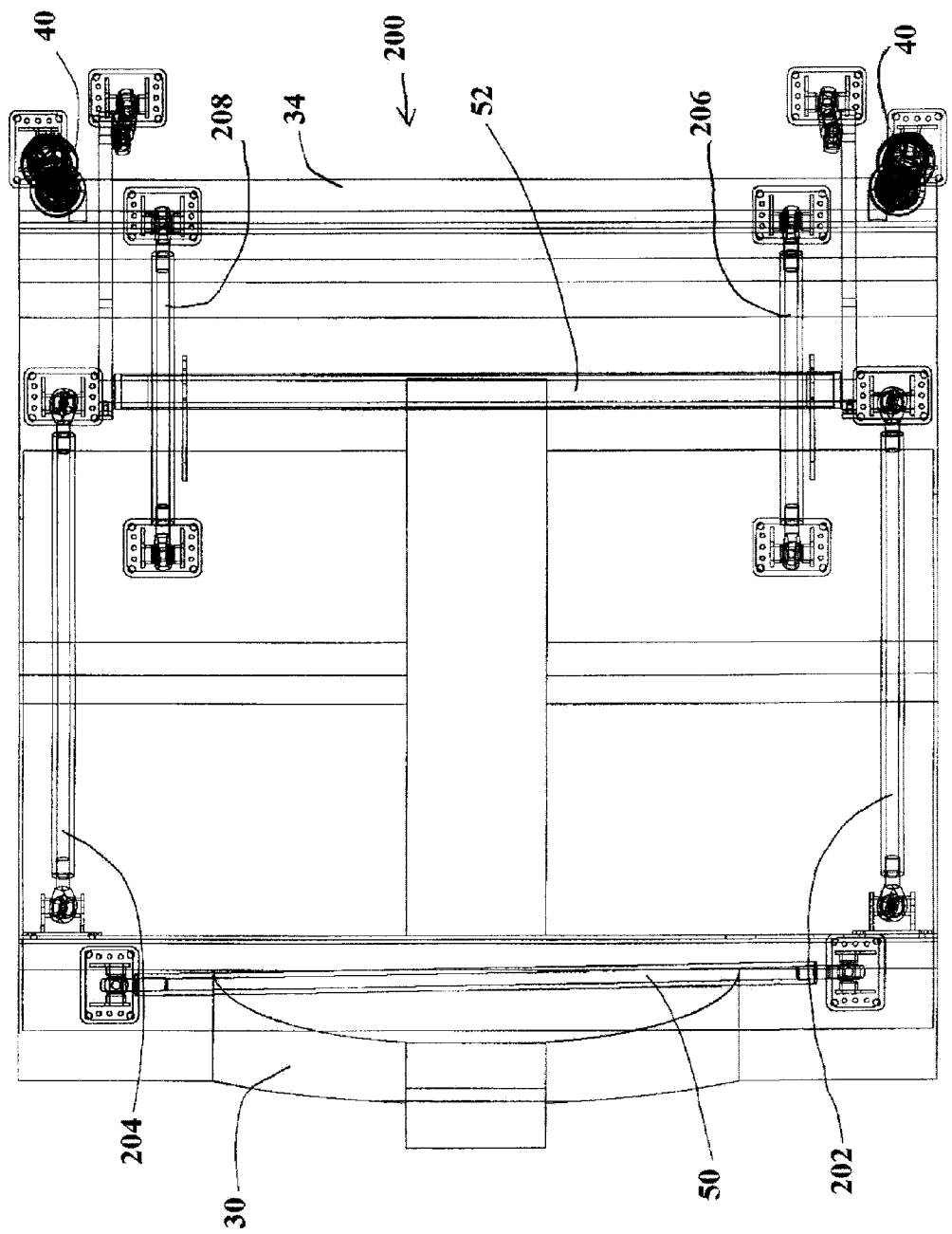
FIG. 34 is a transparent top plan view of the embodiment of FIG. 36.

In an alternative embodiment shown in FIGS. 30 through 32, there is a single lower-arm/anti-sway unit 160, having a combo-unit torsion spring 162, port lower arm 164 and a starboard lower arm 166. Such a lower-spar/anti-sway unit 160 may be installed with combo-unit torsion spring 102 mounted to either passenger module 30 or deck 34, as is convenient. In the embodiment shown in FIGS. 30 through 32, torsion spring 102 is mounted to deck 34 with two combo-unit deck mounts 168. The other components of this embodiment are as described above.

As a further alternative arrangement (not shown in the drawings), a single lower-arm/anti-sway unit could be selectively stiffened so as to resist lateral movement of passenger module 30 relative to deck 34, such that a separate means for doing same (e.g. a panhard rod or a Watt's linkage) is not required.

Figure 35:
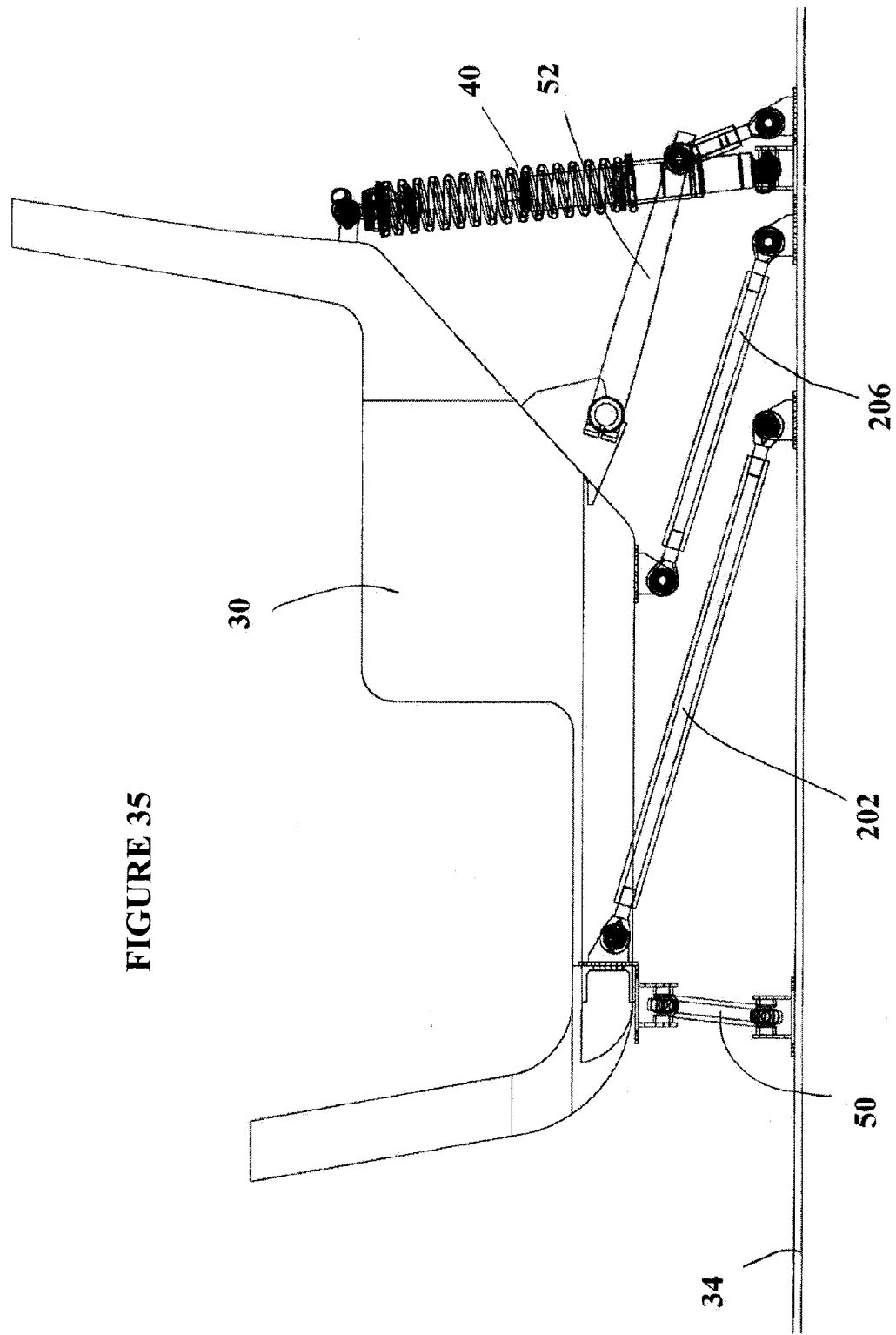
FIG. 35 is a transparent side elevation view of the embodiment of FIG. 36 with the passenger module in the at-rest position.
Figure 36:
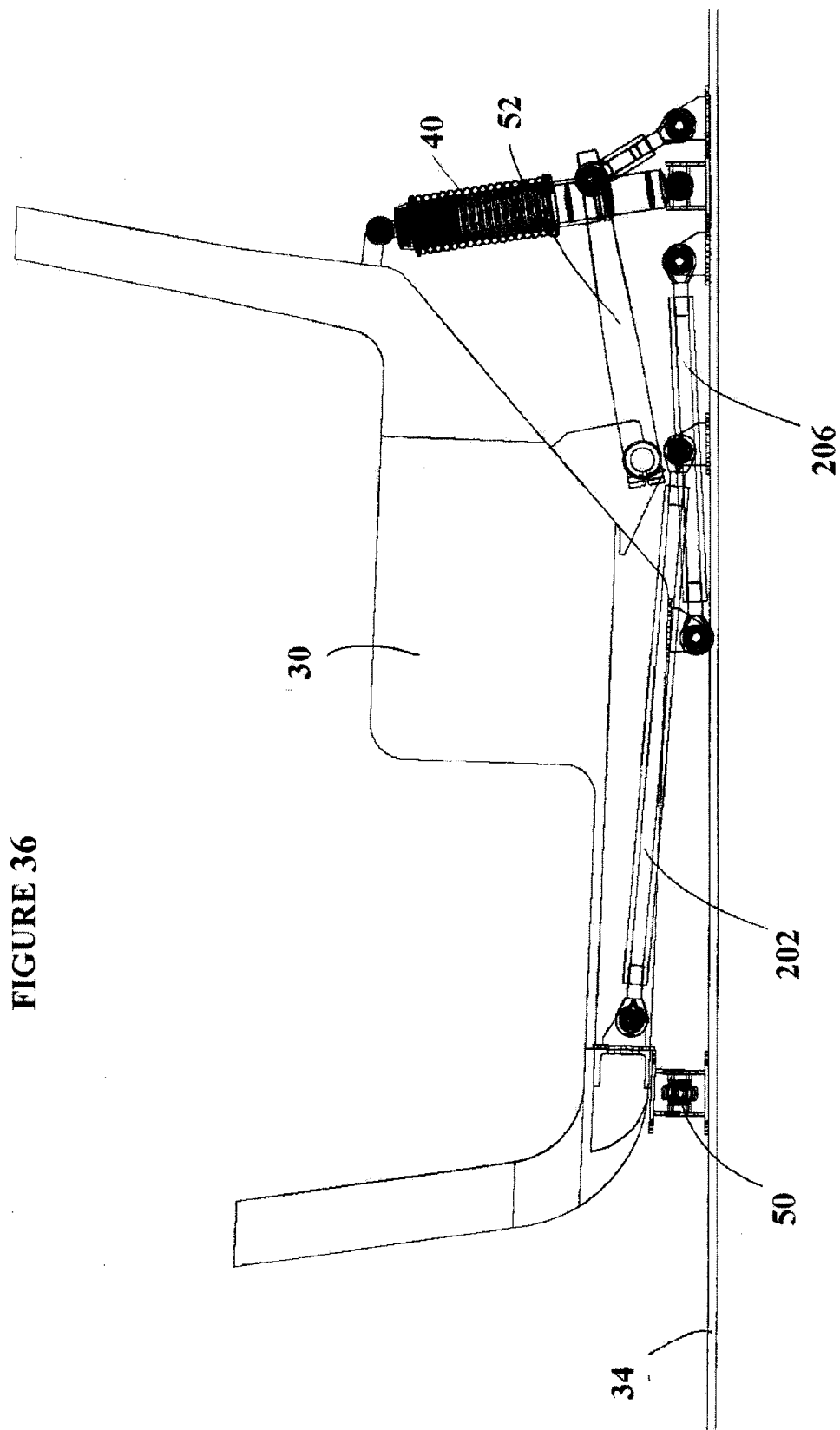
FIG. 36 is a transparent side elevation view of the embodiment of FIG. 36 with the passenger module in the bottom under-load position.
Figure 37:
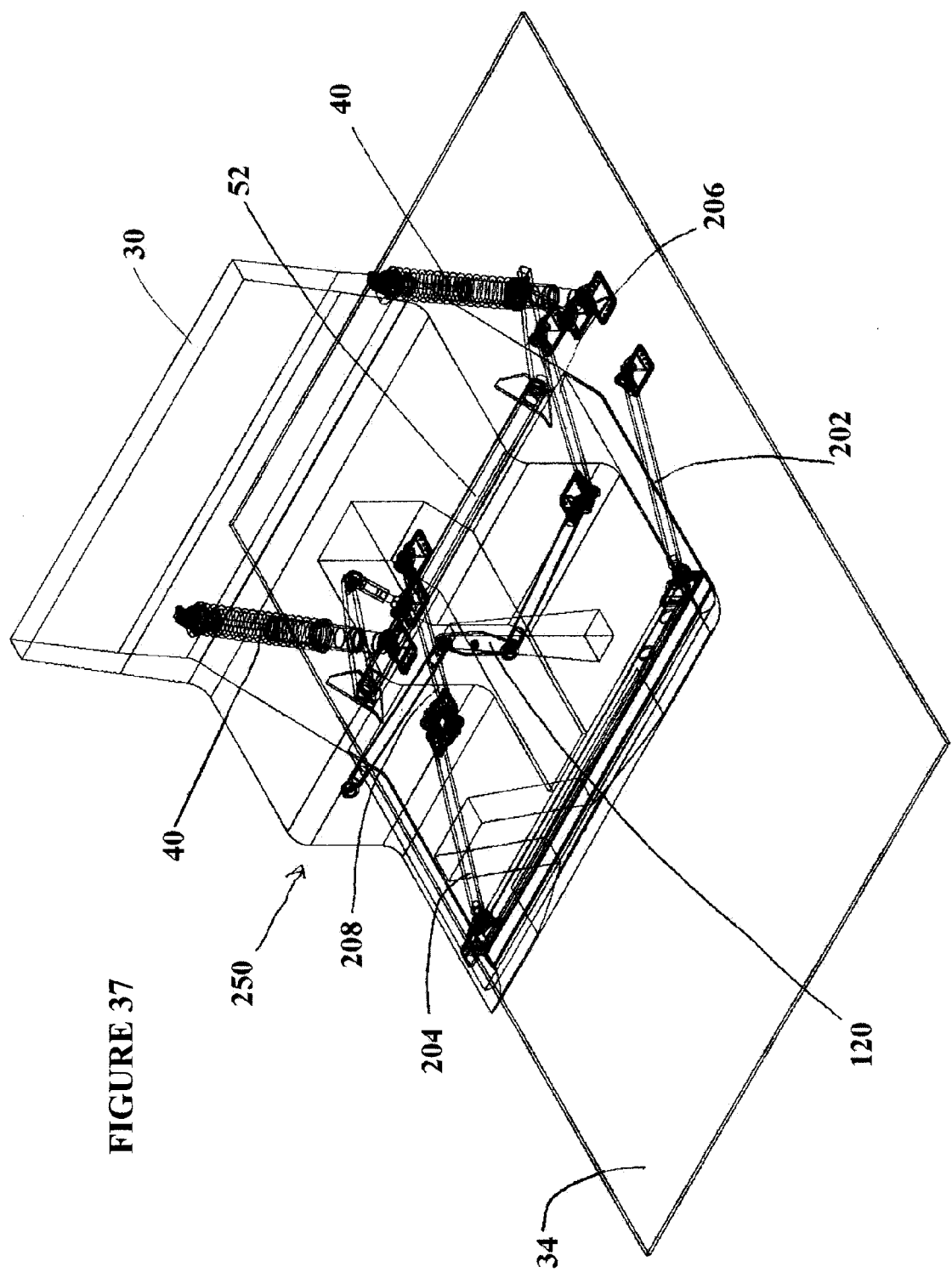
FIG. 37 is a transparent perspective view of a four-point suspension system with Watt's linkage embodiment of the present invention.
Figure 38:
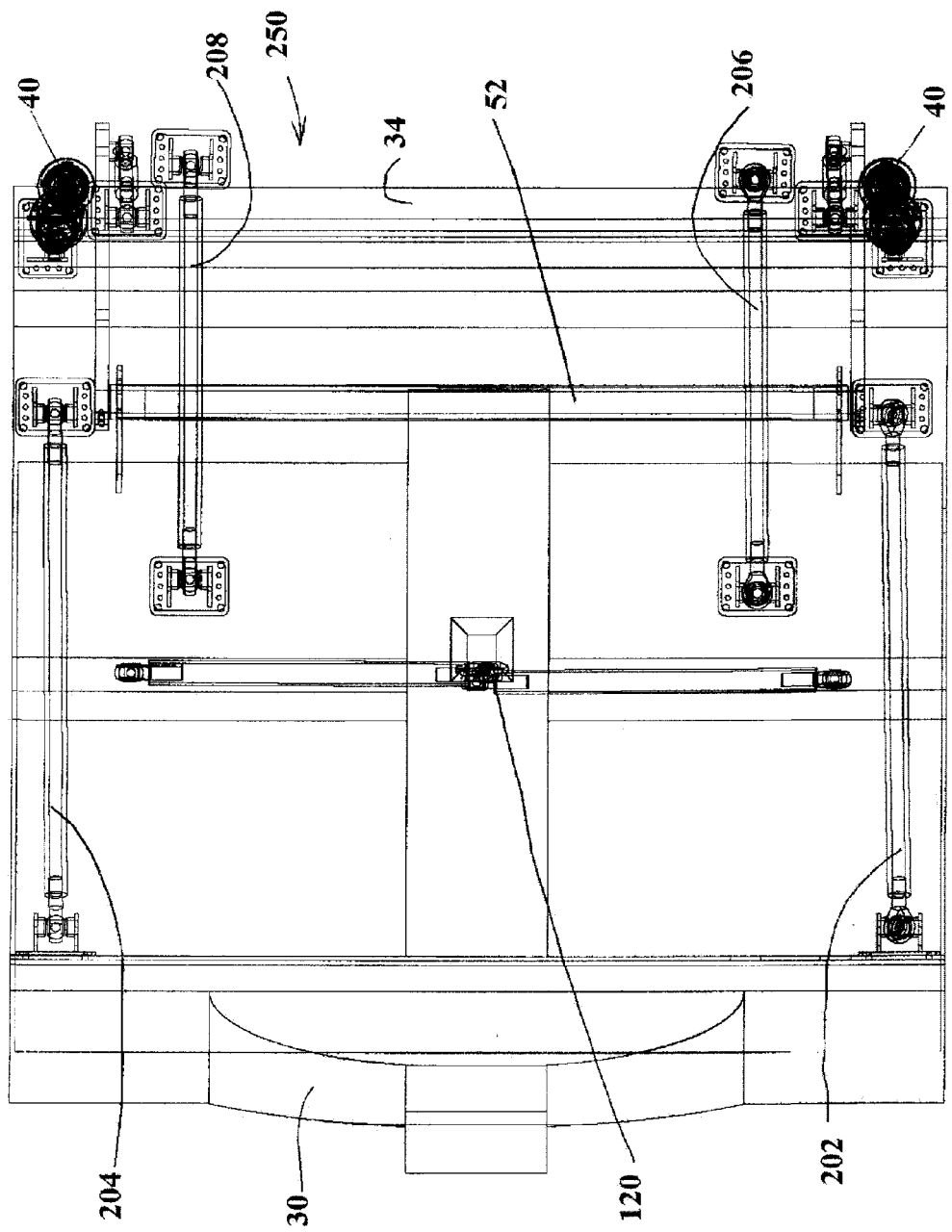
FIG. 38 is a transparent top plan view of the embodiment of FIG. 40.

A further embodiment, a four-point suspension system with panhard 200 is shown in FIGS. 33 through 36. Four-point suspension system with panhard 200 supports passenger module 30 and includes two struts 40, two forward spars, a port forward spar 202 and a starboard forward spar 204; two aft spars, a port aft spar 206 and a starboard aft spar 208; panhard rod 50; and anti-sway assembly 52. As shown in FIGS. 35 and 36, forward spars 202, 204 and aft spars 206, 208 are configured such that passenger module 30 tilts backward as passenger module 30 moves from the at-rest position to the bottom under-load position. Forward spars 202, 204 or aft spars 206, 208 may be mounted so as to permit adjustments to the mount position so as to alter the degree of tilt as desired (not shown).

Figure 39:
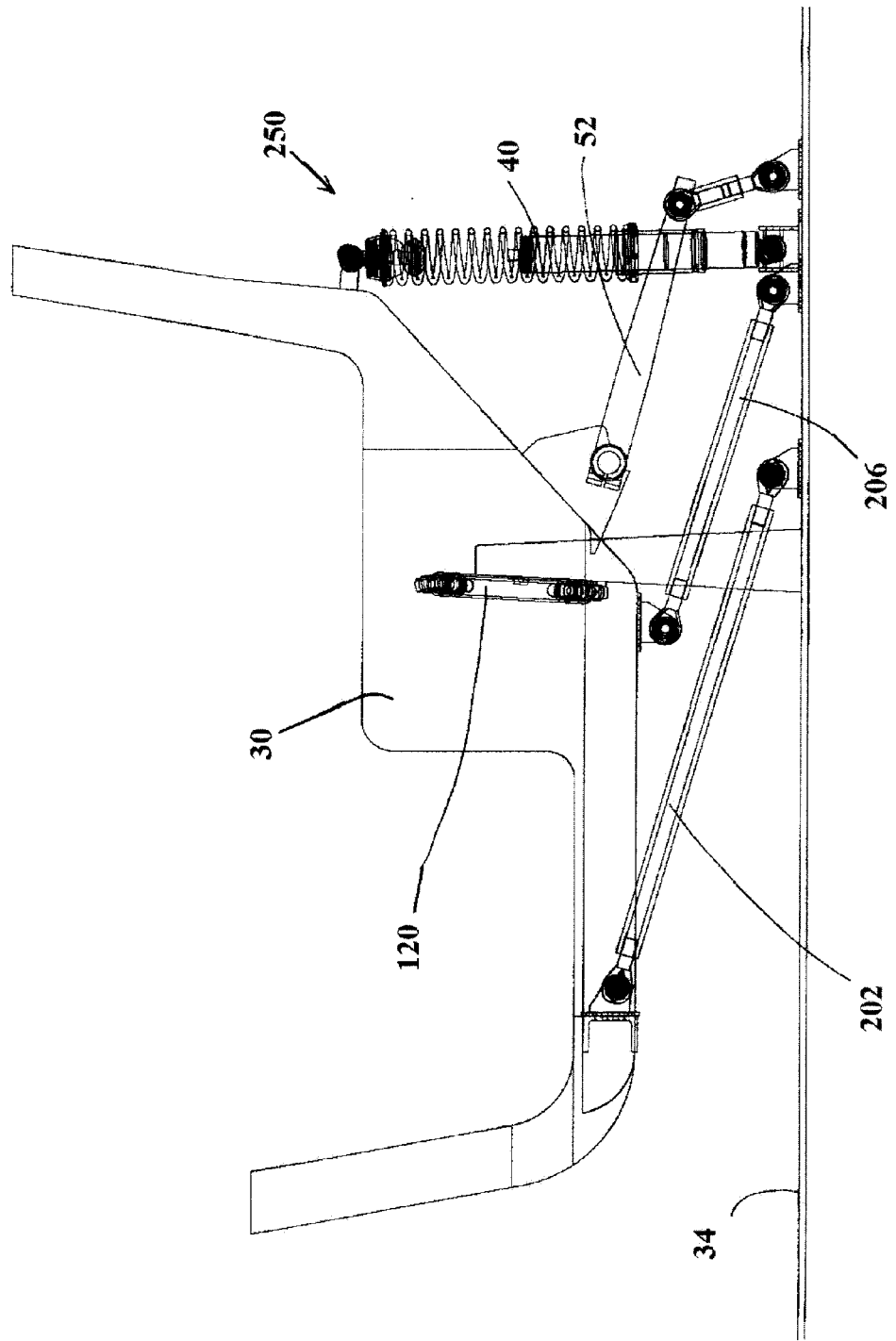
FIG. 39 is a transparent side elevation view of the embodiment of FIG. 40 with the passenger module in the at-rest position.
Figure 40:
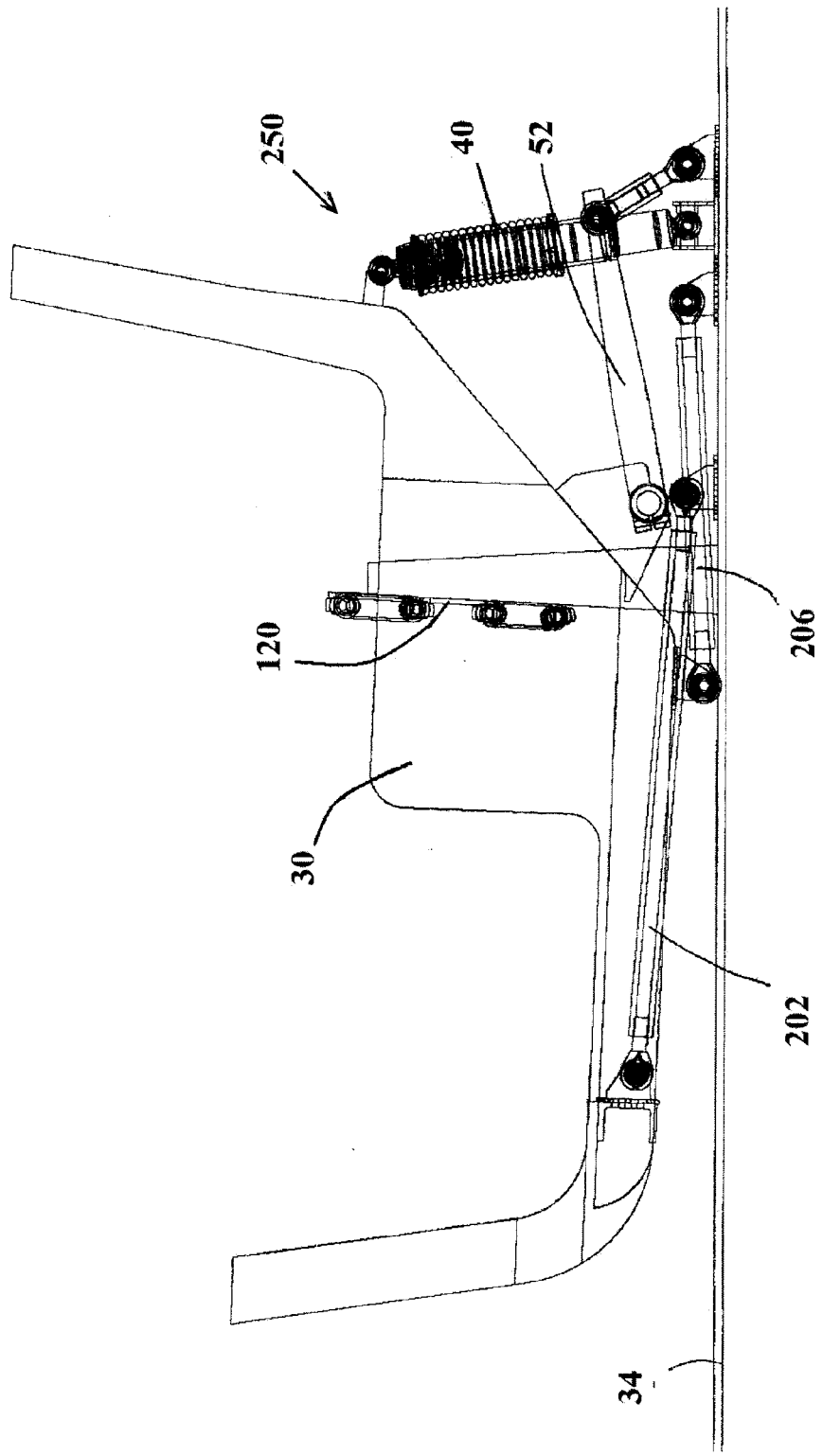
FIG. 40 is a transparent side elevation view of the embodiment of FIG. 40 with the passenger module in the bottom under-load position.
Figure 41:
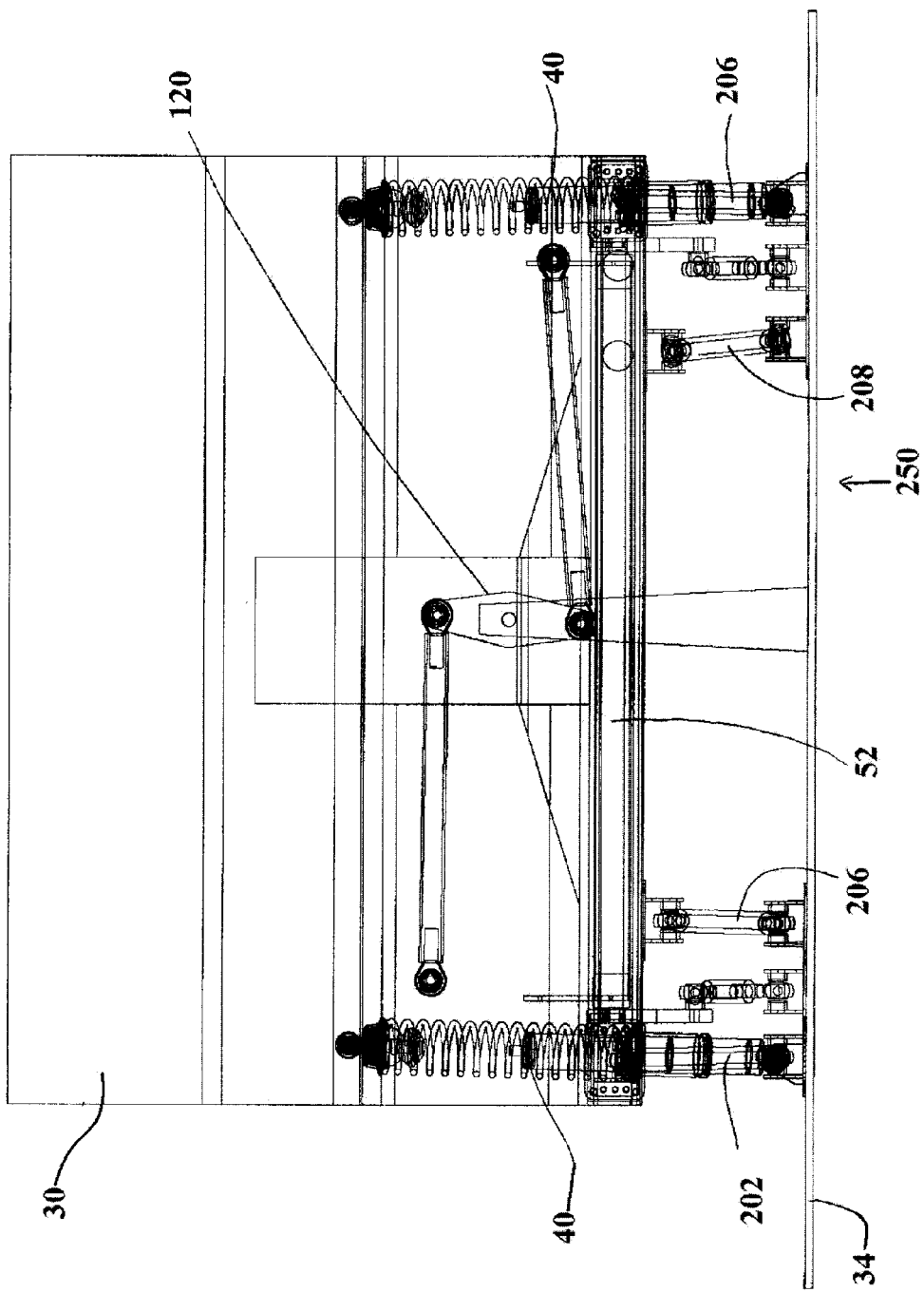
FIG. 41 is a transparent rear elevation view of the embodiment of FIG. 40 with the passenger module in the at-rest position.
Figure 42:
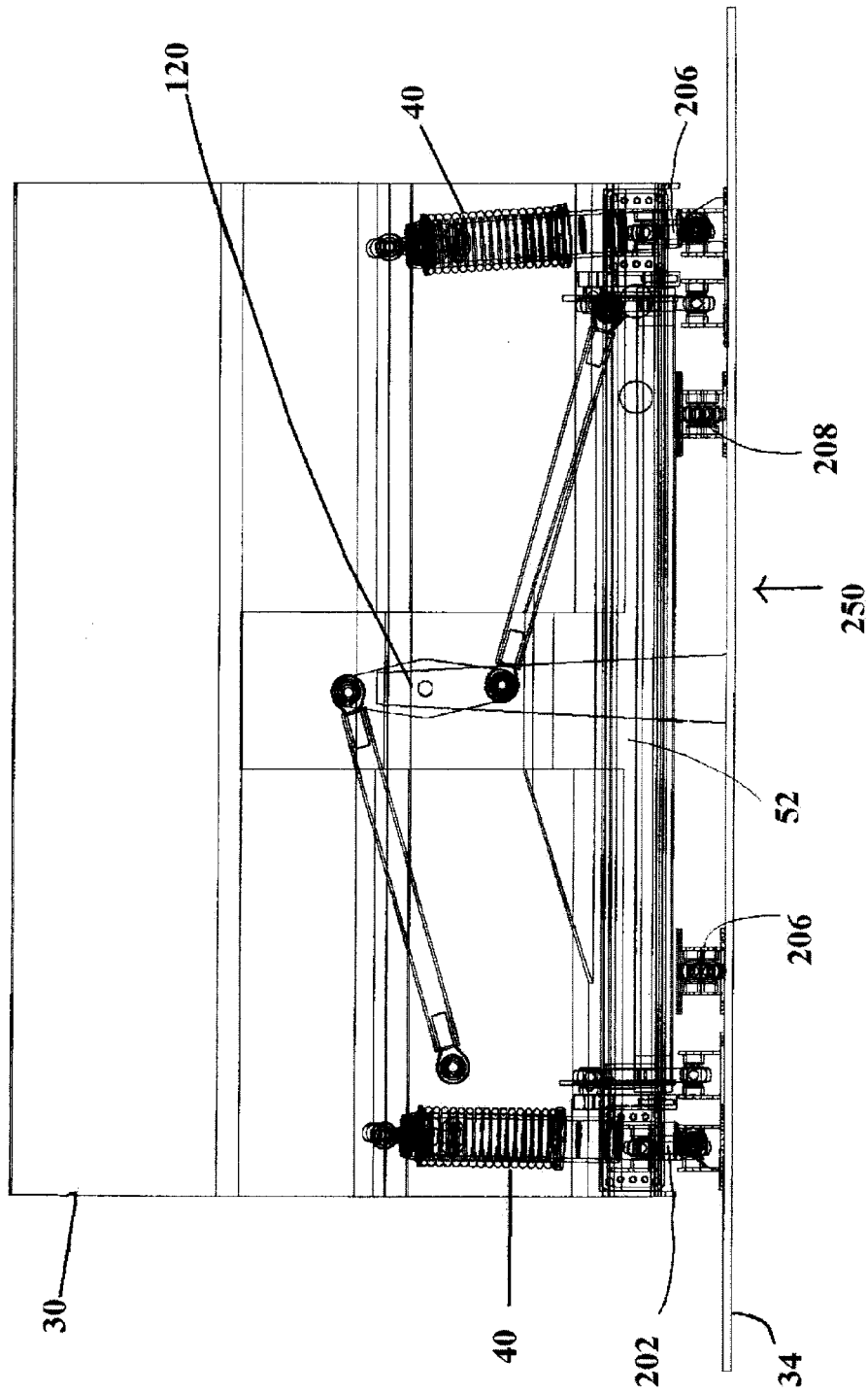
FIG. 42 is a transparent rear elevation view of the embodiment of FIG. 40 with the passenger module in the bottom under-load position.
Figure 43:
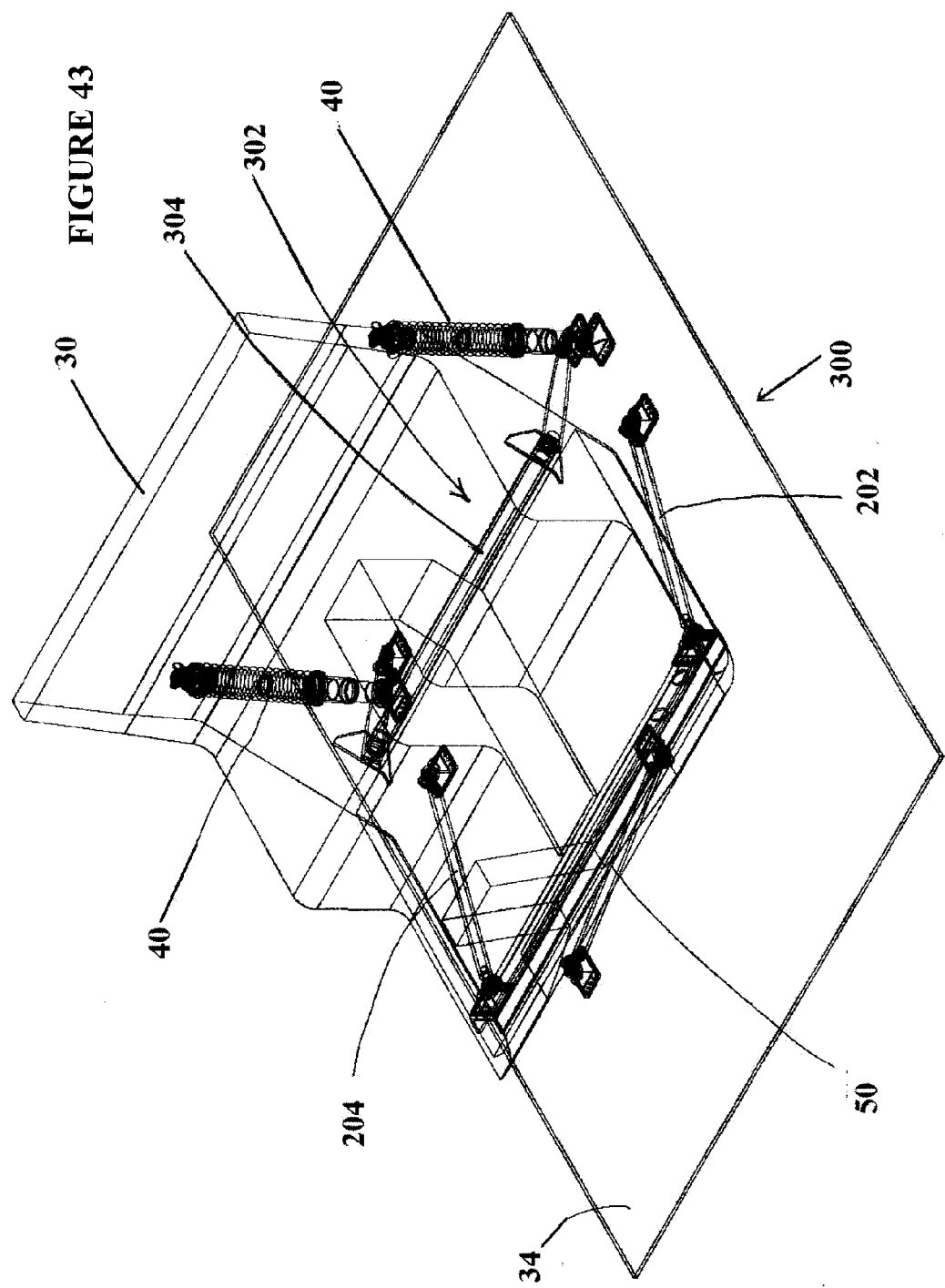
FIG. 43 is a transparent perspective view of a four-point integral-antisway suspension system with panhard embodiment of the present invention.
Figure 44:
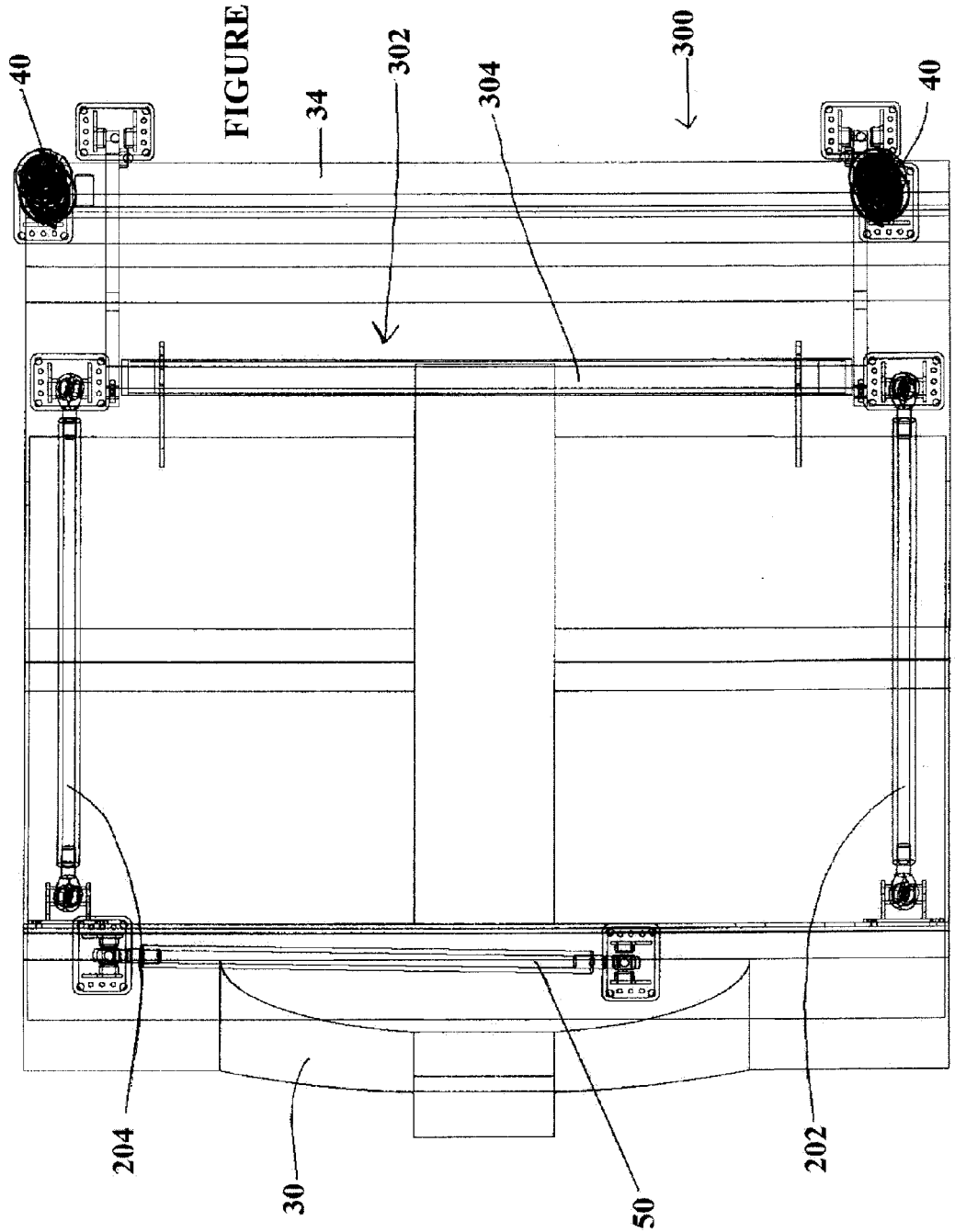
FIG. 44 is a transparent top plan view of the embodiment of FIG. 46.

A further embodiment, a four-point suspension system with Watt's linkage 250 is shown in FIGS. 37 through 42. Four-point suspension system with Watt's linkage 250 supports passenger module 30 and includes: two struts 40; two forward spars, a port forward spar 202 and a starboard forward spar 204; two aft spars, a port aft spar 206 and a starboard aft spar 208; a Watt's linkage 120; and an anti-sway assembly 52. As shown in FIGS. 39 and 40, forward spars 202, 204 and aft spars 206, 208 are configured such that passenger module 30 tilts backward as passenger module 30 moves from the at-rest position to the bottom under-load position. Forward spars 202, 204 or aft spars 206, 208 may be mounted so as to permit adjustments to the mount position so as to alter the degree of tilt as desired (not shown). As shown in FIGS. 41 and 42, Watt's linkage 120 impedes athwart movement of passenger module 30 relative to deck 34, when the passenger module 30 is in, and between, the at-rest position and the bottom under-load position.

Figure 45:
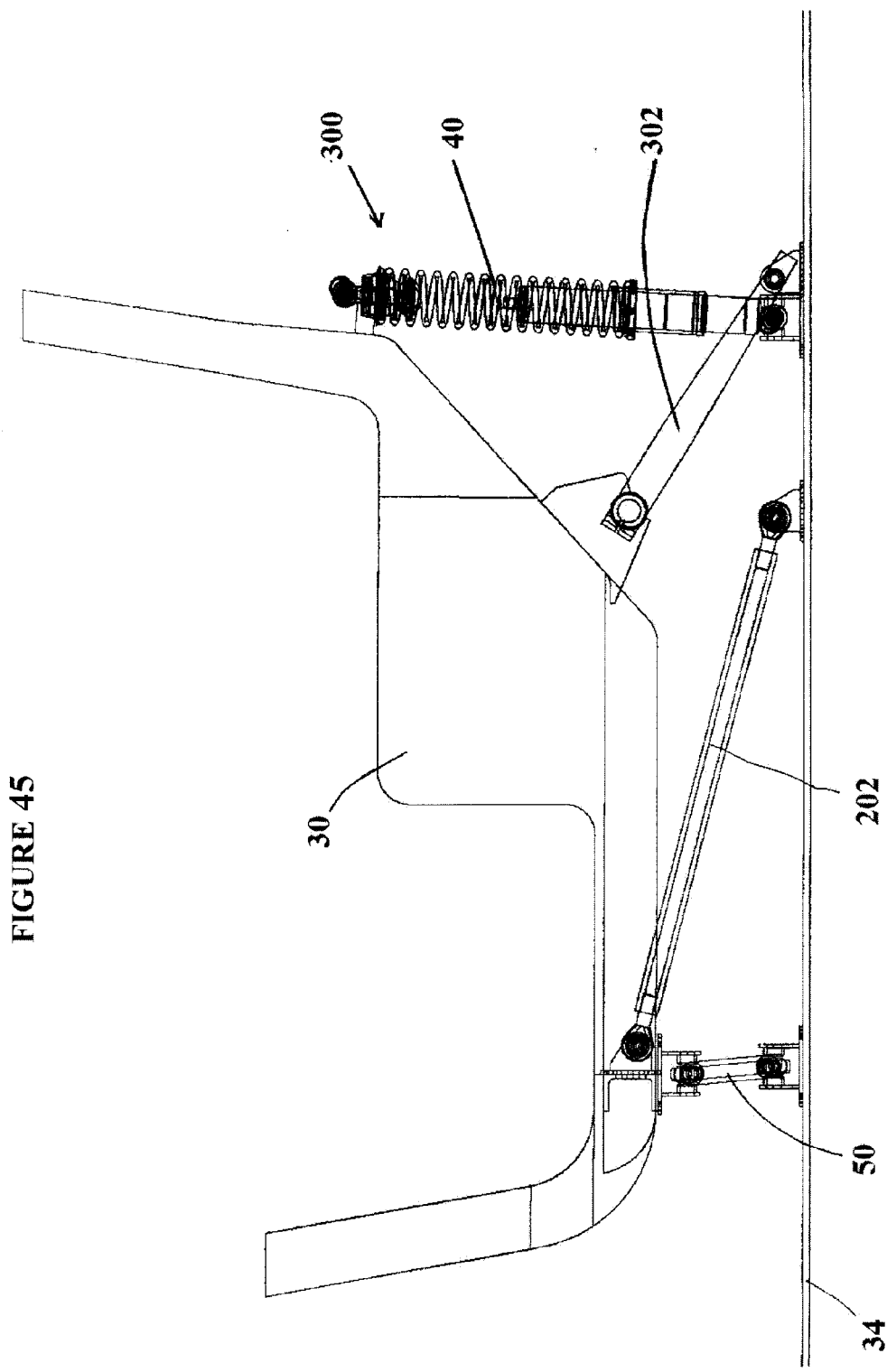
FIG. 45 is a transparent side elevation view of the embodiment of FIG. 46 with the passenger module in the at-rest position.
Figure 46:
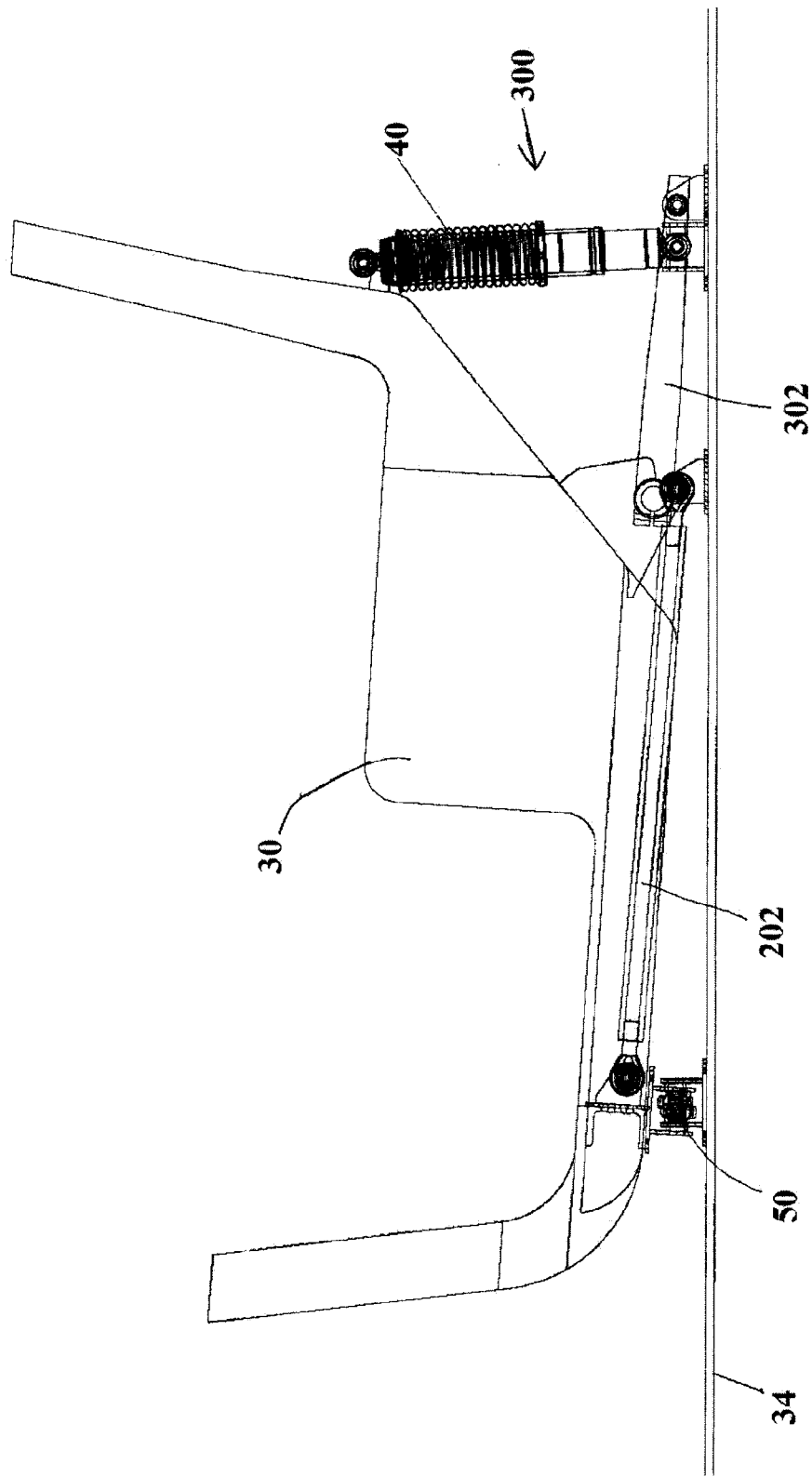
FIG. 46 is a transparent side elevation view of the embodiment of FIG. 46 with the passenger module in the bottom under-load position.
Figure 47:
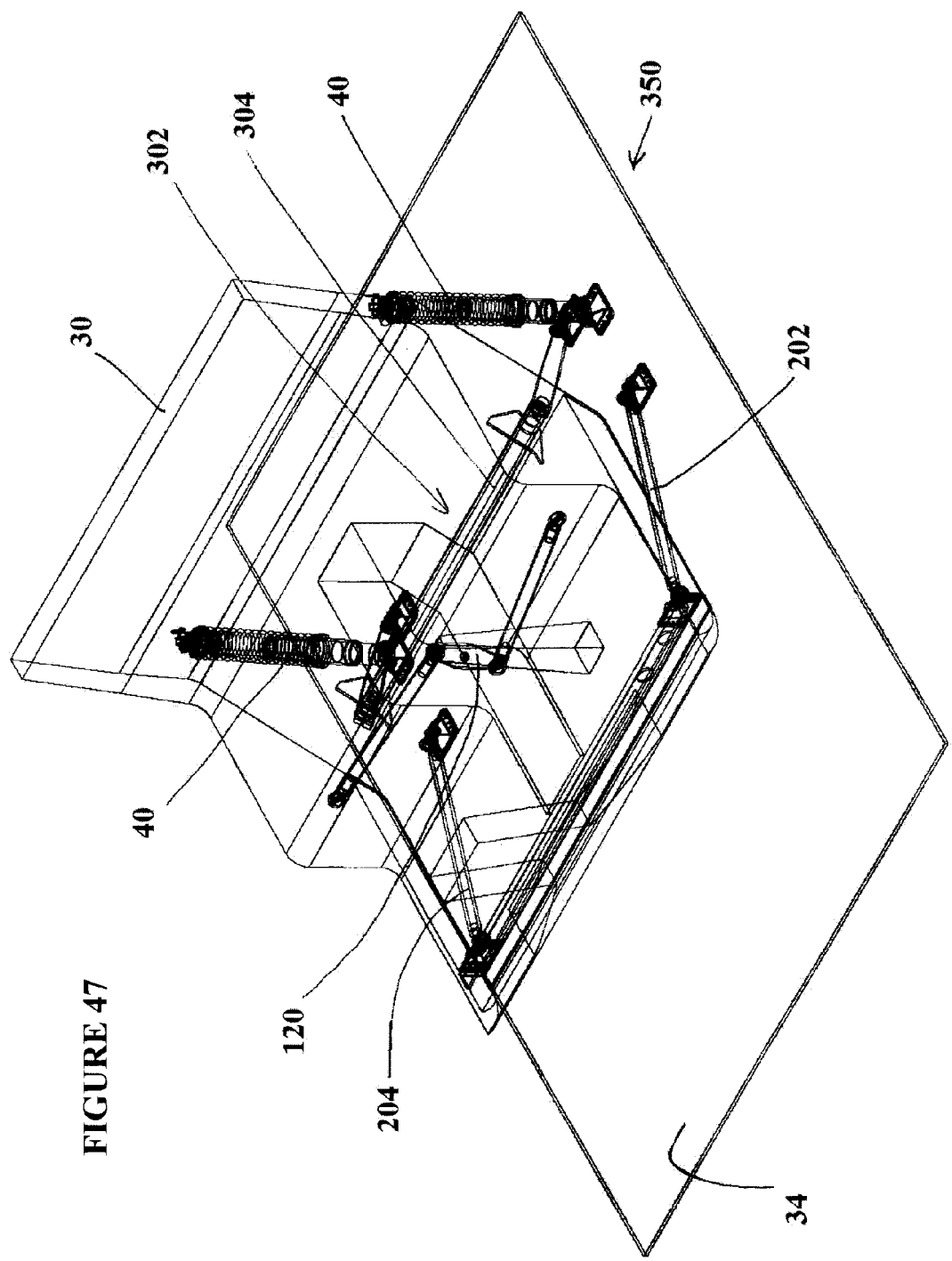
FIG. 47 is a transparent perspective view of a four-point integral-antisway suspension system with Watt's linkage embodiment of the present invention.
Figure 48:
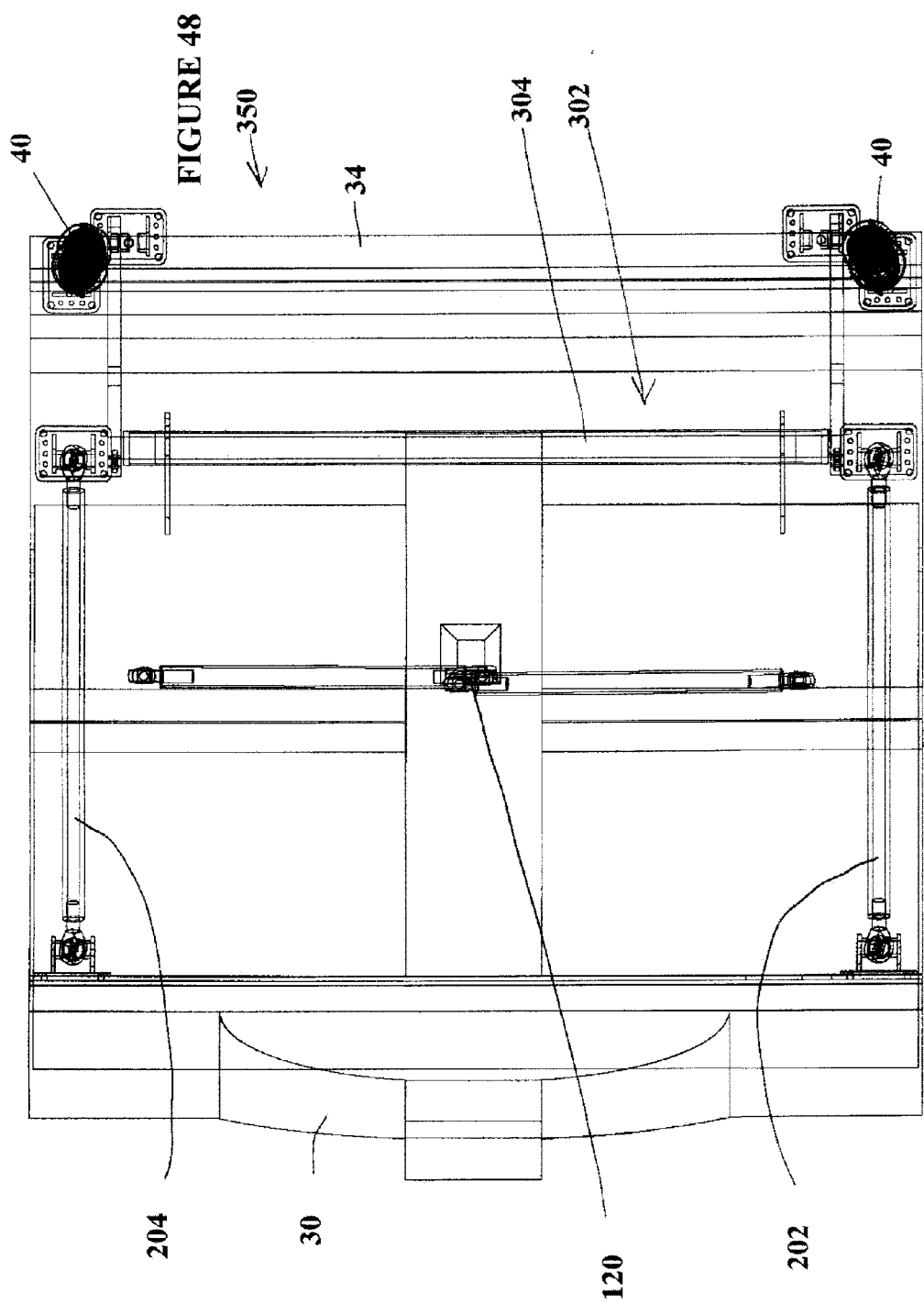
FIG. 48 is a transparent top plan view of the embodiment of FIG. 50.
Figure 49:
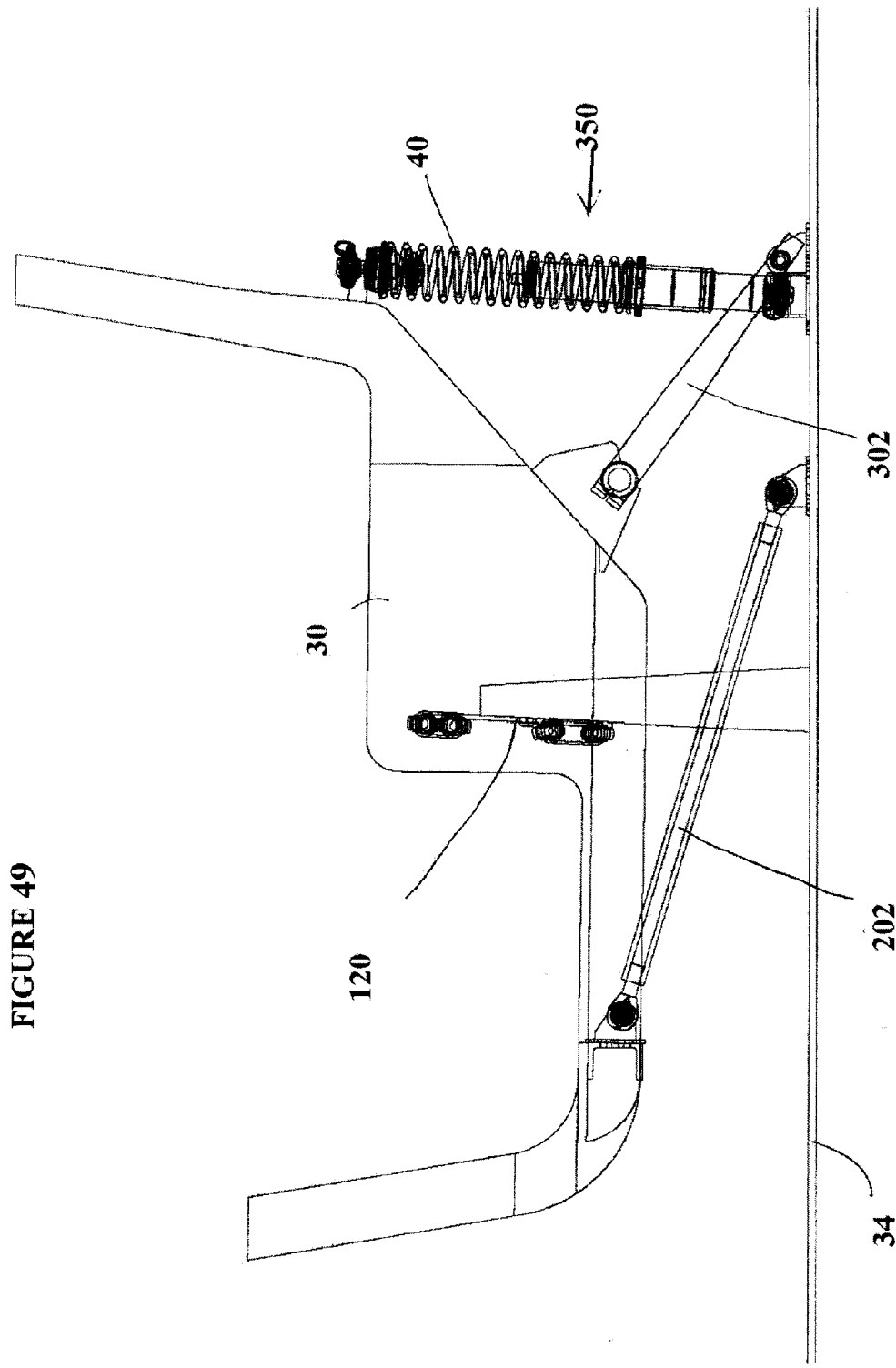
FIG. 49 is a transparent side elevation view of the embodiment of FIG. 50 with the passenger module in the at-rest position.
Figure 50:
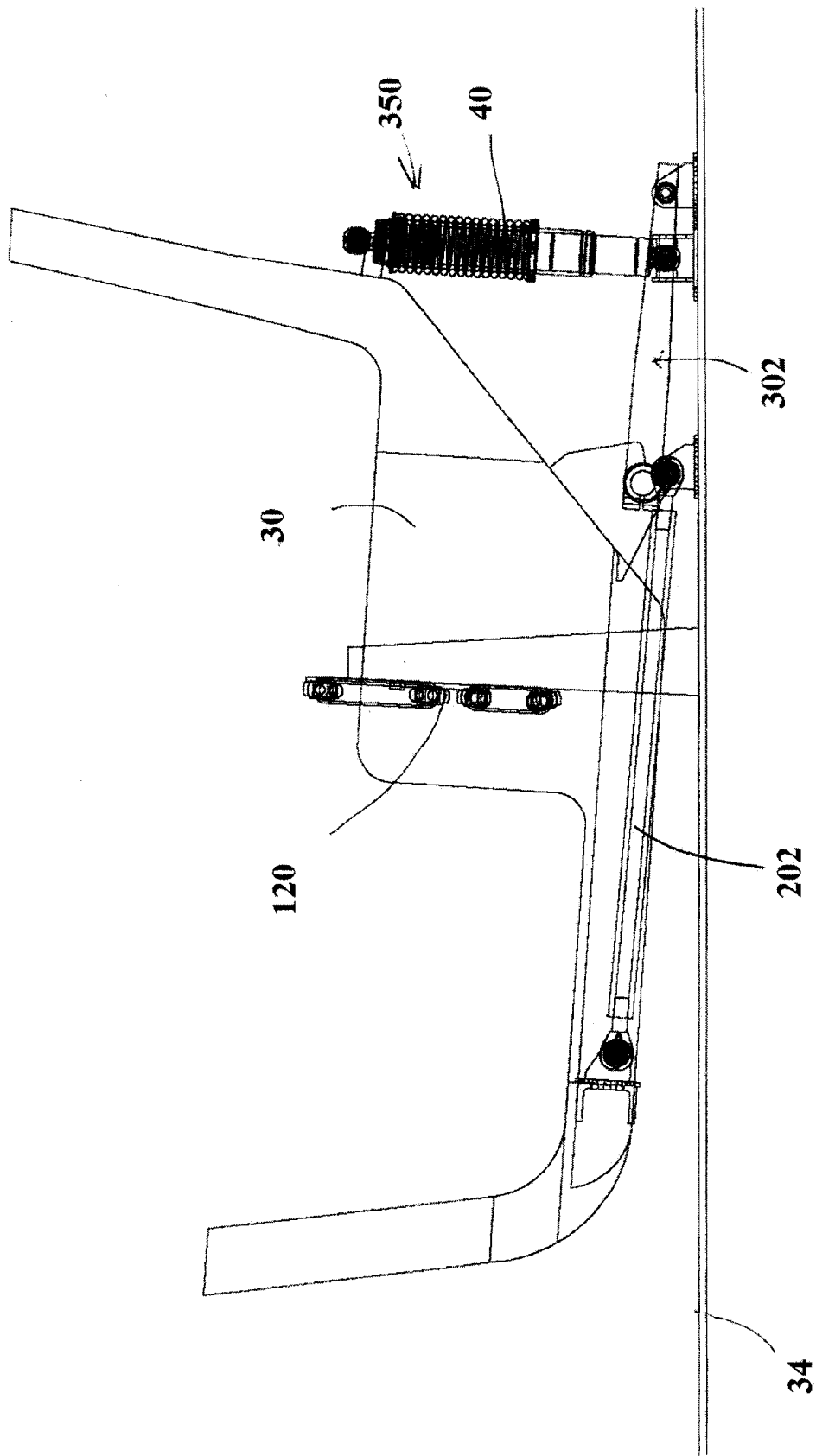
FIG. 50 is a transparent side elevation view of the embodiment of FIG. 50 with the passenger module in the bottom under-load position.

A further embodiment, a four-point integral-anti-sway suspension system with panhard 300 is shown in FIGS. 43 through 46. Four-point integral-anti-sway suspension system with panhard 300 supports a passenger module 30 and includes: two struts 40; two forward spars, port forward spar 202 and starboard forward spar 204; aft spar/anti-sway unit 302; and panhard rod 50. Aft spar/anti-sway unit 302 is analogous to the lower-arm/anti-sway unit 160 described above. In the embodiment shown in FIGS. 43 through 46, torsion spring portion 304 of aft spar/anti-sway unit 302 is mounted to passenger module 30, though torsion spring portion 304 could be mounted to deck 34, if desired. As shown in FIGS. 45 and 46, forward spars 202, 204 and aft spar/anti-sway unit 302 are configured such that the passenger module 30 tilts backward as passenger module 30 moves from the at-rest position to the bottom under-load position. Forward spars 202, 204 or and aft spar/antisway unit 302 may be mounted so as to permit adjustments to the mount position so as to alter the degree of tilt as desired (not shown).

Figure 51:
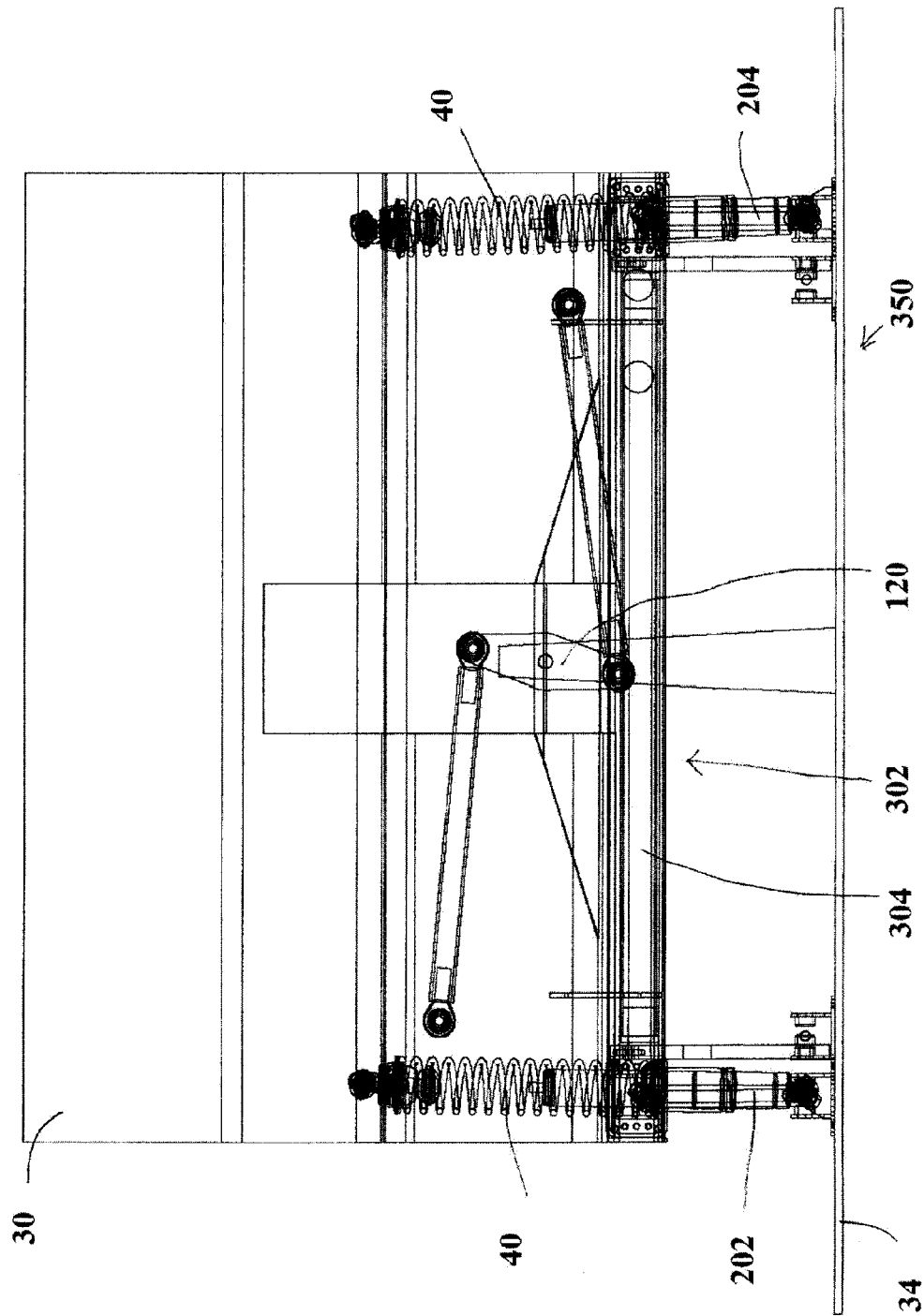
FIG. 51 is a transparent rear elevation view of the embodiment of FIG. 50 with the passenger module in the at-rest position.
Figure 52:
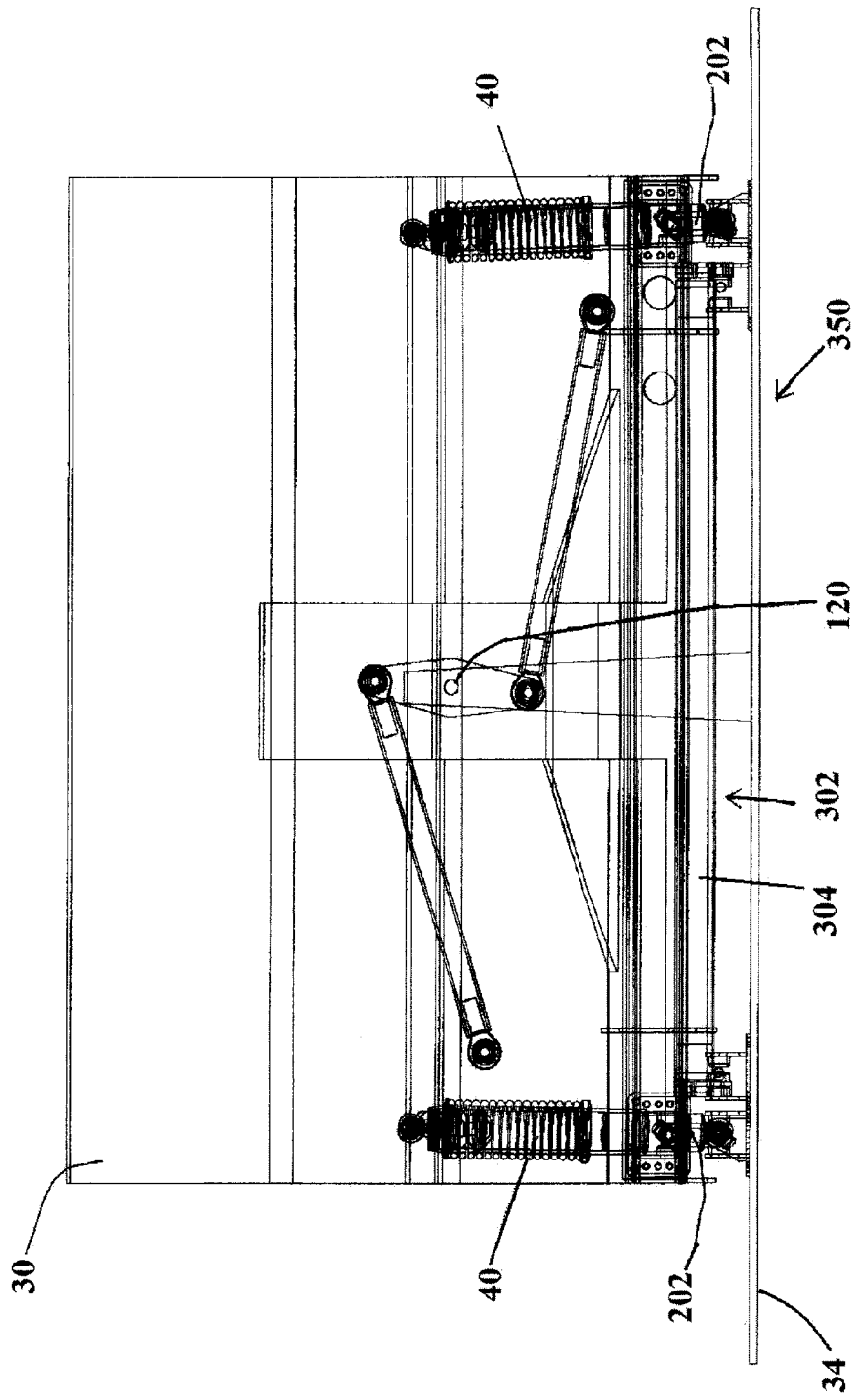
FIG. 52 is a transparent rear elevation view of the embodiment of FIG. 50 with the passenger module in the bottom under-load position.

A further embodiment, a four-point integral-anti-sway suspension system with Watt's linkage 350 is shown in FIGS. 47 through 52. Four-point integral-anti-sway suspension system with Watt's linkage 350 supports passenger module 30 and includes: two struts 40; two forward spars, port forward spar 202 and starboard forward spar 204; aft spar/anti-sway unit 302; and Watt's linkage 120. In the embodiment shown in FIGS. 43 through 46, torsion spring portion 304 of aft spar/anti-sway unit 302 is mounted to passenger module 30, though, torsion spring portion 304 could be mounted to, deck 34, if desired. As shown in FIGS. 51 and 52, the forward spars 202, 204 and aft spar/anti-sway unit 302 are configured such that the passenger module 30 tilts backward as passenger module 30 moves from the at-rest position to the bottom under-load position. Forward spars 202, 204 or aft spar/anti-sway unit 302 may be mounted so as to permit adjustments to the mount position so as to alter the degree of tilt as desired (not shown). As shown in FIGS. 54 and 55, Watt's linkage 120 impedes athwart movement of passenger module 30 relative to deck 34, when passenger module 30 is in, and between, the at-rest position and the bottom under-load position.

As generally consistent with the suspension system configurations described above, it is usually preferable that the suspension system be essentially within the footprint of the passenger module 30 as this general arrangement takes up little more area on a vessel deck than a passenger module 30 alone would. However, other configurations may be preferable in some applications, such as perhaps where the suspension system is retrofit after the vessel is designed and built, and locating the suspension system generally below passenger module 30 is not possible because of existing equipment. In such situations, the suspension system components may readily be displaced forward or aft relative to the passenger module.

In the embodiments described above, the spars 42, 46, 48 extend, from a top plan-view perspective, generally parallel to the fore-and-aft axis of the vessel. However, the spars 42, 46, 48 need not be generally parallel to the fore-and-aft axis of the vessel. In particular, paired spars (e.g. lower spars 46, 48) need not be generally parallel to the fore-and-aft axis and could be angled relative to the fore-and-aft axis in a mirroring manner.

What is claimed is:

1. A suspension system for a passenger module of a water vessel having a fore-and-aft axis, the suspension system comprising:
   a) a shock absorbing assembly for resiliently suspending a passenger module relative to a vessel, wherein the shock absorbing assembly tends to cause the passenger module to remain in an upper at-rest position and to return to the at-rest position on cessation of a force causing the passenger module to move generally vertically towards a bottom position; and
   b) a spar assembly comprising a plurality of spars, each spar pivotally attached at a proximal end to the vessel and at a distal end to the passenger module, the spar assembly configured to provide an aft tilt to the passenger module as the passenger module moves towards the bottom position, wherein:
   c) the spar assembly comprises two spars, an upper spar and a lower spar;
   d) the distal end of the upper spar is attached to the passenger module at a greater height on the passenger module than the distal end of the lower spar;

e) each spar pivots relative to the vessel responsive to upward or downward movement of the passenger module relative to the vessel and in doing so each spar causes the portion of the passenger module in the vicinity of the distal end of the spar to move generally parallel to the fore-and-aft axis of the vessel; and f) there is a differential in the fore-and-aft movement caused by the spars in that an arc defined by the distal end of the lower spar as the passenger module moves towards the bottom position includes greater relative forward displacement than an arc defined by the distal end of the upper spar as the passenger module moves towards the bottom position;

whereby, as the passenger module moves towards the bottom position, the differential in the fore-and-aft movement induces the aft tilt.

2. The suspension system of claim 1, further comprising a device for adjusting the amount of differential in the fore-and-aft movement and thus the amount of all tilt.

3. The suspension system of claim 2, wherein the device for adjusting the amount of differential in the fore-ands-aft movement comprises an adjustable mount for varying the height of an end of the upper spar or lower spar such so as to vary the relative forward displacement of the arc defined by the distal end of the spar as the passenger module moves towards the bottom position.

4. The suspension system of claim 3, wherein the adjustable mount comprises a plurality of holes, generally vertically displaced one from the other, with each hole defining a mounting location for the associated end of the relevant upper spar or lower spar.

5. The suspension system of claim 3, wherein the adjustable mount is for pivotally attaching the distal end of the upper strut to the passenger module.

6. The suspension system of claim 1, wherein the upper spar and the lower spar are not parallel one to the other.

7. The suspension system of claim 1, wherein the upper spar and the lower spar are different lengths.

8. The suspension system of claim 6, wherein the upper spar is shorter than the lower spar.

9. The suspension system of claim 1, wherein there is a second lower spar and the two lower spars are spaced apart athwart one from the other in a generally parallel relationship.

10. The suspension system of claim 1, wherein there is a second upper spar and the two upper spars are spaced apart athwart one from the other in a generally parallel relationship.

11. The suspension system of claim 1, wherein the shock absorbing assembly comprises one or more shock absorbers, each attached at a proximal end to the vessel and at a distal end to the passenger module.

12. The suspension system of claim 11, wherein the shock absorbing assembly comprises two shock absorbers.

13. The suspension system of claim 11, wherein the shock absorbing assembly comprises four air shocks.

14. The suspension system of claim 1, further comprising a panhard rod attached to the passenger module and the vessel, for inhibiting athwart movement of the passenger module relative to the vessel.

15. The suspension system of claim 1, further comprising a Watt=s linkage attached to the passenger module and the vessel, for inhibiting athwart movement of the passenger module relative to the vessel.

16. The suspension system of claim 1, further comprising an anti-sway device, wherein the anti-sway device comprises a torsion bar attached to the vessel and the passenger module.

17. A suspension system for a passenger module of a water vessel having a fore-and-aft axis, the suspension system comprising:

a) a shock absorbing assembly, comprising four shock absorbers, each attached at a proximal end to a vessel and at a distal end to a passenger module, for resiliently suspending the passenger module relative to the vessel, wherein the shock absorbing assembly tends to cause the passenger module to remain in an upper at-rest position and to return to the at-rest position on cessation of a force causing the passenger module to move generally vertically towards a bottom position; and b) a spar assembly comprising:
 i) an upper spar pivotally attached at a proximal end to the vessel and at a distal end to the passenger module;
 ii) two lower spars spaced apart athwart in a generally parallel relationships and each lower spar pivotally attached at a proximal end to the vessel and at a distal end to the passenger module;

wherein the distal end of the upper spar is attached to the passenger module at a greater height on the passenger module than the distal ends of the lower spars; wherein each spar pivots relative to the vessel responsive to upward or downward movement of the passenger module relative to the vessel and in doing so each spar causes the portion of the passenger module in the vicinity of the distal end of the spar to move generally parallel to the fore-and-aft axis of the vessel; and there is a differential in the fore-and-aft movement caused by the spars in that an arc defined by the distal end of the lower spars as the passenger module moves towards the bottom position includes greater relative forward displacement than an arc defined by the distal end of the upper spar as the passenger module moves towards the bottom position, whereby, as the passenger module moves towards the bottom position the differential in the fore-and-aft movement induces an aft tilt to the passenger module; and c) a panhard rod attached to the passenger module and the vessel for inhibiting athwart movement of the passenger module relative to the vessel.

18. The suspension system of claim 17, further comprising an adjustable mount for pivotally attaching the distal end of the upper spar to the passenger module, the adjustable mount comprising a plurality of holes, generally vertically displaced one from the other, with each hole defining a distinct mounting location for the distal end of the upper spar, wherein changing the mounting location for the distal end of the upper spar changes the relative forward displacement of the arc defined by the distal end of the upper spar as the passenger module moves towards the bottom position and thus changes the amount of aft tilt.

* * * * *